US012773695B2

(12) United States Patent
Fisher et al.

(10) Patent No.: US 12,773,695 B2
(45) Date of Patent: Oct. 27, 2026

(54) FLOW CELLS AND METHODS FOR MAKING THE SAME

(71) Applicant: ILLUMINA, INC., San Diego, CA (US)

(72) Inventors: Jeffrey S. Fisher, San Diego, CA (US); Anthony Flannery, San Diego, CA (US); Sahngki Hong, San Diego, CA (US); Brinda Kodira Cariappa, San Diego, CA (US); Lewis J. Kraft, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 442 days.

(21) Appl. No.: 18/477,468

(22) Filed: Sep. 28, 2023

(65) Prior Publication Data

US 2024/0123448 A1 Apr. 18, 2024

Related U.S. Application Data

(60) Provisional application No. 63/378,020, filed on Sep. 30, 2022.

(51) Int. Cl.
*B01L 3/00* (2006.01)

(52) U.S. Cl.
CPC ... *B01L 3/502761* (2013.01); *B01L 3/502707* (2013.01); *B01L 2200/0647* (2013.01); *B01L 2200/12* (2013.01)

(58) Field of Classification Search
None
See application file for complete search history.

(56) References Cited

U.S. PATENT DOCUMENTS

| | | | | |
|---|---|---|---|---|
| 4,984,039 | A | 1/1991 | Douglas | |
| 9,982,294 | B2 | 5/2018 | Fabani et al. | |
| 2006/0019274 | A1 * | 1/2006 | Goel | A61K 41/00 435/6.12 |
| 2007/0259418 | A1 * | 11/2007 | Kim | G01N 27/3278 435/287.2 |
| 2015/0111256 | A1 | 4/2015 | Church et al. | |
| 2017/0136434 | A1 | 5/2017 | Barnard et al. | |
| 2018/0030529 | A1 | 2/2018 | Nashtaali et al. | |

FOREIGN PATENT DOCUMENTS

| | | | |
|---|---|---|---|
| WO | 2017201198 | A1 | 11/2017 |
| WO | 2021127357 | A2 | 6/2021 |
| WO | 2022072275 | A1 | 4/2022 |

* cited by examiner

*Primary Examiner* — Robert T. Crow

(74) *Attorney, Agent, or Firm* — Dierker & Kavanaugh, P.C.

(57) ABSTRACT

An example of a flow cell includes a substrate and a reaction area defined in or over the substrate. The reaction area includes two angularly offset and non-perpendicular surfaces relative to a planar surface of the substrate, a polymeric hydrogel positioned over at least a portion of each of the two angularly offset and non-perpendicular surfaces; a first primer set attached to the polymeric hydrogel that is positioned over the portion of a first of the two angularly offset and non-perpendicular surfaces; and a second primer set attached to the polymeric hydrogel that is positioned over the portion of a second of the two angularly offset and non-perpendicular surfaces, wherein the first and second primer sets are orthogonal.

8 Claims, 14 Drawing Sheets

Specification includes a Sequence Listing.

16
26
24A
44'
24B
20
18

70
20
18

28A
70
24B
20
18

72, 72"
28A
70
72, 72'
24A
20
18

28A
70
24B
72'
24A
20
18

26
24B
72'
28A
20
24A
18

28B
72'
28A
20
18

28B
28A
20
18

26
28B
22
28A
20
18

SEQUENCE LISTING

```
Sequence total quantity: 12
SEQ ID NO: 1           moltype = DNA  length = 29
FEATURE                Location/Qualifiers
source                 1..29
                       mol_type = other DNA
                       organism = synthetic construct
modified_base          23
                       mod_base = OTHER
                       note = uracil
SEQUENCE: 1
aatgatacgg cgaccaccga gatctacac                            29

SEQ ID NO: 2           moltype = DNA  length = 24
FEATURE                Location/Qualifiers
source                 1..24
                       mol_type = other DNA
                       organism = synthetic construct
modified_base          22
                       mod_base = OTHER
                       note = 8-oxoguanine
SEQUENCE: 2
caagcagaag acggcatacg anat                                 24

SEQ ID NO: 3           moltype = DNA  length = 24
FEATURE                Location/Qualifiers
source                 1..24
                       mol_type = other DNA
                       organism = synthetic construct
modified_base          20
                       mod_base = OTHER
                       note = 8-oxoguanine
SEQUENCE: 3
caagcagaag acggcatacn agat                                 24

SEQ ID NO: 4           moltype = DNA  length = 24
FEATURE                Location/Qualifiers
source                 1..24
                       mol_type = other DNA
                       organism = synthetic construct
modified_base          22
                       mod_base = OTHER
                       note = uracil
SEQUENCE: 4
caagcagaag acggcatacg atat                                 24

SEQ ID NO: 5           moltype = DNA  length = 24
FEATURE                Location/Qualifiers
source                 1..24
                       mol_type = other DNA
                       organism = synthetic construct
modified_base          20
                       mod_base = OTHER
```

-continued

```
                        note = uracil
SEQUENCE: 5
caagcagaag acggcatact agat                                            24

SEQ ID NO: 6            moltype = DNA  length = 29
FEATURE                 Location/Qualifiers
source                  1..29
                        mol_type = other DNA
                        organism = synthetic construct
modified_base           23
                        mod_base = OTHER
                        note = allyl-T
SEQUENCE: 6
aatgatacgg cgaccaccga ganctacac                                       29

SEQ ID NO: 7            moltype = DNA  length = 35
FEATURE                 Location/Qualifiers
source                  1..35
                        mol_type = other DNA
                        organism = synthetic construct
SEQUENCE: 7
gctggcacgt ccgaacgctt cgttaatccg ttgag                                35

SEQ ID NO: 8            moltype = DNA  length = 35
FEATURE                 Location/Qualifiers
source                  1..35
                        mol_type = other DNA
                        organism = synthetic construct
SEQUENCE: 8
cgtcgtctgc catggcgctt cggtggatat gaact                                35

SEQ ID NO: 9            moltype = DNA  length = 35
FEATURE                 Location/Qualifiers
source                  1..35
                        mol_type = other DNA
                        organism = synthetic construct
SEQUENCE: 9
acggccgcta atatcaacgc gtcgaatccg caact                                35

SEQ ID NO: 10           moltype = DNA  length = 34
FEATURE                 Location/Qualifiers
source                  1..34
                        mol_type = other DNA
                        organism = synthetic construct
SEQUENCE: 10
gccgcgttac gttagccgga ctattcgatg cagc                                 34

SEQ ID NO: 11           moltype = DNA  length = 24
FEATURE                 Location/Qualifiers
source                  1..24
                        mol_type = other DNA
                        organism = synthetic construct
SEQUENCE: 11
aggaggagga ggaggaggag gagg                                            24

SEQ ID NO: 12           moltype = DNA  length = 24
FEATURE                 Location/Qualifiers
source                  1..24
                        mol_type = other DNA
                        organism = synthetic construct
SEQUENCE: 12
cctcctcctc ctcctcctcc tcct                                            24
```

FLOW CELLS AND METHODS FOR MAKING THE SAME

CROSS REFERENCE TO RELATED APPLICATION

This application claims the benefit of U.S. Provisional Application Ser. No. 63/378,020, filed Sep. 30, 2022, the contents of which is incorporated by reference herein in its entirety.

REFERENCE TO SEQUENCE LISTING

The instant application contains a Sequence Listing which has been submitted electronically in XML file format and is hereby incorporated by reference in its entirety. Said XML copy, created on Sep. 11, 2023, is named ILI245B_IP-2366-US_Sequence_Listing.xml and is 14,859 bytes in size.

BACKGROUND

Some available platforms for sequencing nucleic acids utilize a sequencing-by-synthesis approach. With this approach, a nascent strand is synthesized, and the addition of each monomer (e.g., nucleotide) to the growing strand is detected optically and/or electronically. Because a template strand directs synthesis of the nascent strand, one can infer the sequence of the template DNA from the series of nucleotide monomers that were added to the growing strand during the synthesis. In some examples, sequential paired-end sequencing may be used, where forward strands are sequenced and removed, and then reverse strands are constructed and sequenced. In other examples, simultaneous paired-end sequencing may be used, where forward strands and reverse strands are sequenced at the same time.

SUMMARY

For simultaneous paired-end sequencing, different primer sets are attached to different regions within a depression and/or on a protrusion of a flow cell surface. In some of the examples set forth herein, the geometry of the depression or protrusion is a triangular prism, and the different primer sets are respectively attached to the slanted surfaces of the triangular prism. During optical imaging, the positioning of the primer sets improves the signal integrity because the signals from one region do not deleteriously affect the signals from another region. Several methods are described herein to place the primers sets in the desired regions.

For sequential paired-end sequencing, a primer set includes a pair of primers that together enable the amplification of a template nucleic acid strand. Typically, the pair of primers is intermingled within a depression and/or on a protrusion of a flow cell surface. In one of the examples disclosed herein, the primer set is attached to a surface of a triangular prism that is opposed to a reflective and slanted surface of an adjacent triangular prism. The facing primers and reflective surface form an active pair, and the reflective surface enhances the signals from the primers of the active pair during optical imaging.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 4A depicts a depressed triangular prism, FIG. 4B depicts the angled deposition of a sacrificial layer on one surface of the depressed triangular prism, FIG. 4C depicts the deposition of a first functionalized layer/polymeric hydrogel, FIG. 4D depicts the removal of the sacrificial layer, FIG. 4E depicts the selective deposition of a second functionalized layer/polymeric hydrogel, and FIG. 4F depicts the removal of the functionalized layers from interstitial regions;

FIG. 5A depicts a depressed triangular prism, FIG. 5B depicts the angled deposition of a sacrificial layer on one surface of the depressed triangular prism, FIG. 5C depicts the deposition of a first functionalized layer/polymeric hydrogel, FIG. 5D depicts the deposition of a photoresist, FIG. 5E depicts the insoluble photoresist after development, FIG. 5F depicts removal of the sacrificial layer, FIG. 5G depicts the deposition of a second functionalized layer/polymeric hydrogel, FIG. 5H depicts the removal of the insoluble photoresist, and FIG. 5I depicts the removal of the functionalized layers from interstitial regions;

FIG. 6A depicts a mask layer over a substrate, FIG. 6B depicts the formation of a through-hole in the mask layer, FIG. 6C depicts a depressed triangular prism formed in the substrate by etching through the through-hole, FIG. 6D depicts the angled deposition of a sacrificial layer on a surface of the depressed triangular prism, FIG. 6E depicts the removal of the mask layer, FIG. 6F depicts the deposition of a first functionalized layer/polymeric hydrogel, FIG. 6G depicts the removal of the sacrificial layer, FIG. 6H depicts the selective deposition of a second functionalized layer/polymeric hydrogel, and FIG. 6I depicts the removal of the functionalized layers from interstitial regions;

FIG. 7A depicts a mask layer over a substrate, FIG. 7B depicts the formation of a through-hole in the mask layer, FIG. 7C depicts a depressed triangular prism formed in the substrate by etching through the through-hole, FIG. 7D depicts the angled deposition of a sacrificial layer on a surface of the depressed triangular prism, FIG. 7E depicts the deposition of respective functionalized layers/polymeric hydrogels on opposed surfaces of the depressed triangular prism, and FIG. 7F depicts the removal of the mask layer;

FIG. 8A depicts a triangular prism formed over a base support, FIG. 8B depicts a sacrificial layer deposited over the triangular prism, FIG. 8C depicts the partial removal of the sacrificial layer, FIG. 8D depicts the angled deposition of another sacrificial layer on a surface of the triangular prism, FIG. 8E depicts the deposition of a first functionalized layer/polymeric hydrogel, FIG. 8F depicts the removal of the other sacrificial layer, FIG. 8G depicts the selective deposition of a second functionalized layer/polymeric hydrogel, and FIG. 8H depicts the removal of the sacrificial layer;

FIG. 9A depicts a stack of materials, FIG. 9B depicts a triangular prism formed in a top layer of the stack, FIG. 9C depicts the formation of a post in a middle layer of the stack, FIG. 9D depicts the angled deposition of a sacrificial layer on a surface of the triangular prism and an exposed portion of a base support of the stack, FIG. 9E depicts the deposition of a first functionalized layer/polymeric hydrogel, FIG. 9F depicts the removal of the sacrificial layer, and FIG. 9G depicts the selective deposition of the second functionalized layer/polymeric hydrogel;

FIG. 9A through FIG. 9C and FIG. 9H through FIG. 9J together schematically depict yet another example method, where FIG. 9A depicts a stack of materials, FIG. 9B depicts a triangular prism formed in a top layer of the stack, FIG. 9C depicts the formation of a post in a middle layer of the stack, FIG. 9H depicts the angled deposition of a precursor adhesive component, FIG. 9I depicts the selective deposition of a first functionalized layer/polymeric hydrogel, and FIG. 9J depicts the activation of the precursor adhesive component and the selective adhesion of the second functionalized layer/polymeric hydrogel to the activated adhesive component;

FIG. 10A schematically depicts an array formed by either of the methods shown in FIG. 9A through FIG. 9J;

FIG. 10B depicts a top view of one example of the signals obtained using the array of FIG. 10A;

FIG. 10C depicts a top view of another example of the signals obtained using the array of FIG. 10A;

FIG. 11A depicts a substrate with multiple right triangular prisms, FIG. 11B depicts the angled deposition of a sacrificial layer on the slanted surfaces of the right triangular prisms, FIG. 11C depicts a functionalized layer/polymeric hydrogel, and FIG. 11D depicts the removal of the sacrificial layer;

FIG. 14A depicts a depression formed in a stack of materials, FIG. 14B depicts the angled deposition of a sacrificial layer on a portion of the depression, FIG. 14C depicts the selective deposition of a first functionalized layer/polymeric hydrogel, FIG. 14D depicts the removal of the sacrificial layer, FIG. 14E depicts the selective deposition of a second functionalized layer/polymeric hydrogel, and FIG. 14F depicts the removal of the one layer of the stack;

FIG. 15A depicts a depression formed in a stack of materials, FIG. 15B depicts the etching of the stack such that the depression is extended, FIG. 15C depicts the angled deposition of a sacrificial layer on a portion of the depression, FIG. 15D depicts the selective deposition of a first functionalized layer/polymeric hydrogel, FIG. 15E depicts the removal of the sacrificial layer, FIG. 15F depicts the selective deposition of a second functionalized layer/polymeric hydrogel, and FIG. 15G depicts the removal of the some of the layers of the stack; FIG. 16A depicts a multi-depth depression formed in a stack of materials, FIG. 16B depicts the angled deposition of a metal film of a surface of the multi-depth depression, FIG. 16C depicts the deposition of a first functionalized layer/polymeric, FIG. 16D depicts an insoluble photoresist, FIG. 16E depicts an etched back insoluble photoresist and an exposed portion of the multi-depth depression, FIG. 16F depicts the deposition of a second functionalized layer/polymeric hydrogel, FIG. 16G depicts the removal of the etched back insoluble photoresist, FIG. 16H depicts the removal of the metal film, and FIG. 16I depicts the removal of the functionalized layers from interstitial regions.

DETAILED DESCRIPTION

Figures 1, 2A, 2B, 2C, 2D, 2E, 2F:
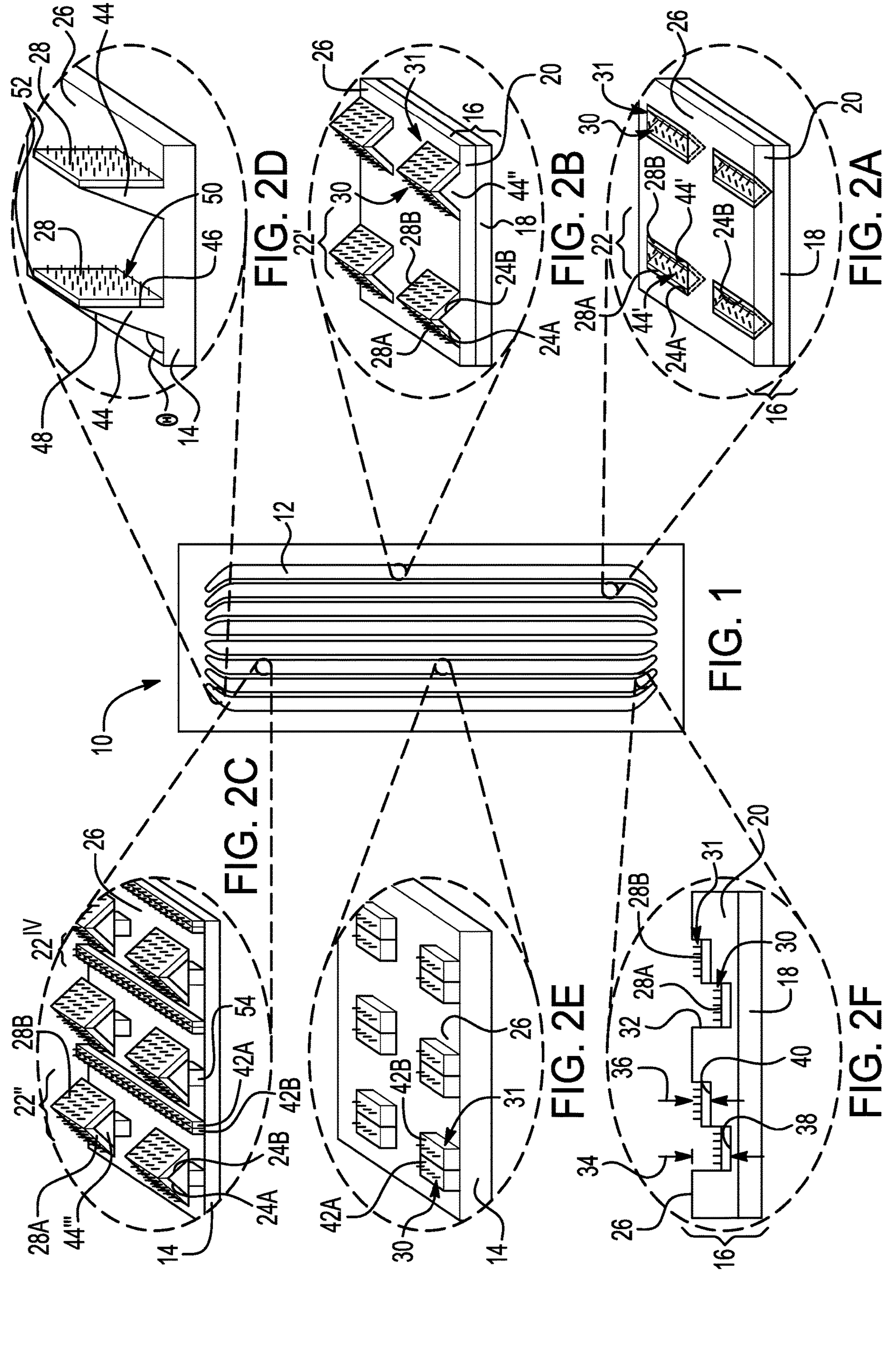
FIG. 1 is a top view of an example flow cell.
FIG. 2A is an enlarged, partially cutaway, and perspective view of an example of the architecture within a flow channel of the flow cell.
FIG. 2B is an enlarged, partially cutaway, and perspective view of another example of the architecture within a flow channel of the flow cell.
FIG. 2C is an enlarged, partially cutaway, and perspective view of yet another example of the architecture within a flow channel of the flow cell.
FIG. 2D is an enlarged, partially cutaway, and perspective view of still another example of the architecture within a flow channel of the flow cell.
FIG. 2E is an enlarged, partially cutaway, and perspective view of a further example of the architecture within a flow channel of the flow cell.
FIG. 2F is an enlarged, cross-sectional view of an example of the architecture within a flow channel of the flow cell.

Examples of the flow cells disclosed herein may be used for sequencing, examples of which include sequential paired-end nucleic acid sequencing or simultaneous paired-end nucleic acid sequencing. In several of the examples disclosed herein, the flow cells include an array of triangular prisms that support the primer set(s).

For sequential paired-end sequencing, a single primer set is attached to a vertically oriented surface of a triangular prism, i.e., perpendicular with respect to a planar surface of the flow cell substrate. The vertically oriented surface, and thus the primers attached thereto, faces a reflective and slanted surface of an adjacent triangular prism that enhances the signals during sequential paired-end sequencing. For sequential paired-end sequencing, the primers in the primer set include orthogonal cleaving (linearization) chemistry that enables forward strands to be generated, sequenced, and then removed, and then enables reversed strands to be generated, sequenced, and then removed. In these examples, orthogonal cleaving chemistry may be realized through different cleavage sites that are attached to the different primers in the set.

For simultaneous paired-end sequencing, two primer sets are respectively attached to i) the slanted surfaces of a triangular prism, i.e., surfaces that are angularly offset and non-perpendicular with respect to a planar surface of the flow cell substrate or ii) the offset surfaces of a multi-level depression. In these examples, the positioning of the primer sets improves the signal integrity because the signals from one surface do not deleteriously affect the signals from another surface. For simultaneous paired-end sequencing, the primer sets are controlled so that the cleaving (linearization) chemistry is orthogonal at the different surface. In these examples, orthogonal cleaving chemistry may be realized through identical or different cleavage sites that are attached to different primers in the different sets. This enables a cluster of forward strands to be generated in one region and a cluster of reverse strands to be generated in another region. The slanted surfaces of the triangular prism and the offset surfaces of the multi-depth depression keep the forward and reverse strands spatially separate, which separates the fluorescence signals from both reads while allowing for simultaneous base calling of each read.

Definitions

It is to be understood that terms used herein will take on their ordinary meaning in the relevant art unless specified otherwise. Several terms used herein and their meanings are set forth below.

The singular forms “a”, “an”, and “the” include plural referents unless the context clearly dictates otherwise.

The terms comprising, including, containing and various forms of these terms are synonymous with each other and are meant to be equally broad.

The terms top, bottom, lower, upper, on, etc. are used herein to describe the flow cell and/or the various components of the flow cell. It is to be understood that these directional terms are not meant to imply a specific orientation, but are used to designate relative orientation between components. The use of directional terms should not be interpreted to limit the examples disclosed herein to any specific orientation(s).

The terms first, second, etc. also are not meant to imply a specific orientation or order, but rather are used to distinguish one component from another.

It is to be understood that the ranges provided herein include the stated range and any value or sub-range within the stated range, as if such values or sub-ranges were explicitly recited. For example, a range of about 400 nm to about 1 μm (1000 nm), should be interpreted to include not only the explicitly recited limits of about 400 nm to about 1 μm, but also to include individual values, such as about 708 nm, about 945.5 nm, etc., and sub-ranges, such as from about 425 nm to about 825 nm, from about 550 nm to about 940 nm, etc. Furthermore, when “about” and/or “substantially” are/is utilized to describe a value, they are meant to encompass minor variations (up to +/−10%) from the stated value.

An “acrylamide monomer” is a monomer with the structure

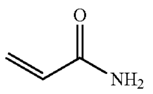

or a monomer including an acrylamide group. Examples of the monomer including an acrylamide group include azido acetamido pentyl acrylamide:

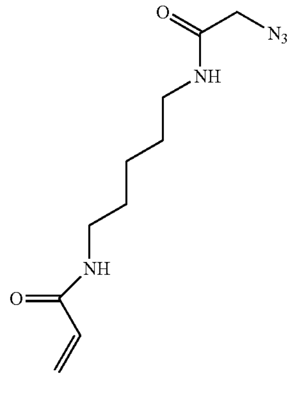 [SMILES: C=CC(=O)NCCCCCNC(=O)CN=[N+]=[N-]]

and N-isopropylacrylamide:

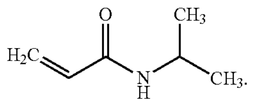

Other acrylamide monomers may be used.

The term “activation,” as used herein, refers to a process that generates reactive groups at the surface of a single layer substrate or an outermost layer of a multi-layered substrate. Activation may be accomplished using silanization or plasma ashing. While the figures do not depict a separate silanized layer or —OH groups from plasma ashing, it is to be understood that activation generates a silanized layer or —OH groups at the surface of the activated support or layer to covalently attach the functionalized layers to the underlying support or layer. Additionally, in any of the example methods, it is to be understood that if the substrate does not inherently include the reactive groups, e.g., to covalently attach the polymeric hydrogel/functionalized layer, a suitable activation process is performed prior to the deposition of any of the polymeric hydrogels/functionalized layers.

An “active pair” refers to a vertically oriented surface of one triangular prism that has a primer set attached thereto and that faces a reflective and angled surface of an adjacent triangular prism. The reflective surface may amplify the excitation light that is directed toward a cluster of amplicons attached to the primers of the primer set. The reflective surface may also or alternatively amplify the emission signal(s) emitted from the cluster of amplicons during sequencing.

An “aldehyde,” as used herein, is an organic compound containing a functional group with the structure —CHO, which includes a carbonyl center (i.e., a carbon double-bonded to oxygen) with the carbon atom also bonded to hydrogen and an R group, such as an alkyl or other side chain. The general structure of an aldehyde is:

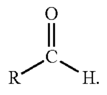

As used herein, “alkyl” refers to a straight or branched hydrocarbon chain that is fully saturated (i.e., contains no double or triple bonds). The alkyl group may have 1 to 20 carbon atoms. Example alkyl groups include methyl, ethyl, propyl, isopropyl, butyl, isobutyl, tertiary butyl, pentyl, hexyl, and the like. As an example, the designation "C1-4 alkyl" indicates that there are one to four carbon atoms in the alkyl chain, i.e., the alkyl chain is selected from the group consisting of methyl, ethyl, propyl, iso-propyl, n-butyl, isobutyl, sec-butyl, and t-butyl.

As used herein, "alkenyl" refers to a straight or branched hydrocarbon chain containing one or more double bonds. The alkenyl group may have 2 to 20 carbon atoms. Example alkenyl groups include ethenyl, propenyl, butenyl, pentenyl, hexenyl, and the like.

As used herein, "alkyne" or "alkynyl" refers to a straight or branched hydrocarbon chain containing one or more triple bonds. The alkynyl group may have 2 to 20 carbon atoms.

As used herein, "aryl" refers to an aromatic ring or ring system (i.e., two or more fused rings that share two adjacent carbon atoms) containing only carbon in the ring backbone. When the aryl is a ring system, every ring in the system is aromatic. The aryl group may have 6 to 18 carbon atoms. Examples of aryl groups include phenyl, naphthyl, azulenyl, and anthracenyl.

An "amine" or "amino" functional group refers to an $-NR_aR_b$ group, where $R_a$ and $R_b$ are each independently selected from hydrogen (e.g.,

),

C1-6 alkyl, C2-6 alkenyl, C2-6 alkynyl, C3-7 carbocycle, C6-10 aryl, 5-10 membered heteroaryl, and 5-10 membered heterocyclyl, as defined herein.

The phrase "angularly offset and non-perpendicular surface" refers to a surface of a protruding triangular prism that is slanted at an angle that is greater than 0° and less than 90° or greater than 90° and less than 180° relative to a planar surface of a substrate over which the protruding triangular prism is formed, or a surface of a depressed triangular prism that is slanted at an angle that is greater than 180° and less than 270° or greater than 270° and less than 360° relative to a planar surface of a substrate in which the depressed triangular prism is formed.

As used herein, the term "attached" refers to the state of two things being joined, fastened, adhered, connected or bound to each other, either directly or indirectly. For example, a nucleic acid can be attached to a functionalized polymer by a covalent or non-covalent bond. A covalent bond is characterized by the sharing of pairs of electrons between atoms. A non-covalent bond is a physical bond that does not involve the sharing of pairs of electrons and can include, for example, hydrogen bonds, ionic bonds, van der Waals forces, hydrophilic interactions and hydrophobic interactions.

An "azide" or "azido" functional group refers to $-N_3$.

As used herein, a "bonding region" refers to an area of a patterned structure that is to be bonded to another material, which may be, as examples, a spacer layer, a lid, another patterned structure, etc., or combinations thereof (e.g., a spacer layer and a lid, or a spacer layer and another patterned structure). The bond that is formed at the bonding region may be a chemical bond (as described above), or a mechanical bond (e.g., using a fastener, etc.).

As used herein, "carbocycle" means a non-aromatic cyclic ring or ring system containing only carbon atoms in the ring system backbone. When the carbocycle is a ring system, two or more rings may be joined together in a fused, bridged or spiro-connected fashion. Carbocycles may have any degree of saturation, provided that at least one ring in a ring system is not aromatic. Thus, carbocycles include cycloalkyls, cycloalkenyls, and cycloalkynyls. The carbocycle group may have 3 to 20 carbon atoms. Examples of carbocycle rings include cyclopropyl, cyclobutyl, cyclopentyl, cyclohexyl, cyclohexenyl, 2,3-dihydro-indene, bicyclo[2.2.2]octanyl, adamantyl, and spiro[4.4]nonanyl.

As used herein, the term "carboxylic acid" or "carboxyl" refers to —COOH.

As used herein, "cycloalkylene" means a fully saturated carbocycle ring or ring system that is attached to the rest of the molecule via two points of attachment.

As used herein, "cycloalkenyl" or "cycloalkene" means a carbocycle ring or ring system having at least one double bond, wherein no ring in the ring system is aromatic. Examples include cyclohexenyl or cyclohexene and norbornenyl or norbornene. Also as used herein, "heterocycloalkenyl" or "heterocycloalkene" means a carbocycle ring or ring system with at least one heteroatom in ring backbone, having at least one double bond, wherein no ring in the ring system is aromatic.

As used herein, "cycloalkynyl" or "cycloalkyne" means a carbocycle ring or ring system having at least one triple bond, wherein no ring in the ring system is aromatic. An example is cyclooctyne. Another example is bicyclononyne. Also as used herein, "heterocycloalkynyl" or "heterocycloalkyne" means a carbocycle ring or ring system with at least one heteroatom in ring backbone, having at least one triple bond, wherein no ring in the ring system is aromatic.

The term "depositing," as used herein, refers to any suitable application technique, which may be manual or automated, and, in some instances, results in modification of the surface properties. Generally, depositing may be performed using vapor deposition techniques, coating techniques, grafting techniques, or the like. Some specific examples include chemical vapor deposition (CVD), spray coating (e.g., ultrasonic spray coating), spin coating, dunk or dip coating, doctor blade coating, puddle dispensing, flow through coating, aerosol printing, screen printing, microcontact printing, inkjet printing, or the like.

The term "each," when used in reference to a collection of items, is intended to identify an individual item in the collection, but does not necessarily refer to every item in the collection. Exceptions can occur if explicit disclosure or context clearly dictates otherwise.

The term "epoxy" (also referred to as a glycidyl or oxirane group) as used herein refers to

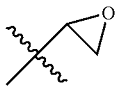 or 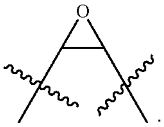.

As used herein, the term "flow cell" is intended to mean a vessel having a flow channel where a reaction can be carried out. In some instances, the flow cell is an open wafer, and the flow channel is open to the external environment. In other instances, the flow cell is enclosed, and further includes an inlet for delivering reagent(s) to the flow channel, and an outlet for removing reagent(s) from the flow channel. In some examples, the flow cell accommodates the detection of the reaction that occurs in the flow cell. For example, the flow cell can include one or more transparent surfaces allowing for the optical detection of arrays, optically labeled molecules, or the like.

As used herein, a "flow channel" or "channel" may be an area defined in an open wafer or between two bonded components, which can selectively receive a liquid sample. In some examples, the flow channel may be defined between two patterned structures, and thus may be in fluid communication with surface chemistry of the patterned structures. In other examples, the flow channel may be defined between a patterned structure and a lid, and thus may be in fluid communication with surface chemistry of the patterned structures. In still other examples, the flow channel is defined in a substrate and is open to the external environment.

As used herein, the terms "functionalized layer" and "functionalized layer pad" and "polymeric hydrogel" refer to a gel material that is applied over at least a portion of a flow cell substrate. The gel material includes functional group(s) that can attach to primer(s). In some examples, the functionalized layer/polymeric hydrogel is positioned over all or a portion of the angularly offset and non-perpendicular surfaces of a triangular prism. In other examples, the functionalized layer/polymeric hydrogel is positioned on all or a portion of the bottom surfaces in the deep and shallow portions of a multi-depth depression. In still other examples, the functionalized layer pad sits on, and thus appears to protrude from, a substantially flat substrate surface. The terms "functionalized layer" and "polymeric hydrogel" also refer to the gel material that is applied over all or a portion of the substrate, and that is exposed to further processing to define the final layer or pad.

As used herein, "heteroaryl" refers to an aromatic ring or ring system (i.e., two or more fused rings that share two adjacent atoms) that contain(s) one or more heteroatoms, that is, an element other than carbon, including but not limited to, nitrogen, oxygen and sulfur, in the ring backbone. When the heteroaryl is a ring system, every ring in the system is aromatic. The heteroaryl group may have 5-18 ring members.

As used herein, "heterocycle" means a non-aromatic cyclic ring or ring system containing at least one heteroatom in the ring backbone. Heterocycles may be joined together in a fused, bridged or spiro-connected fashion. Heterocycles may have any degree of saturation provided that at least one ring in the ring system is not aromatic. In the ring system, the heteroatom(s) may be present in either a non-aromatic or aromatic ring. The heterocycle group may have 3 to 20 ring members (i.e., the number of atoms making up the ring backbone, including carbon atoms and heteroatoms). In some examples, the heteroatom(s) are O, N, or S.

The term "hydrazine" or "hydrazinyl" as used herein refers to a —$NHNH_2$ group.

As used herein, the term "hydrazone" or "hydrazonyl" as used herein refers to a

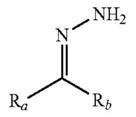

group in which $R_a$ and $R_b$ are each independently selected from hydrogen, C1-6 alkyl, C2-6 alkenyl, C2-6 alkynyl, C3-7 carbocycle, C6-10 aryl, 5-10 membered heteroaryl, and 5-10 membered heterocyclyl, as defined herein.

As used herein, "hydroxy" or "hydroxyl" refers to an —OH group.

As used herein, the term "interstitial region" refers to an area, e.g., of a substrate that separates features, e.g., protruding or depressing triangular prisms, multi-depressions (concave regions), or functionalized layer pads. For example, an interstitial region can separate one protruding triangular prism of an array from another protruding triangular prism of the array. The two features that are separated from each other are discrete, i.e., lacking physical contact with each other. In many examples, the interstitial region is continuous, except where the features are formed. Interstitial regions may have a surface material that differs from the surface material of the features. For example, a protruding triangular prism can have a functionalized layer and primer set(s) attached to its angularly offset and non-perpendicular surfaces, and the interstitial regions can be free of functionalized layer and primer set(s). In the examples disclosed herein, the planar surface of the substrate defines the interstitial regions.

As used herein, the term "multi-depth depression" refers to a discrete concave feature defined in a resin layer that includes a deep portion and a shallow portion that is adjacent to the deep portion. The multi-depth depression can have any of a variety of shapes at its opening including, as examples, round, elliptical, square, polygonal, star shaped (with any number of vertices), etc. The cross-section of a multi-depression taken orthogonally with the surface can be curved, square, polygonal, hyperbolic, conical, angular, etc.

As used herein, a "negative photoresist" refers to a light sensitive material in which a portion that is exposed to light of particular wavelength(s) becomes insoluble to a developer. In these examples, the insoluble negative photoresist has less than 5% solubility in the developer. With the negative photoresist, the light exposure changes the chemical structure so that the exposed portions of the material become less soluble (than non-exposed portions) in the developer. While not soluble in the developer, the insoluble negative photoresist may be at least 99% soluble in a remover that is different from the developer. The remover may be a solvent or solvent mixture used, e.g., in a lift-off process.

In contrast to the insoluble negative photoresist, any portion of the negative photoresist that is not exposed to light is at least 95% soluble in the developer. In some examples, the portion of the negative photoresist not exposed to light is at least 98%, e.g., 99%, 99.5%, 100%, soluble in the developer.

"Nitrile oxide," as used herein, means a "$R_aC{\equiv}N^+O^-$" group in which $R_a$ is defined herein. Examples of preparing nitrile oxide include in situ generation from aldoximes by treatment with chloramide-T or through action of a base on imidoyl chlorides [RC(Cl)=NOH] or from the reaction between hydroxylamine and an aldehyde.

"Nitrone," as used herein, means a

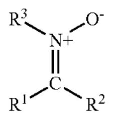

group in which $R^1$, $R^2$, and $R^3$ may be any of the $R_a$ and $R_b$ groups defined herein, except that $R^3$ is not hydrogen (H).

As used herein, a "nucleotide" includes a nitrogen containing heterocyclic base, a sugar, and one or more phosphate groups. Nucleotides are monomeric units of a nucleic acid sequence. In RNA, the sugar is a ribose, and in DNA, the sugar is a deoxyribose, i.e., a sugar lacking a hydroxyl group that is present at the 2' position in ribose. The nitrogen containing heterocyclic base (i.e., nucleobase) can be a purine base or a pyrimidine base. Purine bases include adenine (A) and guanine (G), and modified derivatives or analogs thereof. Pyrimidine bases include cytosine (C), thymine (T), and uracil (U), and modified derivatives or analogs thereof. The C-1 atom of deoxyribose is bonded to N-1 of a pyrimidine or N-9 of a purine. A nucleic acid analog may have any of the phosphate backbone, the sugar, or the nucleobase altered. Examples of nucleic acid analogs include, for example, universal bases or phosphate-sugar backbone analogs, such as peptide nucleic acid (PNA).

The term “orthogonal,” as used herein in reference to cleaving chemistry or removal conditions, means that two components (e.g., primers, layers, etc.) are susceptible to different cleaving or removal agents, and thus one component is not affected by the cleaving agent or removal conditions of the other component, and vice versa. The term “orthogonal,” as used herein in reference to primer sets (e.g., those described in reference to FIG. 3A through FIG. 3D), means that the two primers in each set can amplify the same library template, but have cleavage sites on the opposite strands so that after cleaving is performed, forward strands remain in an area where one set is used for amplification, and reverse strands remain in an area where the other set is used for amplification.

In some examples, the term “over” may mean that one component or material is positioned directly on another component or material. When one is directly on another, the two are in contact with each other.

In other examples, the term “over” may mean that one component or material is positioned indirectly on another component or material. By indirectly on, it is meant that a gap or an additional component or material may be positioned between the two components or materials.

A “patterned structure” refers to a single layer base support that includes, or a multi-layer stack with a layer that includes, surface chemistry in a pattern, e.g., in depressions or otherwise positioned on the support or layer surface. The surface chemistry may include a functionalized layer and primers (e.g., used for library template capture and amplification). In some examples, the single layer base support or the layer of the multi-layer stack has been exposed to patterning techniques (e.g., etching, lithography, etc.) in order to generate the pattern for the surface chemistry. However, the term “patterned structure” is not intended to imply that such patterning techniques have to be used to generate the pattern. For example, a base support may be a substantially flat surface having a pattern of the functionalized layers thereon. The patterned structure may be generated via any of the methods disclosed herein.

As used herein, the term “polyhedral oligomeric silsesquioxane” refers to a chemical composition that is a hybrid intermediate (e.g., $RSiO_{1.5}$) between that of silica ($SiO_2$) and silicone ($R_2SiO$). An example of polyhedral oligomeric silsesquioxane may be that described in Kehagias et al., Microelectronic Engineering 86 (2009), pp. 776-778, which is incorporated by reference in its entirety. In an example, the composition is an organosilicon compound with the chemical formula $[RSiO_{3/2}]_n$, where the R groups can be the same or different. Example R groups for POSS include epoxy, azide/azido, a thiol, a poly(ethylene glycol), a norbornene, a tetrazine, acrylates, and/or methacrylates, or further, for example, alkyl, aryl, alkoxy, and/or haloalkyl groups.

As used herein, a “positive photoresist” refers to a light sensitive material in which a portion that is exposed to light of particular wavelength(s) becomes soluble to a developer. In these examples, any portion of the positive photoresist exposed to light is at least 95% soluble in the developer. In some examples, the portion of the positive photoresist exposed to light is at least 98%, e.g., 99%, 99.5%, 100%, soluble in the developer. With the positive photoresist, the light exposure changes the chemical structure so that the exposed portions of the material become more soluble (than non-exposed portions) in the developer.

In contrast to the soluble positive photoresist, any portion of the positive photoresist not exposed to light is insoluble (less than 5% soluble) in the developer. While not soluble in the developer, the insoluble positive photoresist may be at least 99% soluble in a remover that is different from the developer. In some examples, insoluble positive photoresist is at least 98%, e.g., 99%, 99.5%, 100%, soluble in the remover. The remover may be a solvent or solvent mixture used in a lift-off process.

As used herein, the “primer” is defined as a single stranded nucleic acid sequence (e.g., single strand DNA). Some primers, referred to herein as amplification primers, serve as a starting point for template amplification and cluster generation. Other primers, referred to herein as sequencing primers, serve as a starting point for DNA synthesis. The 5' terminus of the primer may be modified to allow a coupling reaction with a functional group of a polymer. The primer length can be any number of bases long and can include a variety of non-natural nucleotides. In an example, the sequencing primer is a short strand, ranging from 10 to 60 bases, or from 20 to 40 bases.

A “spacer layer,” as used herein, refers to a material that bonds two components together. In some examples, the spacer layer can be a radiation absorbing material that aids in bonding, or can be put into contact with a radiation absorbing material that aids in bonding.

The term “substrate” refers to the single layer base support or a multi-layer structure upon which surface chemistry is introduced.

The term “tantalum pentoxide” refers to the inorganic compound with the formula $Ta_2O_5$. This compound is transparent, having a transmittance ranging from about 0.25 (25%) to 1 (100%), to wavelengths ranging from about 0.35 μm (350 nm) to at least 1.8 μm (1800 nm). A “tantalum pentoxide base support” or “tantalum pentoxide layer” may comprise, consist essentially of, or consist of $Ta_2O_5$. In examples where it is desirable for the tantalum pentoxide base support or the tantalum pentoxide layer to transmit electromagnetic energy having any of these wavelengths, the base support or layer may consist of $Ta_2O_5$ or may comprise or consist essentially of $Ta_2O_5$ and other components that will not interfere with the desired transmittance of the base support or layer.

A “thiol” functional group refers to —SH.

As used herein, the terms “tetrazine” and “tetrazinyl” refer to six-membered heteroaryl group comprising four nitrogen atoms. Tetrazine can be optionally substituted.

“Tetrazole,” as used herein, refer to five-membered heterocyclic group including four nitrogen atoms. Tetrazole can be optionally substituted.

The term “transparent” refers to a material, e.g., in the form of a base support or layer, that is capable of transmitting a particular wavelength or range of wavelengths. For example, the material may be transparent to wavelength(s) that are used to chemically change a positive or negative photoresist. Transparency may be quantified using transmittance, i.e., the ratio of light energy falling on a body to that transmitted through the body. The transmittance of a transparent base support or a transparent layer will depend upon the thickness of the base support or layer, the wavelength of light, and the dosage of the light to which it is exposed. In the examples disclosed herein, the transmittance of the transparent base support or the transparent layer may range from 0.25 (25%) to 1 (100%). The material of the base support or layer may be a pure material, a material with some impurities, or a mixture of materials, as long as the resulting base support or layer is capable of the desired transmittance. Additionally, depending upon the transmittance of the base support or layer, the time for light exposure and/or the output power of the light source may be increased or decreased to deliver a suitable dose of light energy through the transparent base support and/or layer to achieve the desired effect (e.g., generating a soluble or insoluble photoresist).

A "vertically oriented surface" is the surface of a right triangular prism that is perpendicular to a planar surface of a substrate over which the right triangular prism is formed.

Flow Cells

A top view of the flow cell 10 is shown in FIG. 1.

In some examples, the flow cell 10 is an open wafer flow cell that includes one patterned structure whose surface is open to the external environment. In these examples, a flow channel 12 and the surface chemistry of the flow cell 10 are open to the external environment and thus are open to receive fluids.

In other examples, the flow cell 10 is an enclosed flow cell that includes two patterned structures bonded together or one patterned structure bonded to a lid. Between the two patterned structures or the one patterned structure and the lid is a flow channel 12. The example shown in FIG. 1 includes eight flow channels 12. While eight flow channels 12 are shown, it is to be understood that any number of flow channels 12 may be included in the flow cell 10 (e.g., a single flow channel 12, four flow channels 12, etc.). Each flow channel 12 may be isolated from each other flow channel 12 so that fluid introduced into a flow channel 12 does not flow into adjacent flow channel(s) 12. Some examples of the fluids introduced into the flow channel 12 may introduce reaction components (e.g., DNA sample, polymerases, sequencing primers, nucleotides, etc.), washing solutions, deblocking agents, etc.

Each flow channel 12 in an enclosed flow cell 10 is in fluid communication with an inlet and an outlet (not shown). The inlet and outlet of each flow channel 12 may be positioned at opposed ends of the flow cell 10. The inlets and outlets of the respective flow channels 12 may alternatively be positioned anywhere along the length and width of the flow channel 12 that enables desirable fluid flow.

The inlet allows fluids to be introduced into the flow channel 12, and the outlet allows fluid to be extracted from the flow channel 12. Each of the inlets and outlets is fluidly connected to a fluidic control system (including, e.g., reservoirs, pumps, valves, waste containers, and the like) which controls fluid introduction and expulsion.

The flow channel 12 may have any desirable shape. In an example, the flow channel 12 has a substantially rectangular configuration with curved ends (as shown in FIG. 1). The length of the flow channel 12 depends, in part, upon the size of the substrate upon which the patterned structure is formed. The width of the flow channel 12 depends, in part, upon the size of the substrate (e.g., 14 or 16, see FIG. 2A through FIG. 2F) upon which the patterned structure is formed, the desired number of flow channels 12, the desired space between adjacent channels 12, and the desired space at a perimeter of the patterned structure. The spaces between channels 12 and at the perimeter may be sufficient for attachment to a lid (not shown) or another patterned structure.

The height of the flow channel 12 can be as small as a monolayer thick when microcontact, aerosol, or inkjet printing is used to deposit a separate material (e.g., a spacer layer) that defines the side walls of the flow channel 12. For other examples, the height of the flow channel 12 can be about 1 μm, about 10 μm, about 50 μm, about 100 μm, or more. In an example, the height may range from about 10 μm to about 100 μm. In another example, the height may range from about 10 μm to about 30 μm. In still another example, the depth is about 5 μm or less. It is to be understood that the height of the flow channel 12 may be greater than, less than or between the values specified above.

The spacer layer used to attach a patterned structure and a lid or two patterned structures may be any material that will seal portions of the patterned structures together or portions of the patterned structure and the lid. As examples, the spacer layer may be an adhesive, a radiation-absorbing material that aids in bonding, or the like. In some examples, the spacer layer is the radiation-absorbing material, e.g., KAPTON® black. The patterned structure or the patterned structure and the lid may be bonded using any suitable technique, such as laser bonding, diffusion bonding, anodic bonding, eutectic bonding, plasma activation bonding, glass frit bonding, or others methods known in the art.

As mentioned, the flow channel 12 is at least partially defined by a patterned structure. Different examples of the patterned structures that may define at least one surface of the flow cell 10 are shown in FIG. 2A through FIG. 2F. The examples shown in FIG. 2A through FIG. 2C, FIG. 2E, and FIG. 2F may be used for simultaneous paired-end sequencing. The example shown in FIG. 2D may be used for sequential paired-end sequencing.

Some examples of the flow cell 10 suitable for simultaneous paired-end sequencing are shown in FIG. 2A through FIG. 2C. These examples include a substrate (reference numerals 14 or 16); and a reaction area 22, 22', 22" defined in or over the substrate 14 or 16, the reaction area 22, 22', 22" including two angularly offset and non-perpendicular surfaces 24A, 24B relative to a planar surface 26 of the substrate 14 or 16; a polymeric hydrogel 28A, 28B positioned over at least a portion of each of the two angularly offset and non-perpendicular surfaces 24A, 24B; a first primer set 30 attached to the polymeric hydrogel 28A that is positioned over the portion of a first of the two angularly offset and non-perpendicular surfaces 24A; and a second primer set 31 attached to the polymeric hydrogel 28B that is positioned over the portion of a second of the two angularly offset and non-perpendicular surfaces 24B, wherein the first and second primer sets 30, 31 are orthogonal. As illustrated in each of FIG. 2A through FIG. 2C, a plurality of the reaction areas 22, 22', 22" may be defined in or over the substrate 14 or 16; and interstitial regions of the planar surface 26 separate the individual reaction areas 22, 22', 22" from each other.

Another example of a flow cell 10 suitable for simultaneous paired-end sequencing is shown in FIG. 2F. This example includes a substrate 16; a multi-depth depression 32 defined in the substrate 16, the multi-depth depression 32 including a deep portion 34 adjacent to a shallow portion 36;

a first functionalized layer 28A having a first primer set 30 attached thereto, the first functionalized layer 28A being positioned over a bottom surface 38 in the deep portion 34 of the multi-depth depression 32; and a second functionalized layer 28B having a second primer set 31 attached thereto, the second functionalized layer 28B being positioned over a bottom surface 40 in the shallow portion 36 of the multi-depth depression 32.

Still another example of the flow cell 10 for simultaneous paired-end sequencing is depicted in FIG. 2E. This examples includes a substrate 14; a first functionalized layer pad 42A positioned on a portion of the substrate 14 and having a first primer set 30 attached thereto; and a second functionalized layer pad 42B positioned on another portion of the substrate 14 directly adjacent to the first functionalized layer pad 42A and having a second primer set 31 attached thereto.

An example of the flow cell 10 for sequential paired-end sequencing is shown in FIG. 2D. This example of the flow cell 10 includes a substrate 14 having a plurality of triangular prisms 44 defined therein, each of the plurality of triangular prisms 44 including a perpendicular surface 46 relative to a planar surface 26 of the substrate 14, and a reflective surface 48 that is angularly offset and non-perpendicular relative to the planar surface 26 of the substrate 14; a polymeric hydrogel 28 positioned over at least a portion of the perpendicular surface 46; and a primer set 50 attached to the polymeric hydrogel 28; wherein the plurality of triangular prisms 44 are arranged in rows; and wherein two adjacent triangular prisms in the rows form an active pair 52 when the perpendicular surface 46 of one of the two adjacent triangular prisms 44 faces the reflective surface 48 of another of the two adjacent triangular prisms 44.

Each example of the patterned structure includes a substrate 14 or 16. The substrate 14 is a single layer base support (as shown in FIG. 2C, FIG. 2D, and FIG. 2E). The substrate 16 is a multi-layered structure (as shown in FIG. 2A, FIG. 2B, and FIG. 2F).

Examples of suitable single layer base supports (i.e., substrate 14) include epoxy siloxane, glass, modified or functionalized glass, polymers (including acrylics, polystyrene and copolymers of styrene and other materials, polypropylene, polyethylene, polybutylene, polyurethanes, polytetrafluoroethylene (such as TEFLON® from Chemours), cyclic olefins/cyclo-olefin polymers (COP) (such as ZEONOR® from Zeon), polyimides, nylon (polyamides), etc.) ceramics/ceramic oxides, silica (i.e., silicon dioxide ($SiO_2$)), fused silica, or silica-based materials, aluminum silicate, silicon and modified silicon (e.g., boron doped p+ silicon), silicon nitride ($Si_3N_4$), tantalum pentoxide ($Ta_2O_5$) or other tantalum oxide(s) ($TaO_x$), hafnium oxide ($HfO_2$), carbon, metals, or the like. In some examples, the resins set forth herein may also be used as the single layer substrate 14. In the example shown in FIG. 2D, the single layer substrate 14 may be a reflective material that is capable of reflecting the light (e.g., both excitation and emission wavelengths) that is used in nucleic acid sequencing (e.g., ultraviolet light and visible light). Examples of reflective materials include aluminum and silver.

Examples of the multi-layered structure (i.e., substrate 16) include a base support 18 and at least one other layer 20 thereon. Any example of the single layer base support 14 may be used as the base support 18. The other layer 20 may be any material that can be etched or imprinted to form the angularly offset and non-perpendicular surfaces 24A, 24B, the triangular prisms 44, or the multi-depth depressions 32. Examples of the layer 20 include inorganic oxides, such as tantalum oxide (e.g., $Ta_2O_5$), aluminum oxide (e.g., $Al_2O_3$), silicon oxide (e.g., $SiO_2$), or hafnium oxide (e.g., $HfO_2$), or polymeric resins, such as a polyhedral oligomeric silsesquioxane based resin (e.g., POSS® from Hybrid Plastics), a non-polyhedral oligomeric silsesquioxane epoxy resin, a poly(ethylene glycol) resin, a polyether resin (e.g., ring opened epoxies), an acrylic resin, an acrylate resin, a methacrylate resin, an amorphous fluoropolymer resin (e.g., CYTOP® from Bellex), and combinations thereof.

In some examples, the substrate 14 or 16 (including both 18 and 20) is capable of transmitting the light that is used to pattern a photoresist (e.g., ultraviolet light) and that is used in nucleic acid sequencing (e.g., ultraviolet light and visible light). In these particular examples, suitable materials include siloxanes, glass, modified or functionalized glass, polymers (including acrylics, polystyrene and copolymers of styrene and other materials, polyethylene terephthalate (PET), polycarbonate, cyclic olefin copolymer (COC), and some polyamides), silica or silicon oxide (e.g., $SiO_2$), fused silica, silica-based materials, silicon nitride ($Si_3N_4$), resins, or the like. Examples of resins that can transmit UV light include inorganic oxides, such as tantalum pentoxide (e.g., $Ta_2O_5$) or other tantalum oxide(s) ($TaO_x$), aluminum oxide (e.g., $Al_2O_3$), silicon oxide (e.g., $SiO_2$), hafnium oxide (e.g., $HfO_2$), indium tin oxide, titanium dioxide, etc., or polymeric resins, such as a polyhedral oligomeric silsesquioxane based resin (e.g., POSS® from Hybrid Plastics), a non-polyhedral oligomeric silsesquioxane epoxy resin, a poly(ethylene glycol) resin, a polyether resin (e.g., ring opened epoxies), an acrylic resin, an acrylate resin, a methacrylate resin, an amorphous fluoropolymer resin (e.g., CYTOP® from Bellex), and combinations thereof.

In any of the examples set forth herein, the substrate 14 or the base support 18 may be a circular sheet, a panel, a wafer, a die etc. having a diameter ranging from about 2 mm to about 300 mm, e.g., from about 200 mm to about 300 mm, or may be a rectangular sheet, panel, wafer, die etc. having its largest dimension up to about 10 feet (~3 meters). As one example, a die may have a width ranging from about 0.1 mm to about 10 mm. While example dimensions have been provided, it is to be understood that the substrate 14 or the base support 18 may have any suitable dimensions.

Each example of the patterned structure includes an array of features, such as the triangular prisms 44, the reactions areas 22, 22', 22", the functionalized layer pads 42A, 42B, or the multi-depth depressions 32. Many different layouts of these features may be envisaged, including regular, repeating, and non-regular patterns. The triangular prisms 44 are arranged in one or more rows such that, within each row, the perpendicular surface 46 of one triangular prism 44 faces the reflective surface 48 of another triangular prism 44. Multiple rows of the triangular prisms 44 may be formed across the substrate 14, 16. In an example, the reactions areas 22, 22', 22", the functionalized layer pads 42A, 42B, or the multi-depth depressions 32 are disposed in a hexagonal grid for close packing and improved density. Other layouts for the reactions areas 22, 22', 22", the functionalized layer pads 42A, 42B, or the multi-depth depressions 32 may include, for example, rectilinear (rectangular) layouts, triangular layouts, and so forth. In some examples, the layout can be an x-y format in rows and columns. In some other examples, the layout or pattern can be a repeating arrangement of the reactions areas 22, 22', 22", the functionalized layer pads 42A, 42B, or the multi-depth depressions 32.

The layout for any of the features may be characterized with respect to the density (number) of the triangular prisms 44, the reactions areas 22, 22', 22", the functionalized layer pads 42A, 42B, or the multi-depth depressions 32 in a defined area. For example, the triangular prisms 44, the reactions areas 22, 22', 22", the functionalized layer pads 42A, 42B, or the multi-depth depressions 32 may be present at a density of approximately 2 million per $mm^2$. The density may be tuned to different densities including, for example, a density of about 100 per $mm^2$, about 1,000 per $mm^2$, about 0.1 million per $mm^2$, about 1 million per $mm^2$, about 2 million per $mm^2$, about 5 million per $mm^2$, about 10 million per $mm^2$, about 50 million per $mm^2$, or more, or less. It is to be further understood that the density can be between one of the lower values and one of the upper values selected from the ranges above, or that other densities (outside of the given ranges) may be used.

The layout of the triangular prisms 44, the reactions areas 22, 22', 22", the functionalized layer pads 42A, 42B, or the multi-depth depressions 32 may also or alternatively be characterized in terms of the average pitch, or the spacing from the center of one feature to the center of an adjacent feature (center-to-center spacing) or from the right edge of one feature to the left edge of an adjacent feature (edge-to-edge spacing). The pattern can be regular, such that the coefficient of variation around the average pitch is small, or the pattern can be non-regular in which case the coefficient of variation can be relatively large. In either case, the average pitch can be, for example, about 50 nm, about 0.15 μm, about 0.5 μm, about 1 μm, about 5 μm, about 10 μm, or more or less. The average pitch for a particular pattern of can be between one of the lower values and one of the upper values selected from the ranges above.

Each of the triangular prisms 44 shown in FIG. 2D is a right triangular prism having a height, a base, and sides that each individually range from about 50 nm to about 10 μm. The surface area of the vertical face (i.e., surface 46) and of the slanted face (i.e., surface 48) may each range from about $1\times10^{-3}$ $\mu m^2$ to about 100 $\mu m^2$. The angle Θ at which the surface 48 is slanted with respect to the planar surface 26 of the substrate 14 ranges from greater than 90° to less than 180°.

The size of each reaction area 22, 22', 22" may be characterized by the dimensions of the angularly offset and non-perpendicular surfaces 24A, 24B. These surfaces 24A, 24B are squares or rectangles, and thus can each be defined by their length and width. As examples, the length and the width of each angularly offset and non-perpendicular surface 24A, 24B can range from about 0.1 μm to about 100 μm, e.g., about 0.5 μm, about 1 μm, about 10 μm, or more, or less.

When the reaction area 22 is part of a depressed triangular prism 44' that extends into the substrate 16 from the planar surface 26, as shown in FIG. 2A, the reaction area 22 may also be characterized by the volume of the triangular prism 44'. For example, the volume can range from about $1\times10^{-3}$ $\mu m^3$ to about 100 $\mu m^3$, e.g., about $1\times10^{-2}$ $\mu m^3$, about 0.1 $\mu m^3$, about 1 $\mu m^3$, about 10 $\mu m^3$, or more, or less.

When the reaction area 22' is part of a triangular prism 44" that protrudes out from the planar surface 26, as shown in FIG. 2B, the reaction area 22' may also be characterized by the surface area of each angularly offset and non-perpendicular surface 24A, 24B. Alternatively, when the reaction area 22" is part of a triangular prism 44'" that is positioned over the substrate 14, as shown in FIG. 2C, the reaction area 22'" may also be characterized by the surface area of each angularly offset and non-perpendicular surface 24A, 24B. In either example, the surface area of each surface 24A, 24B can range from about $1\times10^{-3}$ $\mu m^2$ to about 100 $\mu m^2$, e.g., about $1\times10^{-2}$ $\mu m^2$, about 0.1 $\mu m^2$, about 1 $\mu m^2$, at least about 10 $\mu m^2$, or more, or less.

The depth and width of each depressed triangular prism 44' or the height and base of each protruding triangular prism 44" or of each triangular prism 44'" also contribute to the overall configuration of the reaction areas 22, 22', 22". The depth or height can range from about 0.1 μm to about 100 μm, e.g., about 0.5 μm, about 1 μm, about 10 μm, or more, or less. The width or base can also range from about 0.1 μm to about 100 μm, e.g., about 0.5 μm, about 1 μm, about 10 μm, or more, or less.

Referring specifically to the example shown in FIG. 2C, the triangular prism 44'" is positioned over the substrate 14. In this example, the triangular prism 44'" sits on a post 54, which sits on the substrate 14. As such, the post 54 supports the triangular prism 44'" a spaced distance from the planar surface 26 of the substrate 14. The height of the post 54, and thus the spaced distance from the planar surface 26 to the base of the triangular prism 44'", will depend upon the thickness of the layer used to form the post 54. The height of the post 54 may be large enough to reduce or eliminate pad hopping between the polymeric hydrogels/functionalized layers 28A, 28B and the immediately adjacent functionalized layer pads 42A, 42B. Pad hopping is the contamination of a cluster of amplicons of one library template in one reactive area with a different amplicon from another reactive area. In an example, the height of the post 54 can be 150 nm or more. In an example, the height may range from about 150 nm to about 10 μm, e.g., about 0.5 μm, about 2 μm, about 9 μm. In an example, the height of the post 54 may be about 0.3 μm.

The width of the post 54 is smaller than the base of the triangular prism 44'", but is large enough to support the triangular prism 44'". The width can be controlled by the etching process used to form the post 54. The length of the post 54 is the same length as the triangular prism 44'".

In FIG. 2C, the planar surface 26 of the substrate 14 defines an interstitial region adjacent to the post 54; and the flow cell 10 further comprises a first reactive pad 42A over the interstitial region at an area that underlies the first of the two angularly offset and non-perpendicular surfaces 24A, the first reactive pad 42A including the polymeric hydrogel 28A and primers of the first primer set 30; and a second reactive pad 42B over the interstitial region at an area that underlies the second of the two angularly offset and non-perpendicular surfaces 24B, the second reactive pad 42B including the polymeric hydrogel 28B and primers of the second primer set 31. These functionalized layer pads 42A, 42B are positioned over the substrate 14 and between rows of the triangular prisms 44'". These functionalized layer pads 42A, 42B are formed when the functionalized layers 28A, 28B are introduced onto the triangular prisms 44'" (see the description of FIG. 9A through FIG. 9J). The width of these pads 42A, 42B will depend upon the angle of the deposition technique used to deposit the materials and the dimensions of the exposed planar surface 26 between the triangular prisms 44'". The length of these pads 42A, 42B may extend along the length of the substrate 14 in the area where the triangular prisms 44'" are formed. These pads 42A, 42B provide additional reaction areas $22^{IV}$ across the flow cell 10.

In some examples of the architecture of FIG. 2C, an adhesive component (not shown) may be between the one of the two angularly offset and non-perpendicular surfaces 24A or 24B and the polymeric hydrogel 28A or 28B applied thereon. This will be further described in reference to FIG. 9H through FIG. 9J.

The size of each functionalized layer pad 42A, 42B shown in FIG. 2E may be characterized by its top surface area, height, and/or diameter or length and width. The top surface area can range from about $1\times10^{-3}$ μm$^2$ to about 100 μm$^2$, e.g., about $1\times10^{-2}$ μm$^2$, about 0.1 μm$^2$, about 1 μm$^2$, at least about 10 μm$^2$, or more, or less. The height can range from about 0.1 μm to about 100 μm, e.g., about 0.5 μm, about 1 μm, about 10 μm, or more, or less. The diameter or each of the length and the width can range from about 0.1 μm to about 100 μm, e.g., about 0.5 μm, about 1 μm, about 10 μm, or more, or less.

The size of each multi-depth depression 32 shown in FIG. 2F may be characterized by its volume, opening area, depths, and/or diameter or length and width. The volume can range from about $1\times10^{-3}$ μm$^3$ to about 100 μm$^3$, e.g., about $1\times10^{-2}$ μm$^3$, about 0.1 μm$^3$, about 1 μm$^3$, about 10 μm$^3$, or more, or less. The opening area can range from about $1\times10^{-3}$ μm$^2$ to about 100 μm$^2$, e.g., about $1\times10^{-2}$ μm$^2$, about 0.1 μm$^2$, about 1 μm$^2$, at least about 10 μm$^2$, or more, or less. The multi-depth depression 32 includes multiple depths, including the depth of the deep portion 34 and the depth of the shallow portion 36. Each of the depths is within the following ranges, with the caveat that the depth of the deep portion 34 is greater than the depth of the shallow portion 36. The depths may respectively range from about 0.1 μm to about 100 μm, e.g., about 0.5 μm, about 1 μm, about 10 μm, or more, or less. The diameter or each of the length and the width can range from about 0.1 μm to about 100 μm, e.g., about 0.5 μm, about 1 μm, about 10 μm, or more, or less.

Each of the architectures also includes the polymeric hydrogel/functionalized layer(s) 28 or 28A, 28B or the functionalized layer pads 42A, 42B. In each example, the polymeric hydrogel/functionalized layer(s) 28 or 28A, 28B or the functionalized layer pads 42A, 42B represent areas that have a primer set attached thereto. In the example shown in FIG. 2D, the primer set 50 includes two different primers that are used in sequential paired-end sequencing. In the example shown in FIG. 2A through FIG. 2C, FIG. 2E, and FIG. 2F, two different primer sets 30, 31 include four different primers that are used in simultaneous paired-end sequencing.

The polymeric hydrogel/functionalized layer(s) 28 or 28A, 28B or the functionalized layer pads 42A, 42B may be any gel material that can swell when liquid is taken up and that can contract when liquid is removed, e.g., by drying. In an example, the gel material is an acrylamide copolymer. Some examples of the acrylamide copolymer are represented by the following structure (I):

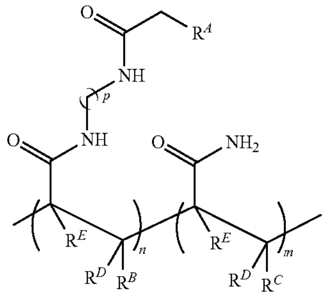

wherein:

$R^A$ is selected from the group consisting of azido, optionally substituted amino, optionally substituted alkenyl, optionally substituted alkyne, halogen, optionally substituted hydrazone, optionally substituted hydrazine, carboxyl, hydroxy, optionally substituted tetrazole, optionally substituted tetrazine, nitrile oxide, nitrone, sulfate, and thiol;

$R^B$ is H or optionally substituted alkyl;

$R^C$, $R^D$, and $R^E$ are each independently selected from the group consisting of H and optionally substituted alkyl;

each of the $-(CH_2)_p-$ can be optionally substituted;

p is an integer in the range of 1 to 50;

n is an integer in the range of 1 to 50,000; and m is an integer in the range of 1 to 100,000.

One specific example of the acrylamide copolymer represented by structure (I) is poly(N-(5-azidoacetamidylpentyl)acrylamide-co-acrylamide, PAZAM.

One of ordinary skill in the art will recognize that the arrangement of the recurring "n" and "m" features in structure (I) are representative, and the monomeric subunits may be present in any order in the polymer structure (e.g., random, block, patterned, or a combination thereof). The molecular weight of the acrylamide copolymer may range from about 5 kDa to about 1500 kDa or from about 10 kDa to about 1000 kDa, or may be, in a specific example, about 312 kDa.

In some examples, the acrylamide copolymer is a linear polymer. In some other examples, the acrylamide copolymer is a lightly cross-linked polymer.

In other examples, the gel material may be a variation of structure (I). In one example, the acrylamide unit may be replaced with N,N-dimethylacrylamide (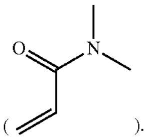).

In this example, the acrylamide unit in structure (I) may be replaced with

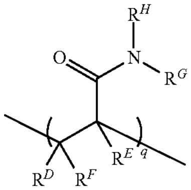

where $R^D$, $R^E$, and $R^F$ are each H or a C1-C6 alkyl, and $R^G$ and $R^H$ are each a C1-C6 alkyl (instead of H as is the case with the acrylamide). In this example, q may be an integer in the range of 1 to 100,000. In another example, the N,N-dimethylacrylamide may be used in addition to the acrylamide unit. In this example, structure (I) may include

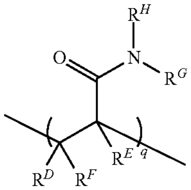

in addition to the recurring "n" and "m" features, where $R^D$, $R^E$, and $R^F$ are each H or a C1-C6 alkyl, and $R^G$ and $R^H$ are each a C1-C6 alkyl. In this example, q may be an integer in the range of 1 to 100,000.

As another example of the gel material, the recurring "n" feature in structure (I) may be replaced with a monomer including a heterocyclic azido group having structure (II):

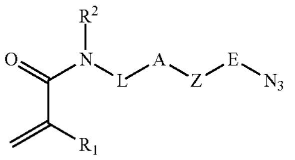

wherein $R^1$ is H or a C1-C6 alkyl; $R_2$ is H or a C1-C6 alkyl; L is a linker including a linear chain with 2 to 20 atoms selected from the group consisting of carbon, oxygen, and nitrogen and 10 optional substituents on the carbon and any nitrogen atoms in the chain; E is a linear chain including 1 to 4 atoms selected from the group consisting of carbon, oxygen and nitrogen, and optional substituents on the carbon and any nitrogen atoms in the chain; A is an N substituted amide with an H or a C1-C4 alkyl attached to the N; and Z is a nitrogen containing heterocycle. Examples of Z include 5 to 10 carbon-containing ring members present as a single cyclic structure or a fused structure. Some specific examples of Z include pyrrolidinyl, pyridinyl, or pyrimidinyl.

As still another example, the gel material may include a recurring unit of each of structure (III) and (IV):

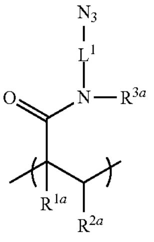

and

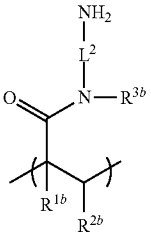

wherein each of $R^{1a}$, $R^{2a}$, $R^{1b}$ and $R^{2b}$ is independently selected from hydrogen, an optionally substituted alkyl or optionally substituted phenyl; each of $R^{3a}$ and $R^{3b}$ is independently selected from hydrogen, an optionally substituted alkyl, an optionally substituted phenyl, or an optionally substituted C7-C14 aralkyl; and each $L^1$ and $L^2$ is independently selected from an optionally substituted alkylene linker or an optionally substituted heteroalkylene linker.

In still another example, the acrylamide copolymer is formed using nitroxide mediated polymerization, and thus at least some of the copolymer chains have an alkoxyamine end group. In the copolymer chain, the term "alkoxyamine end group" refers to the dormant species $—ONR_1R_2$, where each of $R_1$ and $R_2$ may be the same or different, and may independently be a linear or branched alkyl, or a ring structure, and where the oxygen atom is attached to the rest of the copolymer chain. In some examples, the alkoxyamine may also be introduced into some of the recurring acrylamide monomers, e.g., at position $R^A$ in structure (I). As such, in one example, structure (I) includes an alkoxyamine end group; and in another example, structure (I) includes an alkoxyamine end group and alkoxyamine groups in at least some of the side chains.

It is to be understood that other molecules may be used to form the polymeric hydrogel/functionalized layer(s) 28 or 28A, 28B or the functionalized layer pads 42A, 42B, as long as they are capable of being functionalized with the desired chemistry, e.g., primer set(s) 50, or 30, 31. Some examples of suitable materials for the polymeric hydrogel/functionalized layer(s) 28 or 28A, 28B or the functionalized layer pads 42A, 42B include functionalized silanes, such as norbornene silane, azido silane, alkyne functionalized silane, amine functionalized silane, maleimide silane, or any other silane having functional groups that can respectively attach the desired chemistry. Still other examples of suitable materials for the polymeric hydrogel/functionalized layer(s) 28 or 28A, 28B or the functionalized layer pads 42A, 42B include those having a colloidal structure, such as agarose; or a polymer mesh structure, such as gelatin; or a cross-linked polymer structure, such as polyacrylamide polymers and copolymers, silane free acrylamide (SFA), or an azidolyzed version of SFA. Examples of suitable polyacrylamide polymers may be synthesized from acrylamide and an acrylic acid or an acrylic acid containing a vinyl group, or from monomers that form [2+2] photo-cycloaddition reactions. Still other examples of suitable materials for the polymeric hydrogel/functionalized layer(s) 28 or 28A, 28B or the functionalized layer pads 42A, 42B include mixed copolymers of acrylamides and acrylates. A variety of polymer architectures containing acrylic monomers (e.g., acrylamides, acrylates etc.) may be utilized in the examples disclosed herein, such as branched polymers, including dendrimers (e.g., multi-arm or star polymers), star-shaped or star-block polymers, and the like. For example, the monomers (e.g., acrylamide, acrylamide containing the catalyst, etc.) may be incorporated, either randomly or in block, into the branches (arms) of a dendrimer.

The gel material for the polymeric hydrogel/functionalized layer(s) 28 or 28A, 28B or the functionalized layer pads 42A, 42B may be formed using any suitable copolymerization process, such as nitroxide mediated polymerization (NMP), reversible addition-fragmentation chain-transfer (RAFT) polymerization, etc.

The attachment of the polymeric hydrogel/functionalized layer(s) 28 or 28A, 28B or the functionalized layer pads 42A, 42B to the underlying component (e.g., substrate 14, layer 20, or triangular prism 44''') may be through covalent bonding. In some instances, the underlying base support 14 or layer 20 may first be activated, e.g., through silanization or plasma ashing. Covalent linking is helpful for maintaining the primer set(s) 50 or 30, 31 in the desired regions throughout the lifetime of the flow cell 10 during a variety of uses.

In some of the examples disclosed herein, the polymeric hydrogel/functionalized layer(s) 28A, 28B or the functionalized layer pads 42A, 42B are chemically the same, and some of the techniques disclosed herein may be used to immobilize the primer sets 30, 31 to the desired layer 28A or 28B, and/or pad 42A or 42B. In other examples disclosed herein, the polymeric hydrogel/functionalized layer(s) 28A, 28B or the functionalized layer pads 42A, 42B are chemically different (e.g., include different functional groups for respective primer set 30, 3B attachment), and some of the techniques disclosed herein may be used to immobilize the primer sets 30, 31 to the desired layer 28A or 28B, and/or pad 42A or 42B. In other examples disclosed herein, the materials applied to form the polymeric hydrogel/functionalized layer(s) 28A, 28B or the functionalized layer pads 42A, 42B may have the respective primer sets 30, 31 pre-grafted thereto, and thus the immobilization chemistries of the layers 28A, 28B or of the pads 42A, 42B may be the same or different.

Each of the architectures also includes the primer set(s) 50 or 30, 31 attached to the polymeric hydrogel/functionalized layer(s) 28 or 28A, 28B or pads 42A, 42B.

The primer set 50 includes two different primers that are used in sequential paired end sequencing. As examples, the primer set 50 may include P5 and P7 primers, P15 and P7 primers, or any combination of the PA primers, the PB primers, the PC primers, and the PD primers set forth herein. As examples, the primer set 50 may include any two PA, PB, PC, and PD primers, or any combination of one PA primer and one PB, PC, or PD primer, or any combination of one PB primer and one PC or PD primer, or any combination of one PC primer and one PD primer.

Examples of P5 and P7 primers are used on the surface of commercial flow cells sold by Illumina Inc. for sequencing, for example, on HISEQ™, HISEQX™, MISEQ™, MISEQDX™, MINISEQ™, NEXTSEQ™, NEXTSEQDX™, NOVASEQ™, ISEQ™, GENOME ANALYZER™, and other instrument platforms. The P5 primer (shown as a cleavable primer due to the cleavable nucleobase uracil) is:

```
P5: 5' → 3'
                              (SEQ. ID. NO. 1)
AATGATACGGCGACCACCGAGAUCTACAC
```

The P7 primer (shown as cleavable primers) may be any of the following:

```
P7 #1: 5' → 3'
                              (SEQ. ID. NO. 2)
CAAGCAGAAGACGGCATACGAnAT
```

where "n" is 8-oxoguanine;

```
P7 #2: 5' → 3'
                              (SEQ. ID. NO. 3)
CAAGCAGAAGACGGCATACnAGAT
```

where "n" is 8-oxoguanine;

```
P7 #3: 5' → 3'
                              (SEQ. ID. NO. 4)
CAAGCAGAAGACGGCATACGAUAT;
or

P7 #4: 5' → 3'
                              (SEQ. ID. NO. 5)
CAAGCAGAAGACGGCATACUAGAT.
```

The P15 primer (shown as a cleavable primer) is:

```
P15: 5' → 3'
                              (SEQ. ID. NO. 6)
AATGATACGGCGACCACCGAGAnCTACAC
```

where "n" is allyl-T (a thymine nucleotide analog having an allyl functionality).

The other primers (PA-PD, shown as non-cleavable primers) mentioned above include:

```
PA 5' → 3'
                              (SEQ. ID. NO. 7)
GCTGGCACGTCCGAACGCTTCGTTAATCCGTTGAG

PB 5' → 3'
                              (SEQ. ID. NO. 8)
CGTCGTCTGCCATGGCGCTTCGGTGGATATGAACT

PC 5' → 3'
                              (SEQ. ID. NO. 9)
ACGGCCGCTAATATCAACGCGTCGAATCCGCAACT

PD 5' → 3'
                              (SEQ. ID. NO. 10)
GCCGCGTTACGTTAGCCGGACTATTCGATGCAGC
```

While not shown in the example sequences for PA-PD, it is to be understood that any of these primers may include a cleavage site, such as uracil, 8-oxoguanine, allyl-T, etc. at any point in the strand. Moreover, the P5, P7, and P15 primers may be made un-cleavable by eliminating the cleavage site (e.g., uracil, 8-oxoguanine, allyl-T, etc.) from the strand.

Each of the primers disclosed herein may also include a polyT sequence at the 5' end of the primer sequence. In some examples, the polyT region includes from 2 T bases to 20 T bases. As specific examples, the polyT region may include 3, 4, 5, 6, 7, or 10 T bases.

Figure 3A:
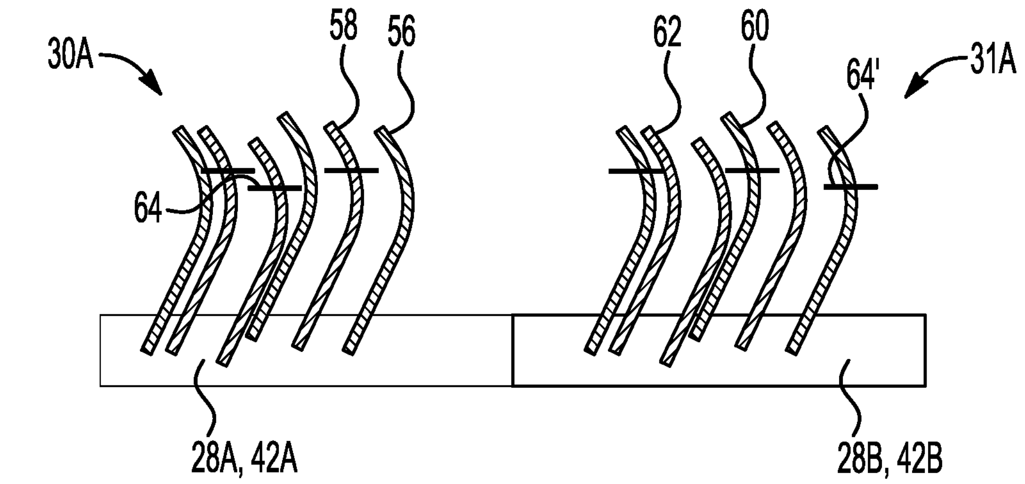
FIG. 3A through FIG. 3D are schematic views of different examples of primer sets that are used in some examples of the flow cells disclosed herein.
Figure 3B:
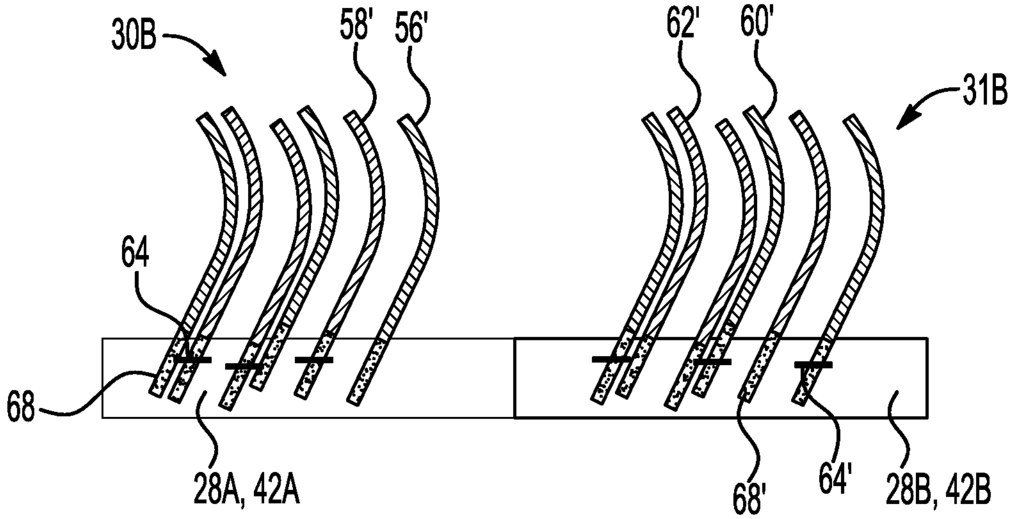
Figure 3C:
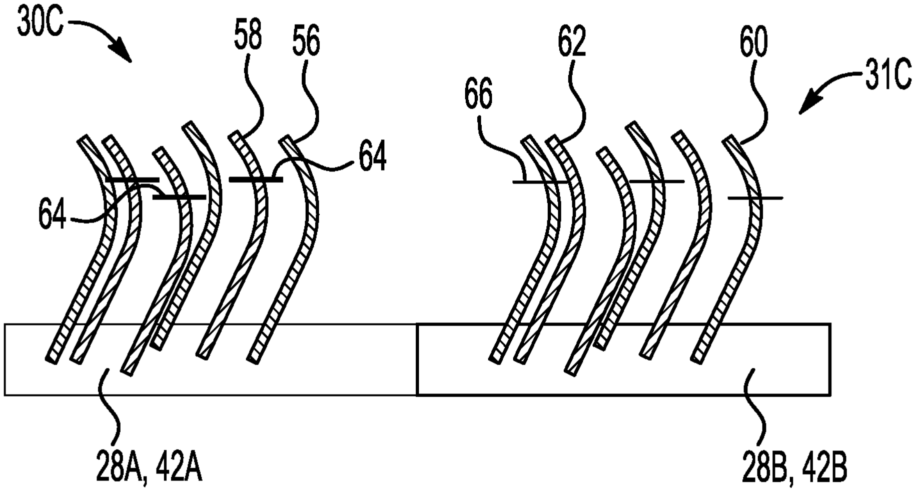
Figure 3D:
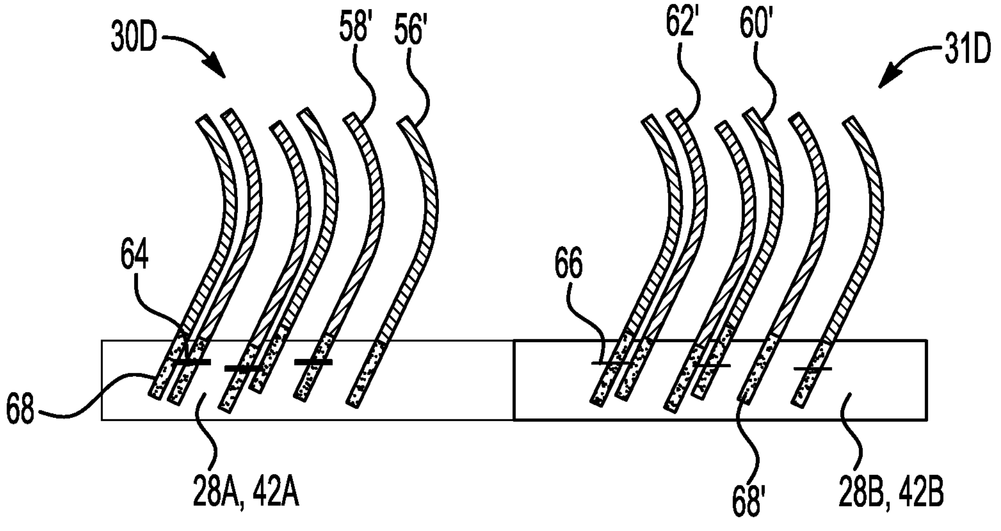

The 5' end of each primer may also include a linker (e.g., 68, 68' described in reference to FIG. 3B and FIG. 3D). Any linker that includes a terminal alkyne group or another suitable terminal functional group that can attach to the surface functional groups of the polymeric hydrogel/functionalized layer(s) 28 or 28A, 28B or functionalized layer pads 42A, 42B may be used. In one example, the primers are terminated with hexynyl. In another example, the linker includes an internal alkyne, such as bicyclononyne or dibenzocyclooctyne.

The primers sets 30, 31 used in simultaneously paired-end sequencing are related in that one set 30 includes an un-cleavable first primer and a cleavable second primer, and the other set includes a cleavable first primer and an un-cleavable second primer. These primer sets 30, 31 allow a single template strand to be amplified and clustered across both primer sets 30, 31, and also enable the generation of forward and reverse strands on adjacent functionalized layers 28A, 28B or pads 42A, 42B due to the cleavage groups being present on the opposite primers of the sets 30, 31. Examples of these primer sets 30, 31 will be discussed in reference to FIG. 3A through FIG. 3D.

FIG. 3A through FIG. 3D depict different configurations of the primer sets 30A, 31A, 30B, 31B, 30C, 31C, and 30D, 31D attached to the functionalized layers 28A, 28B or pads 42A, 42B.

Each of the first primer sets 30A, 30B, 30C, and 30D includes an un-cleavable first primer 56 or 56' and a cleavable second primer 58 or 58'; and each of the second primer sets 31A, 31B, 31C, and 31D includes a cleavable first primer 60 or 60' and an un-cleavable second primer 62 or 62'.

The un-cleavable first primer 56 or 56' and the cleavable second primer 58 or 58' are oligonucleotide pairs, e.g., where the un-cleavable first primer 56 or 56' is a forward amplification primer and the cleavable second primer 58 or 58' is a reverse amplification primer or where the cleavable second primer 58 or 58' is the forward amplification primer and the un-cleavable first primer 56 or 56' is the reverse amplification primer. In each example of the first primer set 30A, 30B, 30C, and 30D, the cleavable second primer 58 or 58' includes a cleavage site 64, while the un-cleavable first primer 56 or 56' does not include a cleavage site 64.

The cleavable first primer 60 or 60' and the un-cleavable second primer 62 or 62' are also oligonucleotide pairs, e.g., where the cleavable first primer 60 or 60' is a forward amplification primer and the un-cleavable second primer 62 or 62' is a reverse amplification primer or where the un-cleavable second primer 62 or 62' is the forward amplification primer and the cleavable first primer 60 or 60' is the reverse amplification primer. In each example of the second primer set 31A, 31B, 31C, and 31D, the cleavable first primer 60 or 60' includes a cleavage site 64' or 66, while the un-cleavable second primer 62 or 62' does not include a cleavage site 64' or 66.

It is to be understood that the un-cleavable first primer 56 or 56' of the first primer set 30A, 30B, 30C, and 30D and the cleavable first primer 60 or 60' of the second primer set 31A, 31B, 31C, and 31D have the same nucleotide sequence (e.g., both are forward amplification primers), except that the cleavable first primer 60 or 60' includes the cleavage site 64' or 66 integrated into the nucleotide sequence or into a linker 68' attached to the nucleotide sequence. Similarly, the cleavable second primer 58 or 58' of the first primer set 30A, 30B, 30C, and 30D and the un-cleavable second primer 62 or 62' of the second primer set 31A, 31B, 31C, and 31D have the same nucleotide sequence (e.g., both are reverse amplification primers), except that the cleavable second primer 58 or 58' includes the cleavage site 64 integrated into the nucleotide sequence or into a linker 68 attached to the nucleotide sequence.

It is to be understood that when the first primers 56 and 60 or 56' and 60' are forward amplification primers, the second primers 58 and 63 or 58' and 62' are reverse primers, and vice versa.

The un-cleavable primers 56, 62 or 56', 62' may be any primers with a universal sequence for capture and/or amplification purposes, such as the P5 and P7 primers (without the respective cleavage sites) or any combination of the PA, PD, PC, PD primers (e.g., PA and PB or PA and PD, etc.). In some examples, the P5 and P7 primers are un-cleavable primers 56, 62 or 56', 62' because they do not include a cleavage site 64, 64', 66 (i.e., SEQ. ID. NOs. 1-5 without the uracil or 8-oxoguanine). It is to be understood that any suitable universal sequence can be used as the un-cleavable primers 56, 62 or 56', 62'.

Examples of cleavable primers 58, 60 or 58', 60' include the P5 and P7 primers or other universal sequence primers (e.g., the PA, PB, PC, PD primers with cleavage sites) with the respective cleavage sites 64, 64', 66 incorporated into the respective nucleic acid sequences (e.g., FIG. 3A and FIG. 3C), or into a linker 68, 68' that attaches the cleavable primers 58, 60 or 58', 60' to the respective functionalized layers 28A, 28B or functionalized layer pads 42A, 42B (FIG. 3B and FIG. 3D). Examples of suitable cleavage sites 64, 64', 66 include enzymatically cleavable nucleobases or chemically cleavable nucleobases, modified nucleobases, or linkers (e.g., between nucleobases), as described herein.

Each primer set 30A and 31A or 30B and 31B or 30C and 31C or 30D and 31D is attached to a respective functionalized layer 28A, 28B or functionalized layer pad 42A, 42B. As described herein, the functionalized layers 28A, 28B or functionalized layer pads 42A, 42B may include different functional groups that can selectively react with the respective primers 56, 58 or 56', 58' or 60, 62 or 60', 62', or may include the same functional groups and the respective primers 56, 58 or 56', 58' or 60, 62 or 60', 62' may be sequentially attached as described in some of the methods.

While not shown in FIG. 3A through FIG. 3D, it is to be understood that one or both of the primer sets 30A, 30B, 30C, 30D or 31A, 31B, 31C or 31D may also include a PX primer for capturing a library template seeding molecule. As one example, PX may be included with the primer set 30A, 30B, 30C, 30D, but not with primer set 31A, 31B, 31C or 31D. As another example, PX may be included with the primer set 30A, 30B, 30C, 30D and with the primer set 31A, 31B, 31C or 31D. The density of the PX motifs should be relatively low in order to minimize polyclonality.

The PX capture primers may be:

```
PX 5' → 3'
                              (SEQ. ID. NO. 11)
AGGAGGAGGAGGAGGAGGAGGAGG

cPX
(PX') 5' → 3'
                              (SEQ. ID. NO. 12)
CCTCCTCCTCCTCCTCCTCCTCCT
```

FIG. 3A through FIG. 3D depict different configurations of the primer sets 30A, 31A, 30B, 31B, 30C, 31C, and 30D, 31D attached to the functionalized layers 28A, 28B or the functionalized layer pads 42A, 42B. More specifically, FIG. 3A through FIG. 3D depict different configurations of the primers 56, 58 or 56', 58' and 60, 62 or 60', 62' that may be used.

In the example shown in FIG. 3A, the primers 56, 58 and 60, 62 of the primer sets 30A and 31A are directly attached to the functionalized layers 28A, 28B or the functionalized layer pads 42A, 42B, for example, without a linker 68, 68'. The functionalized layer 28A or functionalized layer pad 42A has surface functional groups that can immobilize the terminal groups at the 5' end of the primers 56, 58. Similarly, the functionalized layer 28B or functionalize layer pad 42B has surface functional groups that can immobilize the terminal groups at the 5' end of the primers 60, 62. The immobilization chemistry between the functionalized layer 28A or functionalized layer pad 42A and the primers 56, 58 and the immobilization chemistry between the functionalized layer 28B or functionalized layer pad 42B and the primers 60, 62 may be different so that the primers 56, 58 and 60, 62 selectively attach to the desirable functionalized layer 28A, 28B or functionalized layer pad 42A, 42B. Alternatively, the primers 56, 58 and 60, 62 may be pre-grafted or sequentially applied via some of the methods disclosed herein.

Also, in the example shown in FIG. 3A, the cleavage site 64, 64' of each of the cleavable primers 58, 60 is incorporated into the sequence of the primer. In this example, the same type of cleavage site 64, 64' is used in the cleavable primers 58, 60 of the respective primer sets 30A, 31A. As an example, the cleavage sites 64, 64' are uracil bases, and the cleavable primers 58, 60 are P5U (SEQ. ID. NO. 1) and P7U (SEQ. ID. NO. 4 or 5). The uracil bases or other cleavage sites may also be incorporated into any of the PA, PB, PC, and PD primers to generate the cleavable primers 58, 60. In this example, the un-cleavable primer 56 of the oligonucleotide pair 56, 58 may be P7 (SEQ. ID. NO. 2 or 3 without n), and the un-cleavable primer 62 of the oligonucleotide pair 62, 64 may be P5 (SEQ. ID. NO. 1 without U). Thus, in this example, the first primer set 30A includes P7, P5U and the second primer set 31A includes P5, P7U. The primer sets 30A, 31A have opposite linearization chemistries, which, after amplification, cluster generation, and linearization, allows forward template strands to be formed on one functionalized layer 28A or pad 42A and reverse strands to be formed on the other functionalized layer 28B or pad 42B.

In the example shown in FIG. 3B, the primers 56', 58' and 60', 62' of the primer sets 30B and 31B are attached to the functionalized layers 28A, 28B or functionalized layer pads 42A, 42B, for example, through linkers 68, 68'. The functionalized layers 28A, 28B or functionalized layer pads 42A, 42B include respective functional groups, and the terminal ends of the respective linkers 68, 68' are capable of covalently attaching to the respective functional groups. As such, the functionalized layer 28A or functionalized layer pad 42A may have surface functional groups that can immobilize the linker 68 at the 5' end of the primers 56', 58'. Similarly, the functionalized layer 28B or functionalized layer pad 42B may have surface functional groups that can immobilize the linker 68' at the 5' end of the primers 60', 62'. The immobilization chemistry for the functionalized layer 28A or pad 42A and the linkers 68 and the immobilization chemistry for the functionalized layer 28B or pad 42B and the linkers 68' may be different so that the primers 56', 58' and 60', 62' selectively attach to the desirable functionalized layer 28A, 28B or pad 42A, 42B. Alternatively, the primers 56', 58' and 60', 62' may be pre-grafted or sequentially applied via some of the methods disclosed herein.

Examples of suitable linkers 68, 68' may include nucleic acid linkers (e.g., 10 nucleotides or less) or non-nucleic acid linkers, such as a polyethylene glycol chain, an alkyl group or a carbon chain, an aliphatic linker with vicinal diols, a peptide linker, etc. An example of a nucleic acid linker is a polyT spacer, although other nucleotides can also be used. In one example, the spacer is a 6T to 10T spacer. The following are some examples of nucleotides including non-nucleic acid linkers with terminal alkyne groups (where B is the nucleobase and "oligo" is the primer):

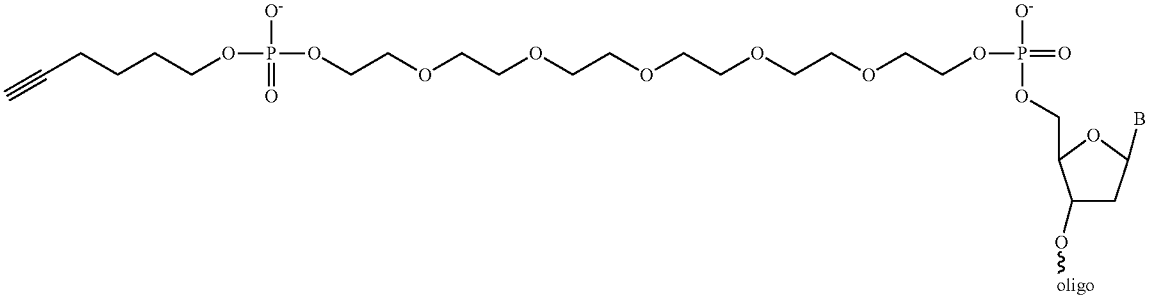

5′ Hexynyl-HEG-oligo

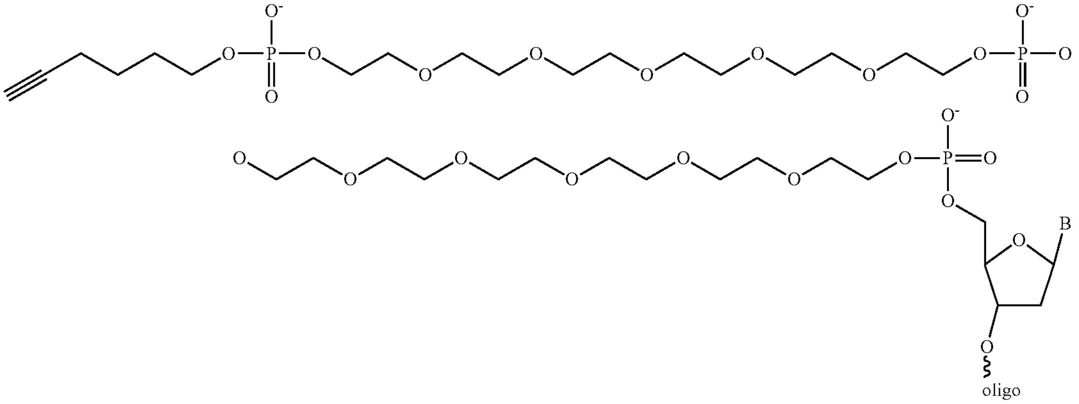

5′ Hexynyl-HEG-HEG-oligo

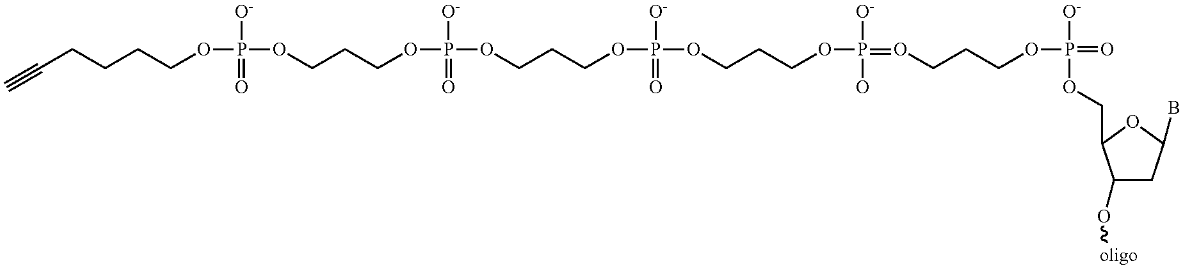

5′ Hexynyl-C3 spacer-C3 spacer-C3 spacer-C3 spacer-oligo

In the example shown in FIG. 3B, the primers 56', 60' have the same sequence (e.g., P5) aside from the presence or absence of the cleavage site 64' and the same or different linker 68, 68'. The primer 56' is un-cleavable, whereas the primer 60' includes the cleavage site 64' incorporated into the linker 68'. Also in this example, the primers 58', 62' have the same sequence (e.g., P7) aside from the presence or absence of the cleavage site 64 and the same or different linker 68, 68'. The primer 62' in un-cleavable, and the primer 58' includes the cleavage site 64 incorporated into the linker 68. The same type of cleavage site 64, 64' is used in the linker 68, 68' of each of the cleavable primers 58', 60'. As an example, the cleavage sites 64, 64' may be uracil bases that are incorporated into nucleic acid linkers 68, 68'. The primer sets 30B, 31B have opposite linearization chemistries, which, after amplification, cluster generation, and linearization, allow forward template strands to be formed on one functionalized layer 28A or functionalized layer pad 42A and reverse strands to be formed on the other functionalized layer 28B or functionalized layer pad 42B.

The example shown in FIG. 3C is similar to the example shown in FIG. 3A, except that different types of cleavage sites 64, 66 are used in the cleavable primers 58, 60 of the respective primer sets 30C, 31C. As examples, two different enzymatic cleavage sites may be used, two different chemical cleavage sites may be used, or one enzymatic cleavage site and one chemical cleavage site may be used. Examples of different cleavage sites 64, 66 that may be used in the respective cleavable primers 58, 60 include any combination of the following: vicinal diol, uracil, allyl ether, disulfide, restriction enzyme site, and 8-oxoguanine.

The example shown in FIG. 3D is similar to the example shown in FIG. 3B, except that different types of cleavage sites 64, 66 are used in the linkers 68, 68' attached to the cleavable primers 58', 60' of the respective primer sets 30D, 31D. Examples of different cleavage sites 64, 66 that may be used in the respective linkers 68, 68' attached to the cleavable primers 58', 60' include any combination of the following: vicinal diol, uracil, allyl ether, disulfide, restriction enzyme site, and 8-oxoguanine.

In any of the examples using the primer set 50 or the primer sets 30, 31, the attachment of the primers to the layer 18, layers 28A, 28B, or the pads 42A, 42B leaves a template-specific portion of the primers free to anneal to its cognate template and the 3' hydroxyl group free for primer extension.

Different methods may be used to generate the flow cell architectures disclosed herein. The various methods will now be described.

Methods

Each of the examples methods disclosed herein utilizes angled deposition to directionally deposit one or more layers (e.g., sacrificial layer, polymeric hydrogel/functionalized layer 28A, 28B). Using angled deposition, the material is deposited to the desired surface with high precision and accuracy. As such, clean up techniques, such as polishing, do not have to be used for the specific material.

Methods for Forming the Architecture of FIG. 2A

The example methods shown in the series of figures from FIG. 4A-FIG. 4F through FIG. 7A-FIG. 7F may be used to generate the architecture shown in FIG. 2A. In these examples, the reaction area 22 is defined in the substrate 16; and the two angularly offset and non-perpendicular surfaces 24A, 24B protrude inward relative to the planar surface 26 of the substrate 16.

The methods shown in FIG. 4A-FIG. 4F through FIG. 6A-FIG. 6I generally include defining a triangular prism 44' in a substrate 16, the triangular prism 44' including two angularly offset and non-perpendicular surfaces 24A, 24B relative to a planar surface 26 of the substrate 16; angle depositing a sacrificial layer 70 over a first of the two angularly offset and non-perpendicular surfaces 24A or 24B; depositing a first functionalized layer 28A over the sacrificial layer 70 and over a second of the two angularly offset and non-perpendicular surfaces 24B or 24A; removing the sacrificial layer 70, thereby exposing the first of the two angularly offset and non-perpendicular surfaces 24A or 24B; and selectively applying a second functionalized layer 28B over the first of the two angularly offset and non-perpendicular surfaces 24A or 24B.

In the example shown in FIG. 4A through FIG. 4F, the substrate 16 is used, and the triangular prism 44' is defined in the resin layer 20 of the substrate 16. Defining the triangular prism 44' in the substrate 16 involves nanoimprint lithography or dry etching. While the substrate 16 is used in the method shown in FIG. 4A through FIG. 4F, it is to be understood that the single layer substrate 14 (e.g., fused silica or silicon) may be used instead.

In one example, nanoimprint lithography is used to define the triangular prism 44'. In this example, a working stamp is pressed into the single resin layer 20 while the material is soft, which creates an imprint of the working stamp features in the resin layer 20. In this example, each working stamp feature is a negative replica of the depressed triangular prism 44'. The resin layer 20 may then be cured with the working stamp in place.

Curing may be accomplished by exposure to actinic radiation, such as visible light radiation or ultraviolet (UV) radiation, when a radiation-curable resin material is used; or by exposure to heat when a thermal-curable resin material is used. Curing may promote polymerization and/or cross-linking. As an example, curing may include multiple stages, including a softbake (e.g., to drive off any liquid carrier that may be used to deposit the resin) and a hardbake. The softbake may take place at a lower temperature, ranging from about 50° C. to about 150° C. The duration of the hardbake may last from about 5 seconds to about 10 minutes at a temperature ranging from about 100° C. to about 300° C. Examples of devices that can be used for softbaking and/or hardbaking include a hot plate, oven, etc.

After curing, the working stamp is released. This creates topographic features (e.g., the depressed triangular prism 44') in the resin layer 20.

Dry etching, a combination of gray scale lithography and dry etching, or silicon wet etching may be used to define the triangular prism 44'. With gray scale lithography and dry etching, a photoresist and gray scale photo mask may be used to define the pattern of the triangular prism.

Figure 4C:
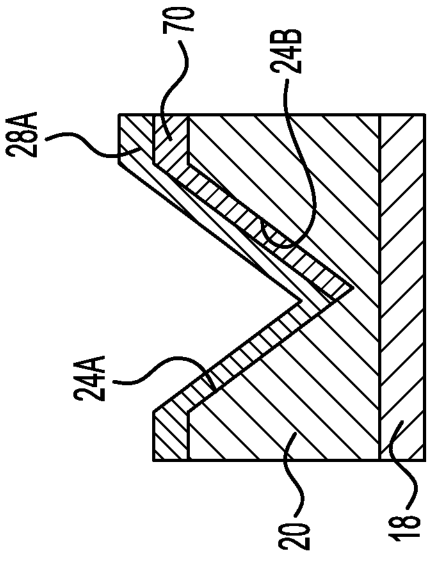
FIG. 4A through FIG. 4F together schematically depict an example method, where
Figure 4B:
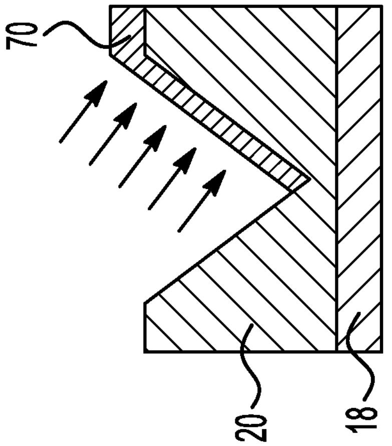

As depicted in FIG. 4B, the method includes angle depositing the sacrificial layer 70 over a first of the two angularly offset and non-perpendicular surfaces, e.g., surface 24B. In this example method, suitable angled deposition techniques include collimated sputtering or evaporation. During these methods, a collimator with high aspect ratio holes is positioned between the target and the surface 24B that is to receive the sacrificial layer 70. The holes of the collimator are oriented so that they are perpendicular to each of the target and the surface 24B. The target may be positioned at an angle of 90° relative to the surface 24B. Sputtering or evaporation is performed at low pressure (about 5 mTorr or less). This creates a longer mean path for the material so that fewer collisions occur between the collimator and the surface 24B during sputtering or evaporation. The species of the material with velocities nearly perpendicular to the surface 24B pass through the holes and are deposited on the surface 24B. As a result of the angled deposition, the sacrificial layer 70 is generated on the surface 24B. This technique may be used to simultaneously deposit sacrificial layers 70 on each of the surfaces 24B in an array of the triangular prisms 44'.

The material used to form the sacrificial layer 70 may be titanium, chromium, aluminum, gold, copper, or silicon nitride. In some examples, the material may be at least substantially pure (<99% pure). In other examples, molecules or compounds of the listed elements may be used. For example, oxides of any of the listed metals (e.g., aluminum oxide, zinc oxide, titanium dioxide, etc.) may be used, alone or in combination with the listed metal.

The first functionalized layer 28A is then applied over the sacrificial layer 70 and over the exposed surfaces of the resin layer 20. As depicted in FIG. 4C, the exposed surfaces of the resin layer 20 include the angularly offset and non-perpendicular surface 24A and the planar surface 26. The first functionalized layer 28A may be any of the gel materials described herein and may be applied using any suitable deposition technique. A curing process may be performed after deposition. The first functionalized layer 28A covalently attaches to the resin layer 20. Covalent linking is helpful for maintaining the primer set(s) 30, 31 in the desired regions throughout the lifetime of the flow cell 10 during a variety of uses.

Figure 4A:
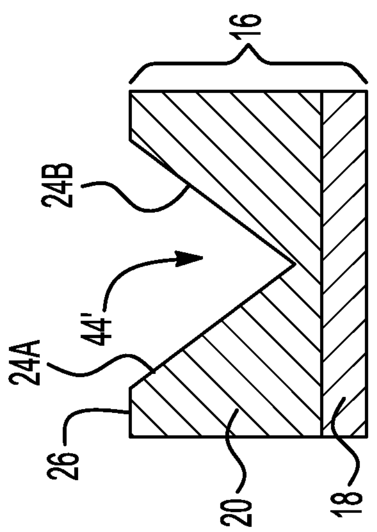
Figure 4F:
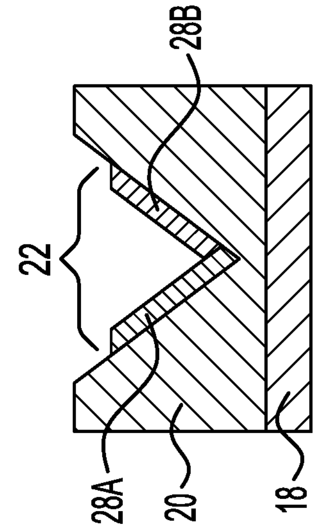
Figure 4E:
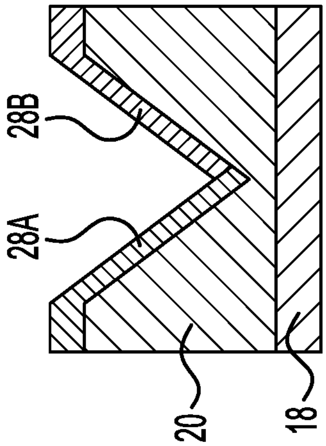
Figure 4D:
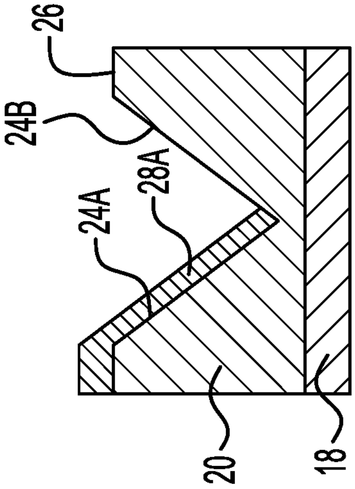

Referring specifically to FIG. 4D, the sacrificial layer 70 is removed using a wet etch or lift-off process. The condition (s) of the wet etch process or the lift-off process is/are capable of dissolving or otherwise lifting off the sacrificial layer 70, and thus depend upon the type of sacrificial layer 70 used. As examples, an aluminum sacrificial layer 70 can be removed in acidic or basic conditions, a copper sacrificial layer 70 can be removed using $FeCl_3$, a copper, gold or silver sacrificial layer 70 can be removed in an iodine and iodide solution, and a silicon sacrificial layer 70 can be removed in basic (pH) conditions. The wet etch or lift-off process removes i) at least 99% of the sacrificial layer 70 and ii) the functionalized layer 28A positioned thereon. Thus, the wet etch or lift-off process exposes the first angularly offset and non-perpendicular surface 24B and a portion of the planar surface 26 adjacent to the surface 24B. The wet etch or lift-off process does not remove the portion of the first functionalized layer 28A that is positioned over the second angularly offset and non-perpendicular surface 24A.

The second functionalized layer 28B is then selectively applied over the first of the two angularly offset and non-perpendicular surfaces 24B, as shown in FIG. 4E. The second functionalized layer 28B may be any of the gel materials described herein and may be applied using any suitable deposition technique under high ionic strength conditions (e.g., in the presence of 10×PBS, NaCl, KCl, etc.). A curing process, as described herein, may be performed after deposition.

When the deposition of the second functionalized layer 28B is performed under high ionic strength, the second functionalized layer 28B does not deposit on or adhere to the first functionalized layer 28A. As such, the second functionalized layer 28B does not contaminate the first functionalized layer 28A.

The second functionalized layer 28B does attach to the exposed surfaces of the resin layer 20, e.g., the first angularly offset and non-perpendicular surface 24B and the portion of the planar surface 26 adjacent to the surface 24B, which has surface groups capable of attaching to the second functionalized layer 28B.

In the example shown in FIG. 4A through FIG. 4F, the triangular prism 44' is defined in the substrate 16 such that the two angularly offset and non-perpendicular surfaces 24A, 24B extend inward relative to the planar surface 26 of the substrate, and the method further comprises polishing the first functionalized layer 28A and the second functionalized layer 28B from the planar surface 26 of the substrate 16. As shown in FIG. 4F, the functionalized layers 28A, 28B positioned over the planar surface 26 have been removed, e.g., using the polishing process. It is to be understood that polishing may be stopped when the planar surface 26 is free of the functionalized layers 28A, 28B or may be continued to remove some (but not all) of the functionalized layers 28A, 28B from the depression triangular prism 44', as shown in FIG. 4F.

The polishing process may be performed with a chemical slurry (including, e.g., an abrasive, a buffer, a chelating agent, a surfactant, and/or a dispersant). Alternatively, polishing may be performed with a solution that does not include the abrasive particles.

The chemical slurry may be used in a chemical mechanical polishing system to polish the planar surface 26. The polishing head(s)/pad(s) or other polishing tool(s) is/are capable of polishing the functionalized layers 28A, 28B that are present over the planar surface 26 while leaving the functionalized layers 28A, 28B in the depressed triangular prism 44' at least substantially intact. As an example, the polishing head may be a Strasbaugh ViPRR II polishing head. The polishing process can remove the functionalized layers 28A, 28B from the planar surface 26 without deleteriously affecting the underlying resin layer 20.

Cleaning and drying processes may be performed after polishing. The cleaning process may utilize a water bath and sonication. The water bath may be maintained at a relatively low temperature ranging from about 22° C. to about 30° C. The drying process may involve spin drying, or drying via another suitable technique.

While not shown, the method shown in FIG. 4A through FIG. 4F also includes attaching respective primer sets 30, 31 to the functionalized layers 28A, 28B. In some examples, the primers 56, 58 or 56', 58' (not shown in FIG. 4A through FIG. 4F) may be pre-grafted to the functionalized layer 28A. Similarly, the primers 60, 62 or 60', 62' (also not shown in FIG. 4A through FIG. 4F) may be pre-grafted to the functionalized layer 28B. In these examples, additional primer grafting is not performed.

In other examples, the primers 56, 58 or 56', 58' are not pre-grafted to the functionalized layer 28A. In these examples, the primers 56, 58 or 56', 58' may be grafted after the functionalized layer 28A is applied (e.g., at FIG. 4C). In these examples, the primers 60, 62 or 60', 62' may be pre-grafted to the second functionalized layer 28B. Alternatively, in these examples, the primers 60, 62 or 60', 62' may not be pre-grafted to the second functionalized layer 28B. Rather, the primers 60, 62 or 60', 62' may be grafted immediately after the second functionalized layer 28B is applied (e.g., at FIG. 4E) or after polishing (FIG. 4F) as long as i) the functionalized layer 28B has different functional groups (than functionalized layer 28A) for attaching the primers 60, 62 or 60', 62' or ii) any unreacted functional groups of the functionalized layer 28A have been quenched, e.g., using the Staudinger reduction to generate amines or an additional click reaction with a passive molecule such as hexynoic acid.

When grafting is performed during the method, grafting may be accomplished using any suitable grafting technique. As examples, grafting may be accomplished by flow through deposition (e.g., using a temporarily bound lid), dunk coating, spray coating, puddle dispensing, or by another suitable method. Each of these example techniques may utilize a primer solution or mixture, which may include the primer set 30 or 31, water, a buffer, and a catalyst. With any of the grafting methods, the primer sets 30 or 31 attach to the reactive groups of the functionalized layer 28A, 28B, and have no affinity for the planar surface 26. As such, the planar surface 26 that surrounds each of the depressed triangular prisms 44' defines the interstitial regions of the patterned structure.

While a single set of the functionalized layers 28A, 28B is shown in FIG. 4F, it is to be understood that the method described in reference to FIG. 4A through FIG. 4F may be performed to generate an array of depressed triangular prisms 44' (each having functionalized layers 28A, 28B and primer sets 30, 31 therein) separated by interstitial regions across the planar surface 26 of the substrate 16.

In the example shown in FIG. 5A through FIG. 5I, the substrate 16 is used, and the triangular prism 44' is defined in the resin layer 20 of the substrate 16. Defining the triangular prism 44' in the substrate 16 involves nanoimprint lithography or dry etching as described in reference to FIG. 4A. While the substrate 16 is used in the method shown in FIG. 5A through FIG. 5I, it is to be understood that the single layer substrate 14 (e.g., fused silica or silicon) may be used instead.

Figures 5A, 5B, 5C, 5D, 5E, 5F, 5G, 5H, 5I:
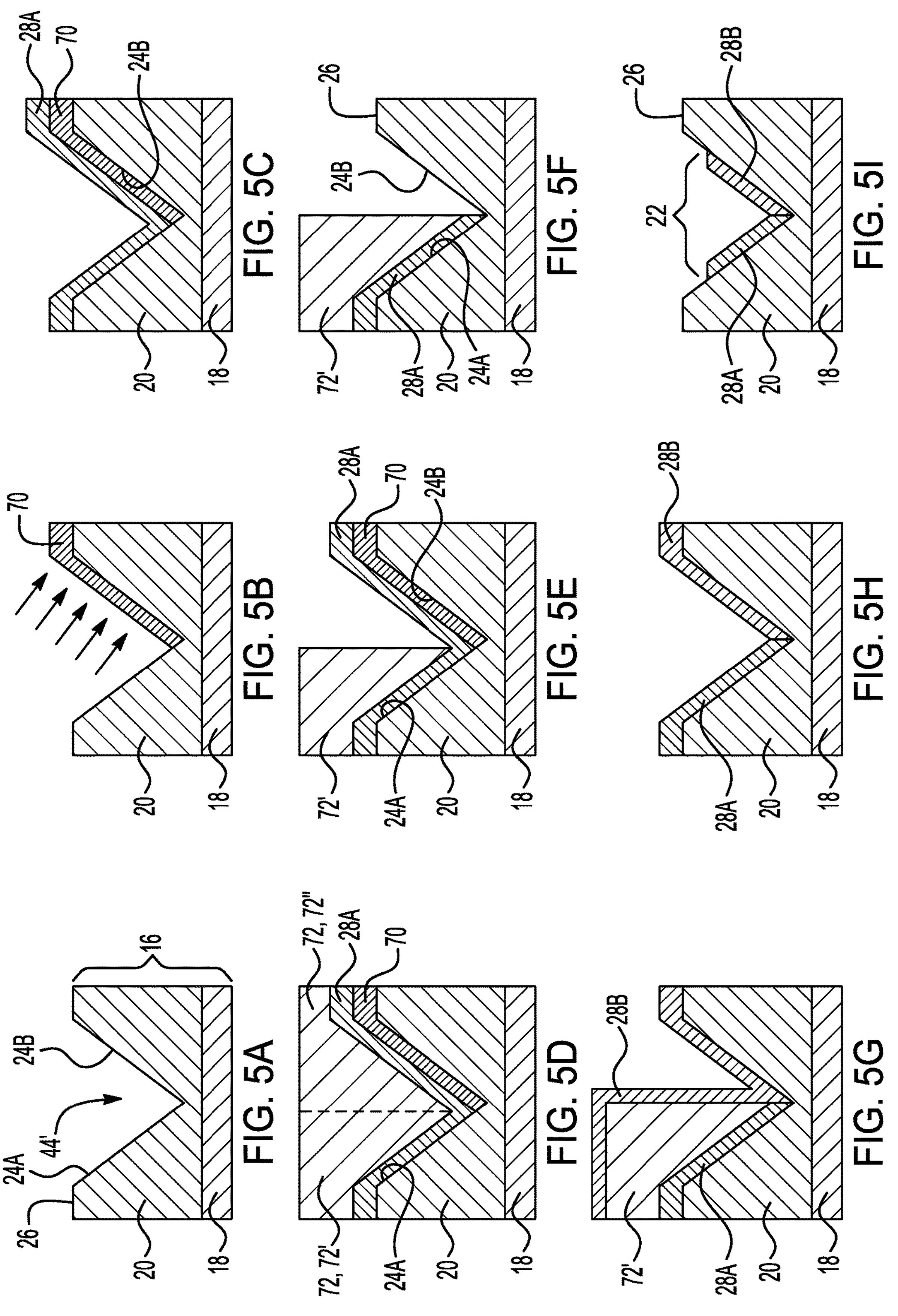
FIG. 5A through FIG. 5I together schematically depict another example method, where

As depicted in FIG. 5B, the method includes angle depositing the sacrificial layer 70 over a first of the two angularly offset and non-perpendicular surfaces, e.g., surface 24B. Any of the materials for the sacrificial layer 70 may be used, with the caveat that it is opaque (non-transparent or having transmittance less than 0.25) to the light energy used for photoresist development. The material for the sacrificial layer 70 may be deposited via either of the angled deposition techniques described herein in reference to FIG. 4B.

The first functionalized layer 28A is then applied over the sacrificial layer 70 and over the exposed surfaces of the resin layer 20. As depicted in FIG. 5C, the exposed surfaces of the resin layer 20 include the angularly offset and non-perpendicular surface 24A and the planar surface 26. The first functionalized layer 28A may be any of the gel materials described herein and may be applied as described herein in reference to FIG. 4C. A curing process may be performed after deposition.

In this example method, the triangular prism 44' is defined in the substrate 16 such that the two angularly offset and non-perpendicular surfaces 24A, 24B extend inward relative to the planar surface 26 of the substrate 16; and i) after the first functionalized layer 28A is deposited, the method further comprises forming an insoluble photoresist 72' over the first functionalized layer 28A over the second of the two angularly offset and non-perpendicular surfaces 24A (FIG. 5D and FIG. 5E); and removing the first functionalized layer 28A and the sacrificial layer 70 from over the first of the two angularly offset and non-perpendicular surfaces 24B (FIG. 5F); ii) the second functionalized layer 28B is also applied over the insoluble photoresist 72' (FIG. 5G); and iii) after the second functionalized layer 28B is applied, the method further comprises removing the insoluble photoresist 72' (FIG. 5H).

The formation of the insoluble photoresist 72' is depicted in FIG. 5D and FIG. 5E. In FIG. 5D, a negative photoresist 72 is applied over the first functionalized layer 28A. An example of a suitable negative photoresist includes the NR® series photoresist (available from Futurrex). Other suitable negative photoresists include the SU-8 Series and the KMPR® Series (both of which are available from Kayaku Advanced Materials, Inc.), or the UVN™ Series (available from DuPont). The negative photoresist 72 may be applied using any suitable deposition technique.

The development of the negative photoresist 72 is also schematically depicted in FIG. 5D. To develop the negative photoresist 72, an ultraviolet (UV) light dosage is directed through the substrate 16 (including through the base support 18 and the resin layer 20). The UV light is able to transmit through the substrate 16 and through the first functionalized layer 28A to the overlying negative photoresist 72. The UV light exposure forms the insoluble photoresist 72'. In contrast, the sacrificial layer 70 blocks the UV light from reaching the negative photoresist 72 overlying the sacrificial layer 70, and thus this portion becomes soluble (i.e., soluble photoresist 72").

FIG. 5E depicts when the soluble photoresist 72" is removed. The soluble photoresist 72" is removed using any suitable developer for the negative photoresist 72. Examples of suitable developers for the negative photoresist 72 include aqueous-alkaline solutions, such as diluted sodium hydroxide, diluted potassium hydroxide, or an aqueous solution of the metal ion free organic TMAH (tetramethylammonium-hydroxide). Removal of the soluble photoresist 72" exposes the portion of the first functionalized layer 28A that overlies the sacrificial layer 70. As illustrated in FIG. 5E, the insoluble photoresist 72' is unaffected by the developer used to remove the soluble photoresist 72".

In this example method, the first functionalized layer 28A and the sacrificial layer 70 are then removed from over the first of the two angularly offset and non-perpendicular surfaces 24B, as shown in FIG. 5F. In this example, the first functionalized layer 28A and the sacrificial layer 70 are each removed via dry etching so that the insoluble photoresist 72' remains intact. The exposed portion of the first functionalized layer 28A and the sacrificial layer 70 may be sequentially dry etched. The portion of the first functionalized layer 28A that is positioned over the sacrificial layer 70 may be removed via ashing. The ashing process that is used to remove the functionalized layer 28A may be performed with plasma, such as 100% $O_2$ plasma, air plasma, argon plasma, etc. This process may also be used to remove the sacrificial layer 70. Alternatively, this ashing process may be stopped to leave the sacrificial layer 70 at least substantially intact. In these instances, the sacrificial layer 70 is then removed by another dry etching process, such as reactive ion etching with $BCl_3+Cl_2$. After dry etching, the first angularly offset and non-perpendicular surface 24B and a portion of the planar surface 26 adjacent to the surface 24B are exposed. The dry etching process(es) does/do not remove the insoluble photoresist 72' or the portion of the first functionalized layer 28A that is positioned over the second angularly offset and non-perpendicular surface 24A.

As shown in FIG. 5G, the second functionalized layer 28B is then applied over the first of the two angularly offset and non-perpendicular surfaces 24B and over the insoluble photoresist 72'. The second functionalized layer 28B may be any of the gel materials described herein and may be applied using any suitable deposition technique. The high ionic strength conditions described in reference to FIG. 4E are not used, as the first functionalized layer 28A is covered by the insoluble photoresist 72'. A curing process, as described herein, may be performed after deposition.

After the second functionalized layer 28 is applied, the method further comprises removing the insoluble photoresist 72'. Insoluble photoresist 72' removal is depicted in FIG. 5H. The insoluble photoresist 72', which, in this example, is a cured negative photoresist, may be lifted off with removers such as dimethylsulfoxide (DMSO) with sonication, an acetone wash, or an NMP (N-methyl-2-pyrrolidone) based stripper wash. The lift-off process removes i) at least 99% of the insoluble photoresist 72' and ii) the functionalized layer 28B positioned thereon. This process exposes the first functionalized layer 28A and does not affect the second functionalized layer 28B that is positioned directly on the resin layer 20.

The method shown in FIG. 5A through FIG. 5I further includes polishing the first functionalized layer 28A and the second functionalized layer 28B from the planar surface 26 of the substrate 16. Polishing may be performed as described in reference to FIG. 4F and results in a structure similar to that represented by FIG. 5I.

While not shown, the method shown in FIG. 5A through FIG. 5I also includes attaching respective primer sets 30, 31 to the functionalized layers 28A, 28B. In some examples, the primers 56, 58 or 56', 58' (not shown in FIG. 5A through FIG. 5I) may be pre-grafted to the functionalized layer 28A. Similarly, the primers 60, 62 or 60', 62' (also not shown in 5A through FIG. 5I) may be pre-grafted to the functionalized layer 28B. In these examples, additional primer grafting is not performed.

In other examples, the primers 56, 58 or 56', 58' are not pre-grafted to the functionalized layer 28A. In these examples, the primers 56, 58 or 56', 58' may be grafted after the functionalized layer 28A is applied (e.g., at FIG. 5C). In these examples, the primers 60, 62 or 60', 62' may be pre-grafted to the second functionalized layer 28B. Alternatively, in these examples, the primers 60, 62 or 60', 62' may not be pre-grafted to the second functionalized layer 28B. Rather, the primers 60, 62 or 60', 62' may be grafted immediately after the second functionalized layer 28B is applied (e.g., at FIG. 5G). Alternatively, the primers 60, 62 or 60', 62' may be grafted after the insoluble photoresist 72' is removed and before (FIG. 5H) or after (FIG. 5I) polishing as long as i) the functionalized layer 28B has different functional groups (than functionalized layer 28A) for attaching the primers 60, 62 or 60', 62' or ii) any unreacted functional groups of the functionalized layer 28A have been quenched, e.g., using the Staudinger reduction to generate amines or an additional click reaction with a passive molecule such as hexynoic acid.

When grafting is performed during the method, grafting may be accomplished using of the grafting techniques disclosed herein.

While a single set of the functionalized layers 28A, 28B is shown in FIG. 5I, it is to be understood that the method described in reference to FIG. 5A through FIG. 5I may be performed to generate an array of depressed triangular prisms 44' (each having functionalized layers 28A, 28B and primer sets 30, 31 therein) separated by interstitial regions across the planar surface 26 of the substrate 16.

The method shown in FIG. 6A through FIG. 6I utilizes the single layer substrate 14 and a mask layer 74 positioned over the single layer substrate 14. It is to be understood that any suitable single layer substrate 14 and mask layer 74 may be used as long as they have different etch rates on different crystal planes. In one example, the etch rate of the mask layer 74 should be less than the etch rate of the single layer substrate 14. In another example, the mask layer 74 is non-etchable and the single layer substrate 14 is etchable. In an example, the single layer substrate 14 is silicon and the mask layer 74 is selected from the group consisting of silicon nitride, silicon dioxide, or any of the metal materials set forth herein for the sacrificial layer 70.

Figures 6A, 6B, 6C, 6D, 6E, 6F, 6G, 6H, 6I:
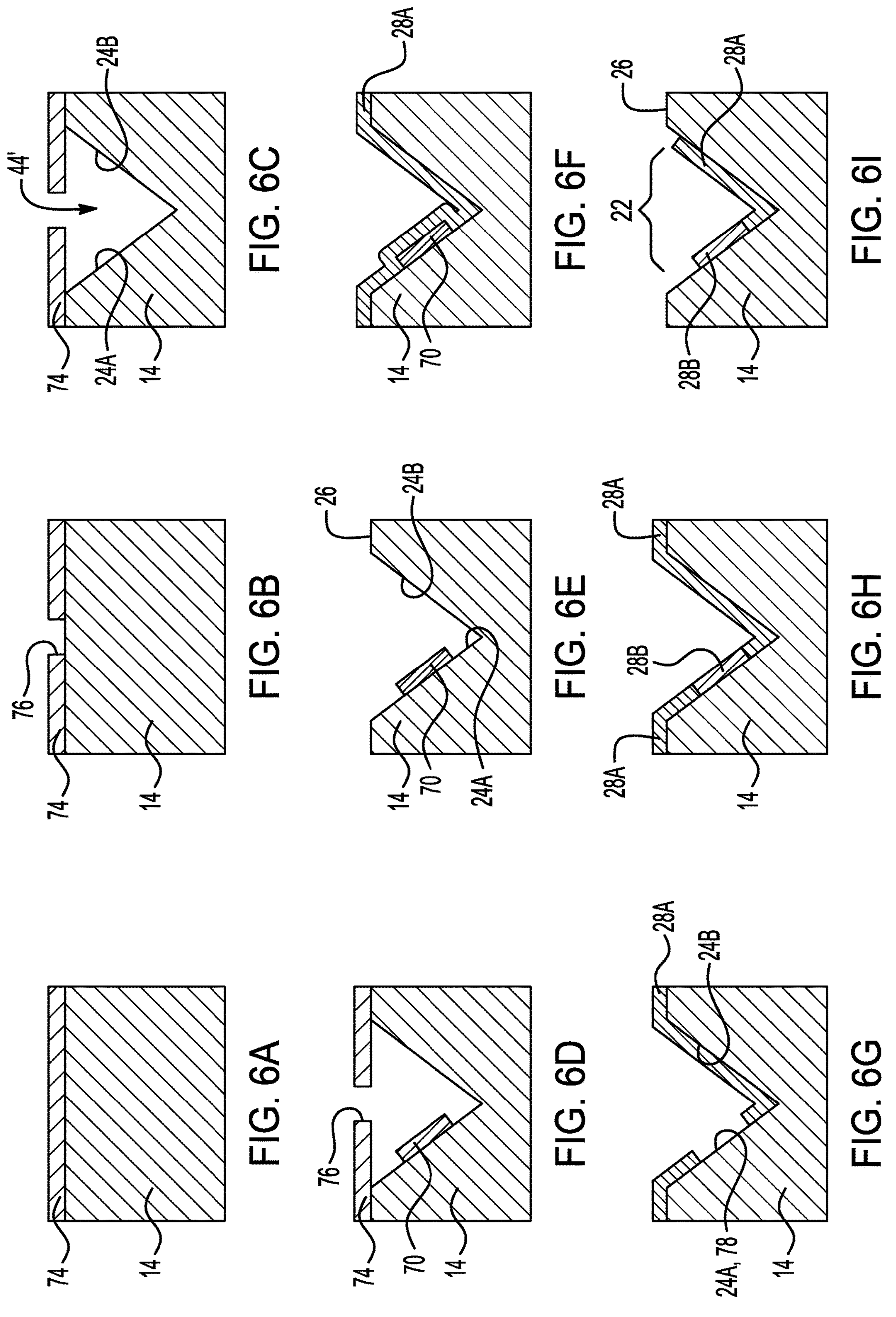
FIG. 6A through FIG. 6I together schematically depict yet another example method, where

In FIG. 6A and FIG. 6B, the mask layer 74 is applied over the single layer substrate 14 and then a through-hole 76 is defined in the mask layer 74. The mask layer 74 may be applied using any suitable deposition technique. The through-hole 76 may be defined using a patterning technique that will not affect the underlying single layer substrate 14. While not shown, a photoresist may be used to define the through-hole 76. The photoresist is developed over the mask layer 74 such that a soluble portion is removed that defines a pattern of the through-hole 76. The mask layer 74 may then be wet etched or dry etched through the through-hole pattern in the photoresist. Example wet etching processes include a hydrofluoric acid (HF) etch (e.g., for a silicon dioxide substrate) or a phosphoric acid etch (e.g., for a silicon nitride substrate) or a wet etch that is suitable for the metal being used. Example dry etching processes include a $CHF_3$ and $O_2$ and Ar reactive ion etch (e.g., for a silicon dioxide substrate), or a reactive ion etch using $SF_6$ and $O_2$ or $CF_4$ and $O_2$ or $CF_4$ (e.g., for a silicon nitride substrate), or a dry etch that is suitable for the metal being used. Once the through-hole 76 is defined in the mask layer 74, the photoresist can be removed with a suitable remover for the type of photoresist being used.

The through-hole 76 is defined in an area of the mask layer 74 that overlies a portion of the substrate 14 where it is desirable to form the depressed triangular prism 44'. An example shape for the through-hole 76 is circular.

In this example method, the triangular prism 44' is then defined by etching the substrate 14 through the through-hole 76 defined in the mask layer 74 positioned over the substrate 14. In this example, a wet etching process or an anisotropic etching process may be used. The substrate 14, an example of which is silicon, may then be wet etched (e.g., using KOH or another suitable etchant) or dry etched (e.g., chemical etch with $XeF_2$ gas) through the through-hole 76. This etching process forms the depressed triangular prism 44', as shown in FIG. 6C.

In this example method, as shown in FIG. 6D and FIG. 6E, the sacrificial layer 70 is angle deposited through the through-hole 76; and the mask layer 74 is removed prior to the deposition of the first functionalized layer 28A.

As depicted in FIG. 6D, the sacrificial layer 70 is angle deposited over a first of the two angularly offset and non-perpendicular surfaces, e.g., surface 24A. Any of the materials for the sacrificial layer 70 may be used. The material for the sacrificial layer 70 may be deposited via either of the angled deposition techniques described herein in reference to FIG. 4B. In this example, the target and collimator used during angled deposition are positioned to direct the material for the sacrificial layer 70 through the through-hole 76 and onto the surface 24A.

As depicted in FIG. 6E, the mask layer 74 is removed. The removal process will depend upon the material used for the mask layer 74. The removal of the mask layer 74 should not remove the sacrificial layer 70, and thus it may be desirable to select materials for these layers 70, 74 that are susceptible to different removal techniques. In one example, a silicon dioxide mask layer 74 may be wet etched away using hydrofluoric acid. In another example, a silicon nitride layer may be wet etched away using phosphoric acid.

The first functionalized layer 28A is then applied over the sacrificial layer 70 and over the exposed surfaces of the single layer substrate 14. As depicted in FIG. 6E and FIG. 6F, the exposed surfaces of the single layer substrate 14 include a portion of the angularly offset and non-perpendicular surface 24A, the angularly offset and non-perpendicular surface 24B, and the planar surface 26. The first functionalized layer 28A may be any of the gel materials described herein and may be applied as described herein in reference to FIG. 4C. A curing process may be performed after deposition.

Referring specifically to FIG. 6G, the sacrificial layer 70 is removed using a wet etch or lift-off process. The condition (s) of the wet etch process or the lift-off process is/are capable of dissolving or otherwise lifting off the sacrificial layer 70, and thus depend upon the type of sacrificial layer 70 used. Any of the examples described in reference to FIG. 4D may be used. The wet etch or lift-off process removes i) at least 99% of the sacrificial layer 70 and ii) the functionalized layer 28A positioned thereon. Thus, this process exposes a portion 78 of the first angularly offset and non-perpendicular surface 24A, while leaving the remainder of the first functionalized layer 28A intact.

The second functionalized layer 28B is then selectively applied over the portion 78 of the first of the two angularly offset and non-perpendicular surfaces 24A. The second functionalized layer 28B may be any of the gel materials described herein and may be applied using any suitable deposition technique under high ionic strength conditions (e.g., in the presence of 10×PBS, NaCl, KCl, etc.). A curing process, as described herein, may be performed after deposition. Because the deposition of the second functionalized layer 28B is performed under high ionic strength in this example, the second functionalized layer 28B does not deposit on or adhere to the first functionalized layer 28A. As such, the second functionalized layer 28B does not contaminate the first functionalized layer 28A. The second functionalized layer 28B does attach to the exposed portion 78 of the first angularly offset and non-perpendicular surface 24A, which has surface groups capable of attaching to the second functionalized layer 28B.

This example method further comprises polishing the first functionalized layer 28A and the second functionalized layer 28B from the planar surface 26 of the substrate 14. Polishing may be performed as described in reference to FIG. 4F and results in a structure similar to that represented by FIG. 6I.

While not shown, the method shown in FIG. 6A through FIG. 6I also includes attaching respective primer sets 30, 31 to the functionalized layers 28A, 28B. In some examples, the primers 56, 58 or 56', 58' (not shown in FIG. 6A through FIG. 6I) may be pre-grafted to the functionalized layer 28A. Similarly, the primers 60, 62 or 60', 62' (also not shown in FIG. 6A through FIG. 6I) may be pre-grafted to the functionalized layer 28B. In these examples, additional primer grafting is not performed.

In other examples, the primers 56, 58 or 56', 58' are not pre-grafted to the functionalized layer 28A. In these examples, the primers 56, 58 or 56', 58' may be grafted after the functionalized layer 28A is applied (e.g., at FIG. 6F). In these examples, the primers 60, 62 or 60', 62' may be pre-grafted to the second functionalized layer 28B. Alternatively, in these examples, the primers 60, 62 or 60', 62' may not be pre-grafted to the second functionalized layer 28B. Rather, the primers 60, 62 or 60', 62' may be grafted immediately after the second functionalized layer 28B is applied (e.g., at FIG. 6H) or after polishing (FIG. 6I) as long as i) the functionalized layer 28B has different functional groups (than functionalized layer 28A) for attaching the primers 60, 62 or 60', 62' or ii) any unreacted functional groups of the functionalized layer 28A have been quenched, e.g., using the Staudinger reduction to generate amines or an additional click reaction with a passive molecule such as hexynoic acid.

When grafting is performed during the method, grafting may be accomplished using any suitable grafting technique.

While a single set of the functionalized layers 28A, 28B is shown in FIG. 6I, it is to be understood that the method described in reference to FIG. 6A through FIG. 6I may be performed to generate an array of depressed triangular prisms 44' (each having functionalized layers 28A, 28B and primer sets 30, 31 therein) separated by interstitial regions across the planar surface 26 of the substrate 14.

The example method shown in FIG. 7A through FIG. 7F is similar to the example shown in FIG. 6A through FIG. 6I, except that the sacrificial layer 70 is not utilized. This example method includes etching the substrate 14 through the through-hole 76 defined in the mask layer 74 positioned over the substrate 14 to form a triangular prism 44' defined in the substrate 14; angle depositing a first functionalized layer 28A through the through-hole 76 and onto a first of the two angularly offset and non-perpendicular surfaces 24A; angle depositing a second functionalized layer 28B through the through-hole 76 and onto a second of the two angularly offset and non-perpendicular surfaces 24B; and removing the mask layer 74.

Figure 7A:
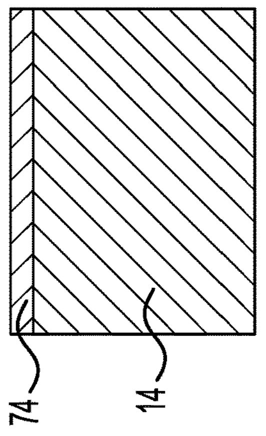
FIG. 7A through FIG. 7F together schematically depict still another example method, where
Figure 7B:
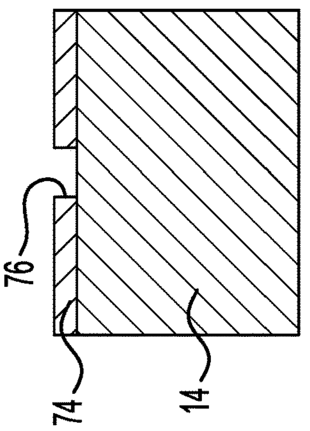
Figure 7C:
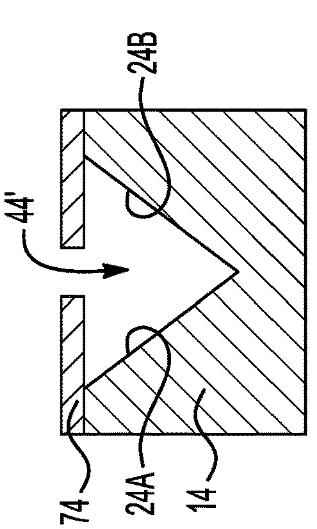

As depicted in FIG. 7A and FIG. 7B, this example method utilizes the single layer substrate 14 and the mask layer 74 positioned over the single layer substrate 14. Any of the examples of the single layer substrate 14 and the mask layer 74 may be used.

The mask layer 74 may be applied and patterned to form the through-hole 76 as described in reference to FIG. 6A and FIG. 6B.

The single layer substrate 14 may be etched through the through-hole 76 as described in reference to FIG. 6C.

Figure 7D:
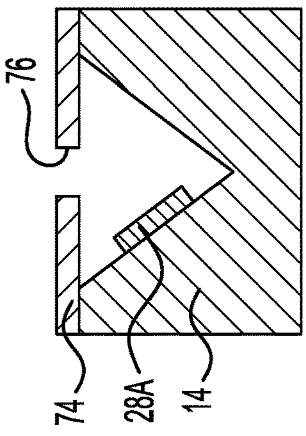

In this example, the first functionalized layer 28A is then angle deposited through the through-hole 76 and onto the first of the two angularly offset and non-perpendicular surfaces 24A. In this example, the angle deposition involves inkjet printing or microcontact printing the gel material (of the first functionalized layer 28A) through the through-hole 76. The gel material may be formulated with a viscosity that is suitable for the particular printing technique. The applied gel material may be cured to form the first functionalized layer 28A. The resulting structure is shown in FIG. 7D.

Figure 7E:
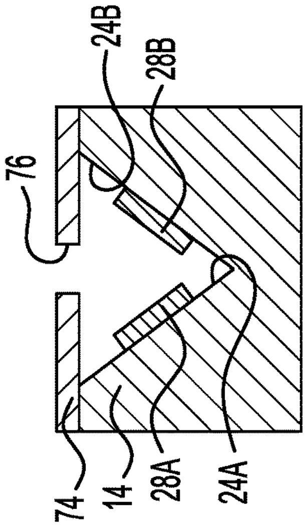

As depicted in FIG. 7E, the second functionalized layer 28B is then angle deposited through the through-hole 76 and onto the second of the two angularly offset and non-perpendicular surfaces 24B. In this example, the angle deposition involves inkjet printing or microcontact printing the gel material (of the second functionalized layer 28B) through the through-hole 76. The gel material may be formulated with a viscosity that is suitable for the particular printing technique. The applied gel material may be cured to form the second functionalized layer 28B.

Figure 7F:
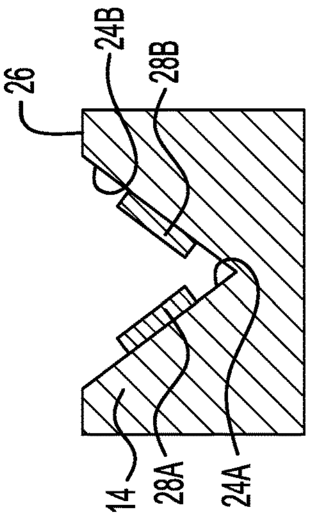

As depicted in FIG. 7F, the mask layer 74 is removed. The removal process will depend upon the material used for the mask layer 74. The removal of the mask layer 74 should not remove the first and second functionalized layers 28A, 28B. Any of the removal techniques described herein for the mask layer 74 may be used.

While not shown, the method shown in FIG. 7A through FIG. 7F also includes attaching respective primer sets 30, 31 to the functionalized layers 28A, 28B. In some examples, the primers 56, 58 or 56', 58' (not shown in FIG. 7A through FIG. 7F) may be pre-grafted to the functionalized layer 28A. Similarly, the primers 60, 62 or 60', 62' (also not shown in FIG. 7A through FIG. 7F) may be pre-grafted to the functionalized layer 28B. In these examples, additional primer grafting is not performed.

In other examples, the primers 56, 58 or 56', 58' are not pre-grafted to the functionalized layer 28A. In these examples, the primers 56, 58 or 56', 58' may be grafted after the functionalized layer 28A is applied (e.g., at FIG. 7D). In these examples, the primers 60, 62 or 60', 62' may be pre-grafted to the second functionalized layer 28B. Alternatively, in these examples, the primers 60, 62 or 60', 62' may not be pre-grafted to the second functionalized layer 28B. Rather, the primers 60, 62 or 60', 62' may be grafted after the second functionalized layer 28B is applied and the mask layer 74 is removed (e.g., at FIG. 7F) as long as i) the functionalized layer 28B has different functional groups (than functionalized layer 28A) for attaching the primers 60, 62 or 60', 62' or ii) any unreacted functional groups of the functionalized layer 28A have been quenched, e.g., using the Staudinger reduction to generate amines or an additional click reaction with a passive molecule such as hexynoic acid.

When grafting is performed during the method, grafting may be accomplished using any suitable grafting technique.

While a single set of the functionalized layers 28A, 28B is shown in FIG. 7F, it is to be understood that the method described in reference to FIG. 7A through FIG. 7F may be performed to generate an array of depressed triangular prisms 44' (each having functionalized layers 28A, 28B and primer sets 30, 31 therein) separated by interstitial regions across the planar surface 26 of the substrate 14.

Methods for Forming the Architecture of FIG. 2B

The example method shown in the series of figures from FIG. 8A to FIG. 8H may be used to generate the architecture shown in FIG. 2B. In this example, the reaction area 22' is defined in the substrate 16; and the two angularly offset and non-perpendicular surfaces 24A, 24B protrude outward relative to the planar surface 26 of the substrate 16.

The method shown in FIG. 8A to FIG. 8H generally includes defining a triangular prism 44" in a substrate 16, the triangular prism 44" including two angularly offset and non-perpendicular surfaces 24A, 24B relative to a planar surface 26 of the substrate 16; angle depositing a sacrificial layer 70 over a first of the two angularly offset and non-perpendicular surfaces 24A or 24B; depositing a first functionalized layer 28A over the sacrificial layer 70 and over a second of the two angularly offset and non-perpendicular surfaces 24B or 24A; removing the sacrificial layer 70, thereby exposing the first of the two angularly offset and non-perpendicular surfaces 24A or 24B; and selectively applying a second functionalized layer 28B over the first of the two angularly offset and non-perpendicular surfaces 24A or 24B. In this example method, prior to angle sputtering the sacrificial layer 70, the method further comprises applying a second sacrificial layer 80 over the triangular prism 44" and the planar surface 26 of the substrate 16, wherein the second sacrificial layer 80 has a different etch rate than the substrate 16; and etching the second sacrificial layer 80 to expose the triangular prism 44" without exposing the planar surface 26 of the substrate 16; and after the second functionalized layer 28B is selectively applied, the method further comprises removing the second sacrificial layer 80 from the planar surface 26 of the substrate 16.

In the example shown in FIG. 8A through FIG. 8H, the substrate 16 is used, and the triangular prism 44" is defined in the resin layer 20 of the substrate 16. Defining the triangular prism 44" in the substrate 16 involves nanoimprint lithography or dry etching. While the substrate 16 is used in the method shown in FIG. 8A through FIG. 8H, it is to be understood that the single layer substrate 14 (e.g., fused silica or silicon) may be used instead.

In one example, nanoimprint lithography is used to define the triangular prism 44". In this example, a working stamp is pressed into the single resin layer 20 while the material is soft, which creates an imprint of the working stamp features in the resin layer 20. In this example, each working stamp feature is a negative replica of the protruding triangular prism 44". The resin layer 20 may then be cured with the working stamp in place as described in reference to FIG. 4A. After curing, the working stamp is released. This creates topographic features (e.g., the protruding triangular prism 44") in the resin layer 20.

In another example, dry etching is used to define the triangular prism 44". Suitable dry etching conditions include a $CF_4$ and $O_2$ reactive ion etch or $SF_6$ and $O_2$ reactive ion etch.

After the protruding triangular prism 44" is formed, the sacrificial layer 80 is applied over the substrate 16 (e.g., over the resin layer 20). The sacrificial layer 80 may be any material that is susceptible to plasma etching conditions (to which the resin layer 20 is not susceptible) and that is soluble in an organic solvent. As examples, the sacrificial material 80 is a negative photoresist, a positive photoresist, poly(methyl methacrylate), or the like. Any examples of the negative photoresist set forth herein may be used for the sacrificial layer 80. Examples of suitable positive photoresists include the MICROPOSIT® S1800 series or the AZ® 1500 series, both of which are available from Kayaku Advanced Materials, Inc., or SPR™-220 (from DuPont). When a photoresist is used, it is exposed to desired conditions (e.g., UV exposure, no UV exposure) for developing the photoresist and rendering it insoluble in a developer.

The sacrificial material 80 may be applied using any suitable deposition technique disclosed herein (e.g., spin coating, etc.) and may be cured (e.g., using heating).

Figures 8A, 8B, 8C, 8D, 8E, 8F, 8G, 8H:
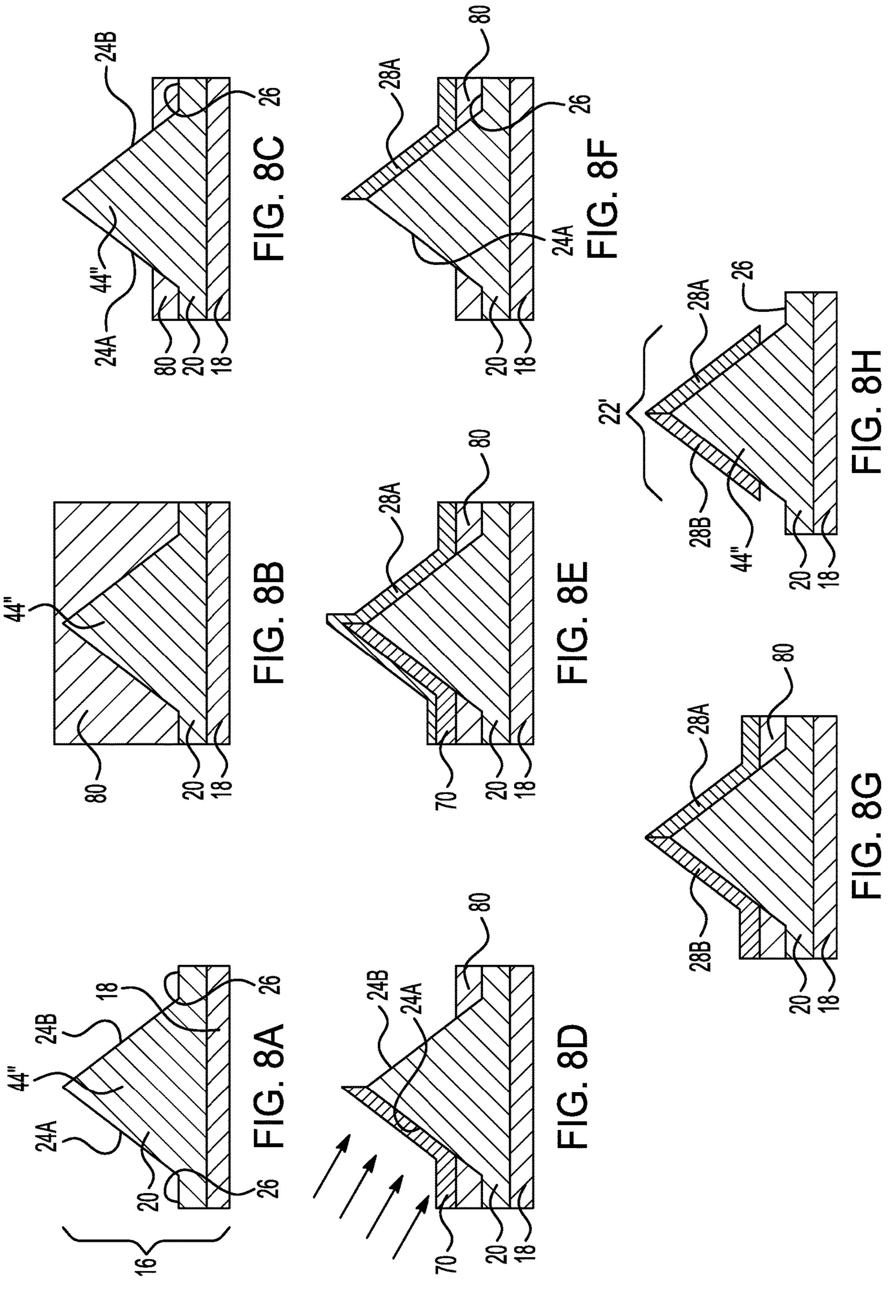
FIG. 8A through FIG. 8H together schematically depict another example method, where

Referring now to FIG. 8C, the sacrificial layer 80 is dry etched to expose the protruding triangular prism 44" without exposing the planar surface 26. This dry etching process is performed for a measured amount of time to expose the desired surfaces 24A, 24B. As shown in FIG. 8C, the timed dry etching is stopped so that the planar surface 26 surrounding the protruding triangular prism 44" is not exposed. In one example, the timed dry etch may involve a reactive ion etch (e.g., with 10% $CF_4$ and 90% $O_2$) where the sacrificial layer 80 is etched at a rate of about 17 nm/min. In another example, the timed dry etch may involve a 100% $O_2$ plasma etch where the sacrificial layer 80 is etched at a rate of about 98 nm/min. As noted above, the second sacrificial layer 80 has a different etch rate than the substrate 16 (e.g., at least the resin layer 20 of the substrate 16), and thus the triangular prism 44" will remain intact as the timed dry etching occurs.

As shown in FIG. 8D, the method then includes angle depositing the sacrificial layer 70 over a first of the two angularly offset and non-perpendicular surfaces, e.g., surface 24A. The sacrificial layer 70 may be any of the example materials set forth herein. In this example method, the angled deposition techniques described in reference to FIG. 4B may be used. In this example, shape of the protruding triangular prism 44" also produces a shadow effect that prevents the material of the sacrificial layer 70 from being applied to the surface 24B.

The first functionalized layer 28A is then applied over the sacrificial layers 70, 80, and over the exposed surface of the resin layer 20, as depicted in FIG. 8E. As depicted in FIG. 8D, the exposed surface of the resin layer 20 includes at least a portion of the angularly offset and non-perpendicular surface 24B. The first functionalized layer 28A may be any of the gel materials described herein and may be applied using any suitable deposition technique. A curing process may be performed after deposition. The first functionalized layer 28A covalently attaches to the exposed portion of the angularly offset and non-perpendicular surface 24B.

Referring specifically to FIG. 8F, the sacrificial layer 70 is then removed using a wet etch or lift-off process. The condition(s) of the wet etch process or the lift-off process is/are capable of dissolving or otherwise lifting off the sacrificial layer 70, without dissolving or otherwise lifting off the sacrificial layer 80. The wet etch or lift-off process removes i) at least 99% of the sacrificial layer 70 and ii) the functionalized layer 28A positioned thereon. Thus, the wet etch or lift-off process exposes the first angularly offset and non-perpendicular surface 24A and the portion of the sacrificial layer 80 that overlies the planar surface 26 adjacent to the surface 24A. The wet etch or lift-off process does not remove the portion of the first functionalized layer 28A that is positioned over the second angularly offset and non-perpendicular surface 24B or the portion of the sacrificial layer 80 that overlies the planar surface 26 adjacent to the surface 24B.

The second functionalized layer 28B is then selectively applied over the first of the two angularly offset and non-perpendicular surfaces 24A and over the sacrificial layer 80 that is adjacent to the angularly offset and non-perpendicular surfaces 24A. This is shown in FIG. 8G. The second functionalized layer 28B may be any of the gel materials described herein and may be applied using any suitable deposition technique under high ionic strength conditions (e.g., in the presence of 10×PBS, NaCl, KCl, etc.). A curing process, as described herein, may be performed after deposition. As described herein, the deposition of the second functionalized layer 28B under high ionic strength keeps the second functionalized layer 28B from depositing on or adhering to the first functionalized layer 28A. As such, the second functionalized layer 28B does not contaminate the first functionalized layer 28A. The second functionalized layer 28B does attach to the exposed surfaces of the resin layer 20, e.g., the first angularly offset and non-perpendicular surface 24A.

Referring specifically to FIG. 8H, the remaining sacrificial layer 80 is removed in a lift-off process. The lift-off process may involve an organic solvent that is capable of dissolving or otherwise lifting off the sacrificial layer 80. A cured positive photoresist may be lifted off with removers such as dimethylsulfoxide (DMSO) with sonication, an acetone wash, a propylene glycol monomethyl ether acetate wash, or an NMP (N-methyl-2-pyrrolidone) based stripper wash. A cured negative photoresist may be lifted off with removers such as dimethylsulfoxide (DMSO) with sonication, an acetone wash, or an NMP (N-methyl-2-pyrrolidone) based stripper wash. Cured poly(methyl methacrylate) may be lifted off with dimethylsulfoxide (DMSO) using sonication, or in acetone, or with an NMP (N-methyl-2-pyrrolidone) based stripper. The sacrificial layer 80 is soluble (at least 99% soluble) in the organic solvent used in the lift-off process. The lift-off process removes i) at least 99% of the sacrificial layer 80 and ii) the functionalized layers 28A, 28B positioned thereon. The lift-off process does not remove the functionalized layers 28A, 28B attached to the respective surfaces 24B, 24A. Thus, the lift-off process exposes the planar surface 26, which defines interstitial regions when an array of reaction areas 22' is formed.

While not shown, the method shown in FIG. 8A through FIG. 8H also includes attaching respective primer sets 30, 31 to the functionalized layers 28A, 28B. In some examples, the primers 56, 58 or 56', 58' (not shown in FIG. 8A through FIG. 8H) may be pre-grafted to the functionalized layer 28A. Similarly, the primers 60, 62 or 60', 62' (also not shown in FIG. 8A through FIG. 8H) may be pre-grafted to the functionalized layer 28B. In these examples, additional primer grafting is not performed.

In other examples, the primers 56, 58 or 56', 58' are not pre-grafted to the functionalized layer 28A. In these examples, the primers 56, 58 or 56', 58' may be grafted after the functionalized layer 28A is applied (e.g., at FIG. 8E or FIG. 8F). In these examples, the primers 60, 62 or 60', 62' may be pre-grafted to the second functionalized layer 28B. Alternatively, in these examples, the primers 60, 62 or 60', 62' may not be pre-grafted to the second functionalized layer 28B. Rather, the primers 60, 62 or 60', 62' may be grafted immediately after the second functionalized layer 28B is applied (e.g., at FIG. 8G) or after sacrificial layer 80 removal (FIG. 8H) as long as i) the functionalized layer 28B has different functional groups (than functionalized layer 28A) for attaching the primers 60, 62 or 60', 62' or ii) any unreacted functional groups of the functionalized layer 28A have been quenched, e.g., using the Staudinger reduction to generate amines or an additional click reaction with a passive molecule such as hexynoic acid.

When grafting is performed during the method, grafting may be accomplished using any suitable grafting technique.

While a single set of the functionalized layers 28A, 28B is shown in FIG. 8H, it is to be understood that the method described in reference to FIG. 8A through FIG. 8H may be performed to generate an array of protruding triangular prisms 44" (each having functionalized layers 28A, 28B and primer sets 30, 31 thereon) separated by interstitial regions across the planar surface 26 of the substrate 16.

Methods for Forming the Architecture of FIG. 2C

FIG. 9A through FIG. 9J illustrate two example methods to generate the architecture shown in FIG. 2C. One example method is shown in FIG. 9A to FIG. 9G and the other example method is shown in FIG. 9A-FIG. 9C and FIG. 9H-FIG. 9J. In these examples, the reaction area 22" is defined in a layer 82 over the substrate 14; the two angularly offset and non-perpendicular surfaces 24A, 24B are part of a triangular prism 44''' defined in the layer 82; and the flow cell 10 further comprises a post 54 positioned on the substrate 14 and supporting the triangular prism 44''' such that the triangular prism 44''' is a spaced distance d from the planar surface 26.

The method shown in FIG. 9A to FIG. 9G generally includes defining a triangular prism 44''' over a substrate 14; angle depositing a sacrificial layer 70 over a first of the two angularly offset and non-perpendicular surfaces 24A of the triangular prism 44'''; depositing a first functionalized layer 28A over the sacrificial layer 70 and over a second of the two angularly offset and non-perpendicular surfaces 24B of the triangular prism 44'''; removing the sacrificial layer 70, thereby exposing the first of the two angularly offset and non-perpendicular surfaces 24A; and selectively applying a second functionalized layer 28B over the first of the two angularly offset and non-perpendicular surfaces 24A.

The method shown in FIG. 9A through FIG. 9C and FIG. 9H through FIG. 9J generally includes defining a triangular prism 44''' over a substrate 14; introducing a precursor adhesive component 86 over a first of the two angularly offset and non-perpendicular surfaces 24A of the triangular prism 44'''; depositing a first functionalized layer 28A that selectively attaches to a second of the two angularly offset and non-perpendicular surfaces 24B and not to the precursor adhesive component 86; activating the precursor adhesive component 86 to form an adhesive component 86' over the first of the two angularly offset and non-perpendicular surfaces 24A; and depositing a second functionalized layer 28B that selectively attaches to the adhesive component 86'.

Figures 9A, 9B, 9C, 9D, 9E, 9F, 9G:
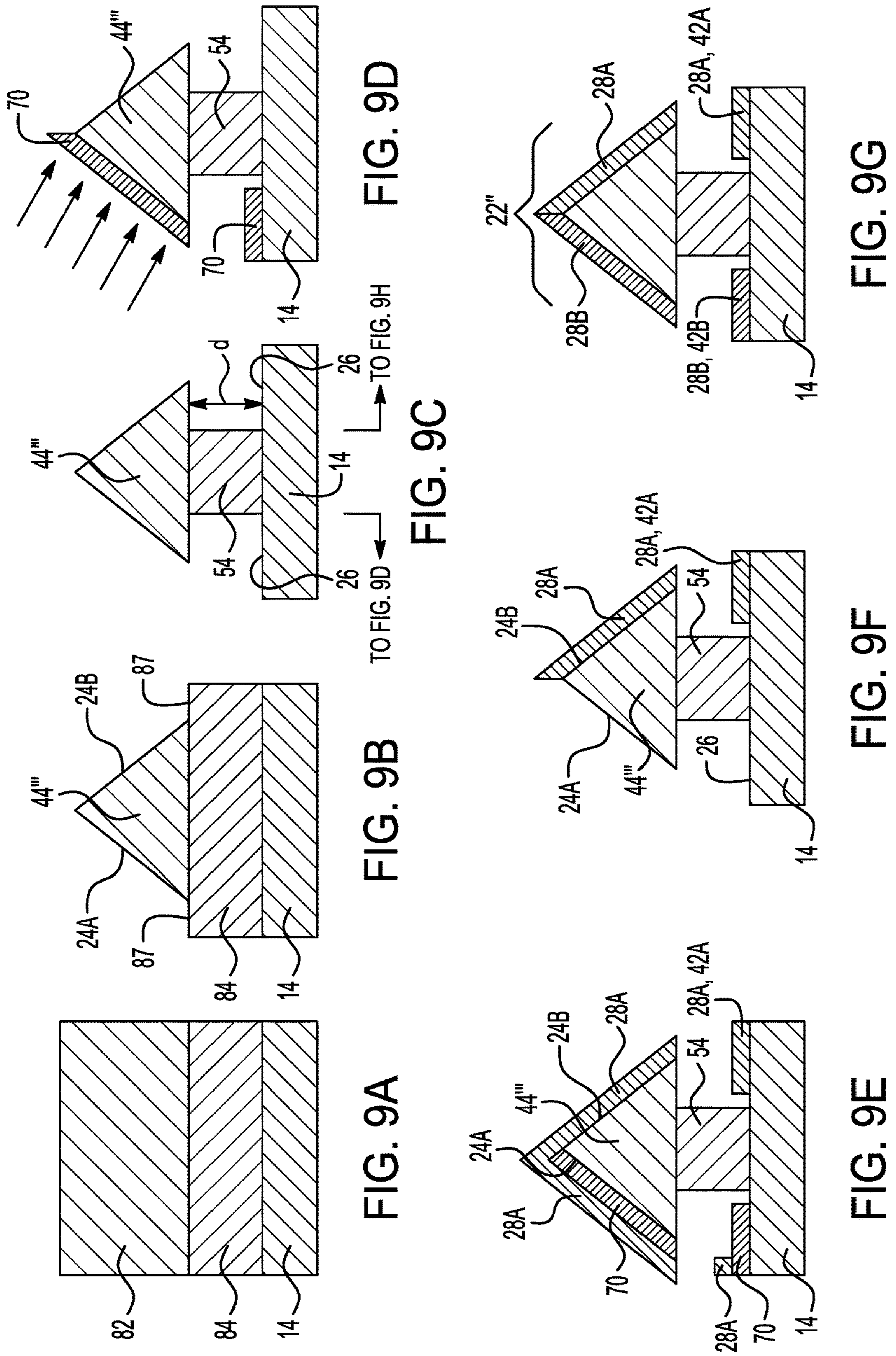
FIG. 9A through FIG. 9G together schematically depict still another example method, where

As shown in FIG. 9A, these methods utilize the single base substrate 14, which has a first layer 82 positioned over a second layer 84 positioned over the substrate 14, wherein the first and second layers 82, 84 have different etch rates. The substrate 14 may be selected to have the same or a similar etch rate as the first layer 82, so that it acts as an etch stop when the second layer 84 is etched. Examples of the materials for the first layer 82 include silicon or any of the materials set forth herein for the resin layer 20. Examples of the materials for the second layer 84 include silicon dioxide, a nanoimprint lithography resist, any of the photoresists set forth herein, or poly(methyl methacrylate). Some commercially available examples of suitable nanoimprint lithography resists include mr-NIL200, mr-NIL210, and mr-NIL210FC from Kayaku.

Some example material combinations for the substrate 14/second layer 84/first layer 82 include silicon/silicon dioxide/silicon, nanoimprint lithography resin/nanoimprint lithography resist/nanoimprint lithography resin, or nanoimprint lithography resin/photoresist or poly(methyl methacrylate)/nanoimprint lithography resin.

In this example, defining the triangular prism 44''' over the substrate 14 involves nanoimprinting or dry etching the triangular prism 44''' in the first layer 82 positioned over the second layer 84 positioned over the substrate 14. In this example, nanoimprinting may be performed as described in reference to FIG. 8A. Alternatively, the triangular prism 44''' may be dry etched in the first layer 82 using gray scale lithography or wet etching on the crystal plane. The formation of the triangular prism 44''' exposes surfaces 87 of the underlying second layer 84 adjacent to the triangular prism 44''', as shown in FIG. 9B.

The method then includes isotropically etching the second layer 84 to form a post 54 that supports the triangular prism 44''' a spaced distance d from the planar surface 26 (of the substrate 14) and to expose a portion of the planar surface 26 adjacent to the post 54. This is shown in FIG. 9C. The isotropic etch may be a dry etching process that depends upon the material of the second layer 84. When layer 84 is a nanoimprint lithography resist, isotropic etching may be performed with an $O_2$ reactive ion etch and high process pressure (e.g., 100 mTorr). When layer 84 is silicon dioxide, isotropic etching may be performed with a $CHF_3$ and $O_2$ reactive ion etch and high process pressure.

Because the triangular prism 44''' is not susceptible to this isotropic etching process, etching of the layer 84 initiates at the exposed surfaces 87, and because neither the triangular prism 44''' nor the substrate 14 is susceptible to this isotropic etching process, etching of the layer 84 continues partially under the triangular prism 44'''. This undercuts the triangular prism 44''' to form the post 54. As described herein in reference to FIG. 2C, the spaced distance d between the planar surface 26 and the bottom surface of the triangular prism 44''' will depend upon the thickness of the second layer 84.

The method described in FIG. 9D through FIG. 9G will now be described. As depicted in FIG. 9D, the method includes angle depositing the sacrificial layer 70 over a first of the two angularly offset and non-perpendicular surfaces, e.g., surface 24A, and over a portion of the planar surface 26 at a first area that underlies the first of the two angularly offset and non-perpendicular surfaces 24A. As depicted in FIG. 9D, the sacrificial layer 70 that is applied to the planar surface 26 may also extend toward the post 54 and/or out from under the triangular prism 44'''. The total width of the sacrificial layer 70 that is applied to the planar surface 26 will depend upon the angle of the target and the positioning of the collimator. Any of the materials for the sacrificial layer 70 may be used in this example. The material for the sacrificial layer 70 may be deposited via either of the angled deposition techniques described herein in reference to FIG. 4B.

The first functionalized layer 28A is then applied. The first functionalized layer 28A may be any of the gel materials described herein and may be applied and cured as described herein in reference to FIG. 4C.

In the example shown in FIG. 9E, the first functionalized layer 28A is applied over the second of the two angularly offset and non-perpendicular surfaces 24B and over the sacrificial layer 70 that is positioned over the first of the two angularly offset and non-perpendicular surfaces 24A. Because portions of the planar surface 26 and of the sacrificial layer 70 positioned over the planar surface 26 are exposed (e.g., when viewed from the top) near the base of the triangular prism 44''', some of the first functionalized layer 28A is also applied over i) a portion of the planar surface 26 that is adjacent to the second of the two angularly offset and non-perpendicular surfaces 24B, and ii) a portion of the sacrificial layer 70 that is positioned over the planar surface 26 that is adjacent to the first of the two angularly offset and non-perpendicular surfaces 24A. The portion of the first functionalized layer 28A that is applied over the portion of the planar surface 26 that is adjacent to the second of the two angularly offset and non-perpendicular surfaces 24B is a functionalized layer pad 42A.

Referring now to FIG. 9F, the sacrificial layer 70 is removed using a wet etch or lift-off process. The condition(s) of the wet etch process or the lift-off process is/are capable of dissolving or otherwise lifting off the sacrificial layer 70, and thus depend upon the type of sacrificial layer 70 used. Any of the examples set forth herein may be used. The wet etch or lift-off process removes i) at least 99% of the sacrificial layer 70 and ii) the functionalized layer 28A positioned thereon. Thus, the wet etch or lift-off process exposes the first angularly offset and non-perpendicular surface 24A and the portion of the planar surface 26 adjacent to the surface 24A. The wet etch or lift-off process does not remove the portion of the first functionalized layer 28A that is positioned over the second angularly offset and non-perpendicular surface 24B or over the planar surface 26 adjacent to the surface 24B.

The second functionalized layer 28B is then selectively applied over the first of the two angularly offset and non-perpendicular surfaces 24A. This is depicted in FIG. 9G. The second functionalized layer 28B may be any of the gel materials described herein and may be applied using any suitable deposition technique under high ionic strength conditions (e.g., in the presence of 10×PBS, NaCl, KCl, etc.) so that the second functionalized layer 28B does not deposit on or adhere to the first functionalized layer 28A. A curing process, as described herein, may be performed after deposition.

The second functionalized layer 28B attaches to the first angularly offset and non-perpendicular surface 24A and a portion of the planar surface 26 adjacent to the surface 24A, which has surface groups capable of attaching to the second functionalized layer 28B. The second functionalized layer 28B applied to the portion of the planar surface 26 adjacent to the surface 24A defines another functionalized layer pad 42B.

The method described in FIG. 9H through FIG. 9J will now be described. In this example, after the triangular prism 44''' is defined (FIG. 9C), the method continues with introducing the precursor adhesive component 86 over a first of the two angularly offset and non-perpendicular surfaces 24A of the triangular prism 44'''. The precursor adhesive component 86 may be any material that does not inherently include surface groups to covalently attach to the functionalized layers 24A, 24B. An example of the precursor adhesive component 86 is $Ta_2O_5$. The precursor adhesive component 86 is angle deposited as described in reference to FIG. 4B so that it is selectively applied to the first of the two angularly offset and non-perpendicular surfaces 24A and to a portion of the planar surface 26 that is adjacent to the first of the two angularly offset and non-perpendicular surfaces 24A. The extent to which the planar surface 26 is covered with the precursor adhesive component 86 will depend upon the angle of the target and the positioning of the collimator. The deposited precursor adhesive component 86 is shown in FIG. 9H.

In this example method, the triangular prism 44''' is activated after the precursor adhesive component 86 is applied. The activation process should be selected so that it does not also activate the precursor adhesive component 86. In one example, the precursor adhesive component 86 is applied, and then the entire structure is exposed to plasma ashing. In this example, plasma ashing introduces —OH groups on the second of the two angularly offset and non-perpendicular surfaces 24B and to a portion of the planar surface 26 that is adjacent to the second of the two angularly offset and non-perpendicular surfaces 24B, but does not affect the precursor adhesive component 86. In this particular example, the precursor adhesive component 86 is $Ta_2O_5$ and both the triangular prism 44''' and the substrate 14 are a polyhedral oligomeric silsesquioxane based resin.

Figures 9H, 9I, 9J, 10A, 10B, 10C:
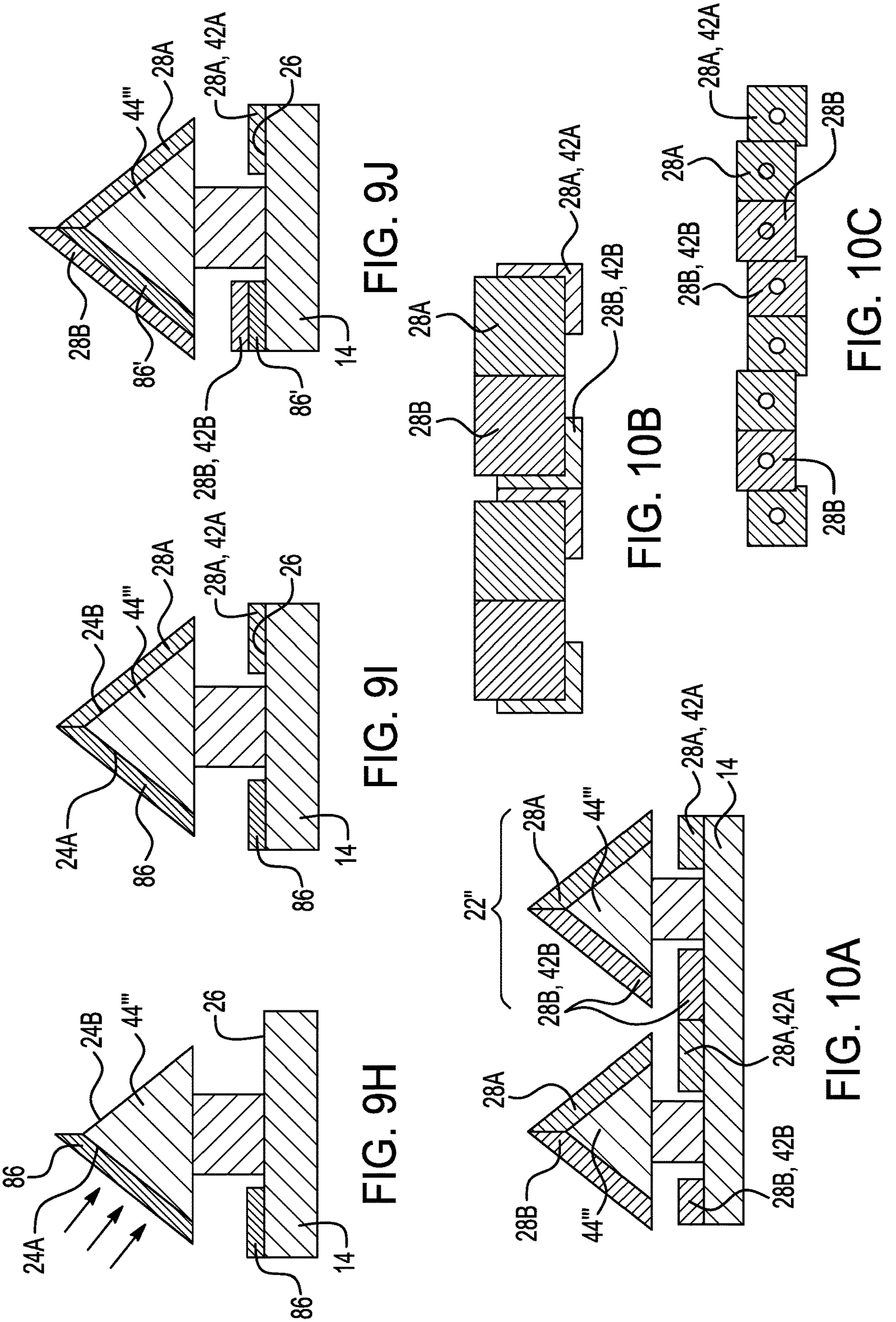

As illustrated in FIG. 9I, the first functionalized layer 28A is then applied. The first functionalized layer 28A may be any of the gel materials described herein and may be applied and cured as described herein in reference to FIG. 4C. Because of the different interactions at the precursor adhesive component 86 and at the surfaces 24B, 26, the functionalized layer 28A remains over the surfaces 24B, 26, and can be easily removed (e.g., via sonication, washing, wiping, etc.) from the precursor adhesive component 86. In this example then, the first functionalized layer 28A is applied over the second of the two angularly offset and non-perpendicular surfaces 24B and over a portion of the planar surface 26 that is adjacent to the second of the two angularly offset and non-perpendicular surfaces 24B. The portion of the first functionalized layer 28A that is applied over the portion of the planar surface 26 that is adjacent to the second of the two angularly offset and non-perpendicular surfaces 24B is a functionalized layer pad 42A.

This example method then includes activating the precursor adhesive component 86 to form an adhesive component 86' over the first of the two angularly offset and non-perpendicular surfaces 24A. In an example, the $Ta_2O_5$ precursor adhesive component 86 can be silanized to generate surface groups to react with the functionalized layer 28B. Silanization may be performed with norbornene silane, azido silane, alkyne functionalized silane, amine functionalized silane, maleimide silane, or any other silane having functional groups that can attach the functionalized layer 28B. The adhesive component 86' (i.e., the activated precursor) is shown in FIG. 9J. Silanization has a minimal effect (e.g., in terms of ability to primer graft) on the functionalized layer 28A when performed at low temperatures (e.g., from 25° C. to 60° C.), and thus the functionalized layer 28A may also be exposed to silanization as well.

Also shown in FIG. 9J is the second functionalized layer 28B. The second functionalized layer 28B may be any of the gel materials described herein and may be applied using any suitable deposition technique. The second functionalized layer 28B readily attaches to the adhesive component 86' due to the surface groups introduced during activation. The high ionic strength conditions (e.g., in the presence of 10×PBS, NaCl, KCl, etc.) described herein may be used during the deposition process to ensure that the second functionalized layer 28B does not deposit on or adhere to the first functionalized layer 28A. As such, the second functionalized layer 28B selectively attaches to the adhesive component 86', and thus is applied over the first of the angularly offset and non-perpendicular surfaces 24A and on the portion of the planar surface 26 that is adjacent to the surface 24A. The second functionalized layer 28B applied to the portion of the adhesive component 86' on the planar surface 26 adjacent to the surface 24A defines another functionalized layer pad 42B.

Referring again to FIG. 9C, still another example of the method includes angle depositing the first functionalized layer 28A on one surface 24A of the triangular prism 44''' and on a portion of the base support 14 (similar to the sacrificial layer 70 in FIG. 9D), and then angle depositing the second functionalized layer 28B on the other surface 24B of the triangular prism 44''' and on another portion of the base support 14 (similar to the layer 28A in FIG. 9F). The resulting structure would be similar to that shown in FIG. 9G.

While not shown, the methods described in reference to FIG. 9A through FIG. 9J also include attaching respective primer sets 30, 31 to the functionalized layers 28A, 28B and the functionalized layer pads 42A, 42B. In some examples, the primers 56, 58 or 56', 58' (not shown in FIG. 9A through FIG. 9J) may be pre-grafted to the functionalized layer 28A and the functionalized layer pad 42A. Similarly, the primers 60, 62 or 60', 62' (also not shown in FIG. 9A through FIG. 9J) may be pre-grafted to the functionalized layer 28B and the functionalized layer pad 42B. In these examples, additional primer grafting is not performed.

In other examples, the primers 56, 58 or 56', 58' are not pre-grafted to the functionalized layer 28A or the functionalized layer pad 42A. In these examples, the primers 56, 58 or 56', 58' may be grafted after the functionalized layer 28A is applied (e.g., at FIG. 9E or FIG. 9F or at FIG. 9I). In these examples, the primers 60, 62 or 60', 62' may be pre-grafted to the second functionalized layer 28B and the second functionalized layer pad 42B. Alternatively, in these examples, the primers 60, 62 or 60', 62' may not be pre-grafted to the second functionalized layer 28B or the second functionalized layer pad 42B. Rather, the primers 60, 62 or 60', 62' may be grafted immediately after the second functionalized layer 28B and the second functionalized layer pad 42B are applied (e.g., at FIG. 9G or FIG. 9J) as long as i) the functionalized layer 28B and pad 42B have different functional groups (than functionalized layer 28A and pad 42A) for attaching the primers 60, 62 or 60', 62' or ii) any unreacted functional groups of the functionalized layer 28A and pad 42A have been quenched, e.g., using the Staudinger reduction to generate amines or an additional click reaction with a passive molecule such as hexynoic acid.

When grafting is performed during the method, grafting may be accomplished using any suitable grafting technique.

While a single set of the functionalized layers 28A, 28B and pads 42A, 42B are shown in FIG. 9G and FIG. 9J, it is to be understood that the methods described in reference to FIG. 9A through FIG. 9J may be performed to generate an array of protruding triangular prisms 44''' (each having functionalized layers 28A, 28B and primer sets 30, 31 thereon) separated by interstitial regions across the planar surface 26 of the substrate 14, and an array of functionalized layer pads 42A, 42B (each having primer sets 30, 31 thereon) between rows or columns of the triangular prisms 44'".

FIG. 10A illustrates one example of the architecture of FIG. 9J as an array with two reactive areas 22" and multiple functionalized layer pads 42A, 42B. When used in sequencing, signals will be generated from the reactive areas 22" and from the functionalized layer pads 42A, 42B. FIG. 10B and FIG. 10C illustrate two examples of how these signals may be used. In FIG. 10B, the signals from the reactive areas 22" are used and the signals from the functionalized layer pads 42A, 42B are ignored. In FIG. 10C, the signals from both the reactive areas 22" and the functionalized layer pads 42A, 42B are used.

In the examples shown in FIG. 9G and FIG. 9J, when the post 54 is made of a lift-off type of resist, the entire structure (e.g., post 54, triangular prism 44'" and any surface chemistry applied thereto) may be lifted off using a suitable remover. In this example, the final architecture would include the functionalized pads 42A, 42B alone as the reactive areas.

Methods for Forming the Architecture of FIG. 2D

The example method shown in the series of figures from FIG. 11A to FIG. 11D may be used to generate the architecture shown in FIG. 2D. This architecture is used in sequential paired-end read sequencing.

The method shown in FIG. 11A through FIG. 11D generally includes defining triangular prisms 44 (shown as 44A and 44B in these figures) in rows in a substrate 14, each triangular prism 44 including a first surface 46 that is perpendicular relative to a planar surface 26 of the substrate 14, and a second surface 48 that is angularly offset and non-perpendicular relative to the planar surface 26 of the substrate 14, wherein two adjacent triangular prisms 44 in any of the rows form an active pair 52 when the first surface 46 of one of the two adjacent triangular prisms 44A faces the second surface 48 of another of the two adjacent triangular prisms 44B; angle sputtering a sacrificial layer 70 over the second surfaces 48; depositing a functionalized layer 28 over the sacrificial layer 70 and over the first surfaces 46; and removing the sacrificial layer 70. FIG. 11A through FIG. 11D illustrate two triangular prisms 44A, 44B in a row, but it is to be understood that the prisms 44A, 44B may be formed the entire length or width of the substrate 14 (except, e.g., at a perimeter used for bonding).

Figures 11A, 11B, 11C, 11D, 12:
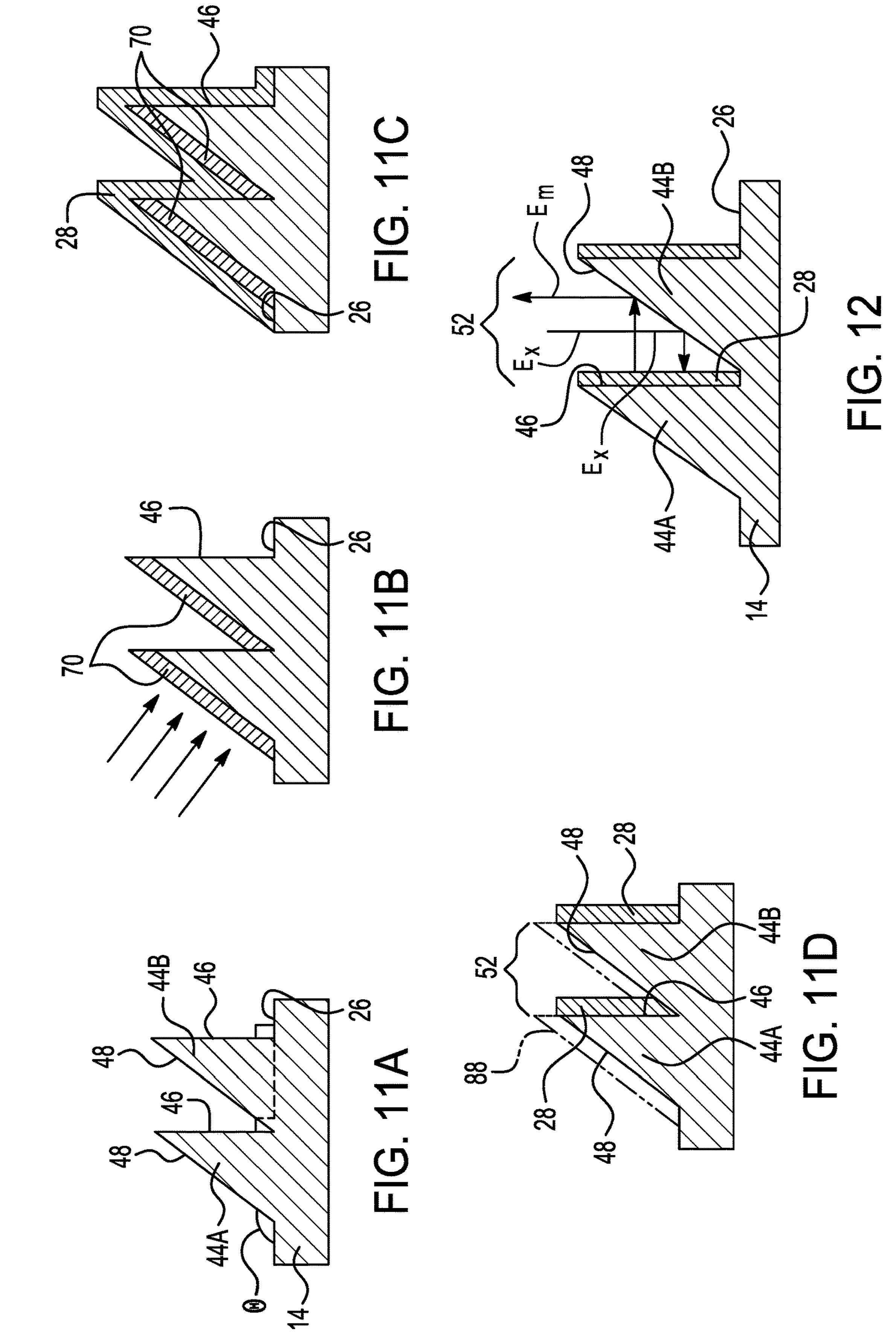
FIG. 11A through FIG. 11D together schematically depict yet a further example method, where
FIG. 12 schematically depicts the excitation and emission signals from an active pair formed from the structures of FIG. 11D.

As shown in FIG. 11A, the single layer substrate 14 is used. In some examples, the substrate 14 is a reflective material. In other examples, the substrate 14 is any of the single layer substrate materials set forth herein, and has a reflective coating 88 (shown in phantom in FIG. 11D) applied thereto.

Defining the triangular prisms 44A, 44B in the substrate 14 may involves nanoimprint lithography or dry etching, as described in reference to FIG. 4A. Another suitable method that may be used is roll-to-roll embossing printing. This method may be particularly suitable forming the triangular prisms 44A, 44B in a reflective material. In this example, the triangular prisms 44A, 44B that are formed have one surface 46 that is positioned 90° with respect to the planar surface 26 and another surface 48 that is slanted at an angle Θ with respect to the planar surface 26 that is greater than 90° and less than 180°. Thus, when nanoimprint lithography is used, the working stamp includes a negative replica of these particular triangular prisms 44A, 44B.

As depicted in FIG. 11B, the method includes angle depositing the sacrificial layer 70 over the second surfaces 48 of the triangular prisms 44A, 44B. Any of the materials for the sacrificial layer 70 may be used, and may be deposited via either of the angled deposition techniques described herein in reference to FIG. 4B. Due to the directional specificity of the angled deposition, the slanted surfaces 48 are coated with the sacrificial layer 70 while the vertical surfaces 46 and at least some of the planar surface 26 remain free of the sacrificial layer 70.

The functionalized layer 28 is then applied over the sacrificial layer 70 and over the exposed surfaces of the substrate 14, including the surfaces 46 and the planar surface 26. This is depicted in FIG. 11C. The functionalized layer 28 may be any of the gel materials described herein and may be applied as described herein in reference to FIG. 4C.

Referring specifically to FIG. 11D, the sacrificial layer 70 is then removed using a wet etch or lift-off process. The condition(s) of the wet etch process or the lift-off process is/are capable of dissolving or otherwise lifting off the sacrificial layer 70. The wet etch or lift-off process removes i) at least 99% of the sacrificial layer 70 and ii) the functionalized layer 28 positioned thereon. Thus, the wet etch or lift-off process exposes the slanted surfaces 48 of the triangular prisms 44A, 44B. The wet etch or lift-off process does not remove the portion of the first functionalized layer 28 that is positioned over the surfaces 46.

The previous description of the method of FIG. 11A through FIG. 11D is applicable when the substrate 14 is a reflective material, and the reflective surface 48 is defined by the reflective material. When the substrate 14 is not a reflective material, the reflective surface 48 is defined by an additional reflective material (e.g., reflective coating 88) applied to the substrate 14. In these examples, the method further comprises selectively applying a reflective coating 88 to the surfaces 48. In one example, the reflective coating 88 is selectively applied before the sacrificial layer 70 is selectively applied (e.g., after the process described in reference to FIG. 11A and before the process described in reference to FIG. 11B). In these instances, the sacrificial layer 70 should be selected so that during its removal, the underlying reflective coating 88 remains intact. In another example, the reflective coating 88 is selectively applied after the sacrificial layer 70 is removed (e.g., after the process described in reference to FIG. 11D). In either of the examples, the selective application of the reflective coating 88 may be performed using any of the angled deposition techniques described in reference to FIG. 4B.

While not shown, the method shown in FIG. 11A through FIG. 11D also includes attaching the primer set 50 to the functionalized layers 28. In some examples, the primers of the single primer set 50 (not shown in FIG. 11A through FIG. 11D) may be pre-grafted to the functionalized layer 28. In these examples, additional primer grafting is not performed.

In other examples, the primers of the single primer set 50 are not pre-grafted to the functionalized layers 28. In these examples, the may be grafted after the functionalized layer 28 is applied (e.g., at FIG. 11C or FIG. 11D). When grafting is performed during the method, grafting may be accomplished using any suitable grafting technique.

The surface 46, 48 of adjacent triangular prisms 44A, 44B form an active pair 52. More specifically, the surface 48 and the surface chemistry on the surface 46 (including the primer set 50 attached to the polymeric hydrogel/functionalized layer 28) forms an active pair 52. The reflective surface 48 of the active pair 52 can i) redirect and amplify excitation light $E_x$ introduced during sequencing, and ii) redirect and amplify emission signals $E_m$ generated from amplicons attached at the surface 46 during sequencing, as shown in FIG. 12.

Figure 13A:
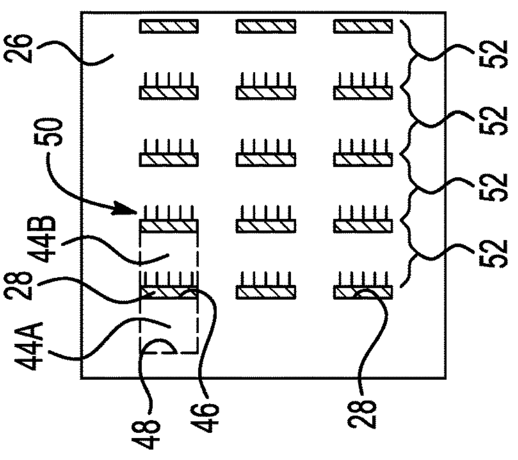
FIG. 13A depicts a top view of an array including a plurality of the structures of FIG. 11D.
Figure 13B:
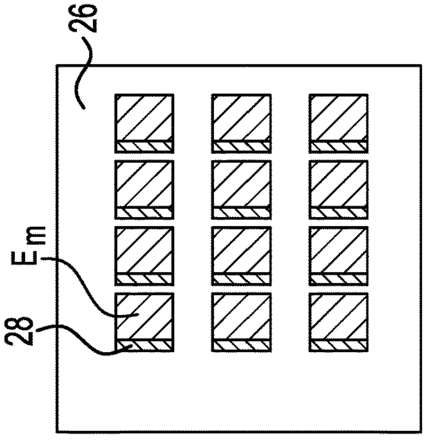
FIG. 13B depicts a top view of the signals generated from the array of FIG. 13A.

While a single active pair 52 is shown in FIG. 12, it is to be understood that the triangular prisms 44A, 44B may be formed in rows across the substrate 14. A top view of a substrate 14 including three rows of triangular prisms 44A, 44B is shown in FIG. 13A. In this example, at least four active pairs 52 are formed within each row. FIG. 13B illustrates the substrate 14 of FIG. 13A during sequencing, and the figure schematically depicts the emission signals $E_m$ that are amplified and reflected by the reflective surfaces 48 of each pair 52. As depicted in FIG. 13B, the architecture of FIG. 2D increases the intensity density of the emission.

Methods for Forming the Architecture of FIG. 2E

The example methods shown in FIG. 14A through FIG. 14F and in FIG. 15A through FIG. 15G may be used to generate the architecture shown in FIG. 2E.

The methods shown in FIG. 14A-FIG. 14F and FIG. 15A-FIG. 15G generally include defining a depression 90, 90' in at least one layer 92 (FIG. 14A) or 92', 94 (FIG. 15A and FIG. 15B) over a substrate 14 such that a surface 26 of the substrate 14 is exposed; angle sputtering a sacrificial layer 70 on a first portion 96, 96' of the depression 90, 90'; depositing a first functionalized layer 28A over the sacrificial layer 70 and over a second portion 98, 98' of the depression 90, 90'; removing the sacrificial layer 70, thereby exposing the first portion 96. 96' of the depression 90, 90'; and selectively depositing a second functionalized layer 28B over the first portion 96, 96' of the depression 90, 90'.

In the example shown in FIG. 14A through FIG. 14E, a layer 92 is positioned over the substrate 14, and the depression 90 is defined in the layer 92. The layer 92 may be any resin or photoresist i) that is soluble in a remover that does not solubilize or otherwise affect the underlying substrate 14 or the functionalized layers 28A, 28B or ii) that can be nanoimprinted. As examples, any of the positive or negative photoresists or nanoimprint lithography resists disclosed herein may be used.

The depression 90 may have any desirable geometry, such as a cylinder, cube, rectangular prism, or the like. The dimensions of the depression 90 may be similar to the dimensions set forth herein for the multi-depth depression 32, except that the depression 90 has a single depth.

When the layer 92 is a photoresist, the depression 90 may be defined in the layer 92 by developing the photoresist so that removal of the soluble portion creates the depression 90. Alternatively, the depression 90 can be formed using nanoimprint lithography or dry etching. The substrate 14 may have a different etch rate than the layer 92, and thus may function as an etch stop when dry etching is used.

Figure 14A:
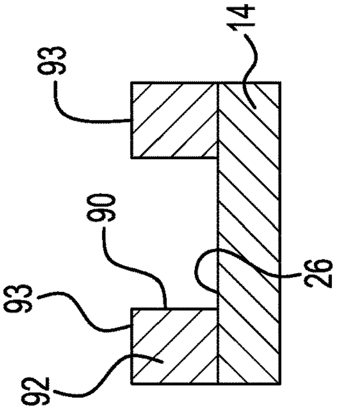
FIG. 14A through FIG. 14F together schematically depict still another example method, where
Figure 14B:
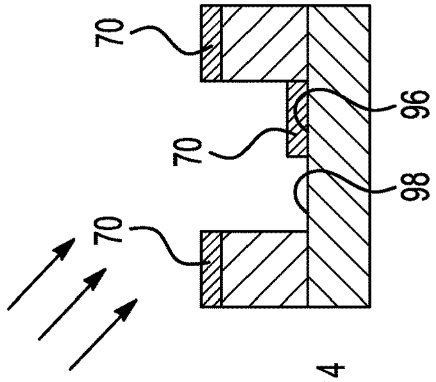

As depicted in FIG. 14B, the method includes angle depositing the sacrificial layer 70 over interstitial regions 93 of the layer 92 and over the first portion 96 of the depression 90. In this example, the first portion 96 of the depression 90 is a portion of the planar surface 26 of the single layer substrate 14 that is exposed at the depression 90. Because of the geometry of the depression 90 and the angle at which the deposition takes place, a shadow effect takes place where less or no material is deposited in an area of the depression 90 that is transverse to the incoming material. In the example shown in FIG. 14B, the shadow effect takes place over the second portion 98 of the depression 90. As such, the sacrificial layer 70 can be applied to the first depression portion 96, while a second portion 98 of the depression 90 remains exposed, i.e., free of the sacrificial layer 70.

It is to be understood that any of the materials for the sacrificial layer 70 may be used, as long as the removal conditions of the sacrificial layer 70 and the layer 92 are orthogonal (i.e., the layer 92 is unaffected by the conditions used to remove the sacrificial layer 70). As examples, the layer 92 may be a negative photoresist that can be lifted off in a remover such as dimethylsulfoxide (DMSO) with sonication, an acetone wash, or an NMP (N-methyl-2-pyrrolidone) based stripper wash, and the sacrificial layer 70 may be aluminum that can be removed in acidic or basic conditions or copper that can be removed using $FeCl_3$.

Figure 14C:
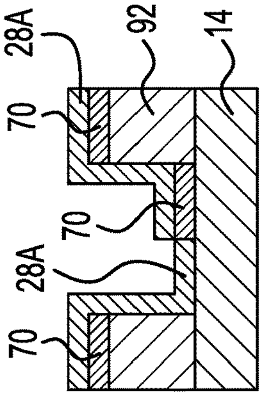

The functionalized layer 28A is then applied, as shown in FIG. 14C, over the sacrificial layer 70 and over the second portion 98 of the depression 90. Any suitable deposition technique may be used. The functionalized layer 28A may be any of the gel materials described herein and is formulated with a suitable viscosity for the selected deposition technique. A curing process, as described herein, may be performed after deposition.

Figure 14D:
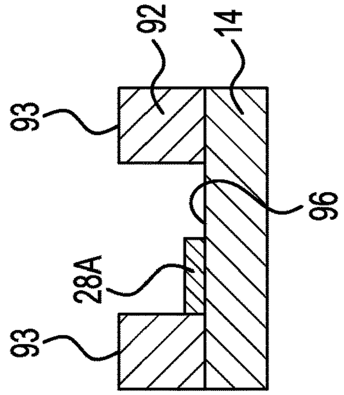
Figure 14E:
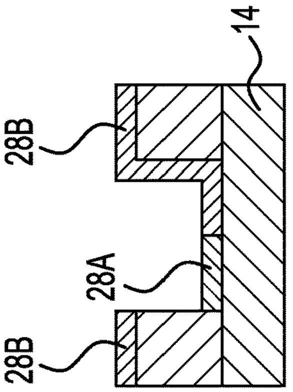

Referring specifically to FIG. 14D, the sacrificial layer 70 is then removed using a wet etch or lift-off process. The condition(s) of the wet etch process or the lift-off process is/are capable of dissolving or otherwise lifting off the sacrificial layer 70. The wet etch or lift-off process removes i) at least 99% of the sacrificial layer 70 and ii) the functionalized layer 28A applied thereon. Thus, the wet etch or lift-off process exposes the interstitial regions 93 of the layer 92 and the first portion 96 of the depression 90. The wet etch or lift-off process removes the portion of the first functionalized layer 28A positioned over the sacrificial layer 70, but does not remove the portion of the first functionalized layer 28A that is positioned over the second portion 98.

The second functionalized layer 28B is then applied. The second functionalized layer 28B may be any of the gel materials described herein. In the example shown in FIG. 14E, the second functionalized layer 28B is applied using any suitable deposition technique under high ionic strength conditions (e.g., in the presence of 10×PBS, NaCl, KCl, etc.). This deposits the second functionalized layer 28B over the first portion 96 of the depression 90 and over the interstitial regions 93 of the layer 92, but does not deposit the layer 28B over the first functionalized layer 28A. In another example, the second functionalized layer 28B may be deposited using a selective deposition technique, such as inkjet printing or microcontact printing, which dispenses the functionalized layer 28B with such accuracy that it is applied to the portion 96, but not to the interstitial regions 93 or the functionalized layer 28A. A curing process, as described herein, may be performed after deposition.

Figure 14F:
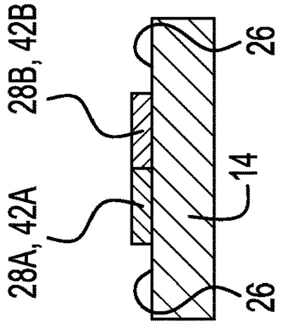

The layer 92 may then be removed. The structure may be exposed to a remover that will dissolve or otherwise lift off the layer 92 without removing the functionalized layers 28A, 28B that are attached to the substrate 14. Example negative photoresist, positive photoresist, or nanoimprint lithography resist removers include acetone, DMSO, or NMP (or any of the other examples set forth herein). When the functionalized layer 28B is applied over the layer 92, these portions of the functionalized layer 28B will be removed along with the layer 92. In this example, the functionalized layers 28A, 28B are in the form of functionalized layer pads 42A, 42B positioned on the planar surface 26 of the substrate 14, as shown in FIG. 14F. Taken together, the shape of the functionalized layer pads 42A, 42B resembles that of the depression 90.

While not shown, the method shown in FIG. 14A through FIG. 14F also includes attaching respective primer sets 30, 31 to the functionalized layers 28A, 28B. In some examples, the primers 56, 58 or 56', 58' (not shown in FIG. 14A through FIG. 14F) may be pre-grafted to the functionalized layer 28A, and thus to the functionalized layer pad 42A. Similarly, the primers 60, 62 or 60', 62' (also not shown in FIG. 14A through FIG. 14F) may be pre-grafted to the functionalized layer 28B, and thus to the functionalized layer pad 42B. In these examples, additional primer grafting is not performed.

In other examples, the primers 56, 58 or 56', 58' are not pre-grafted to the functionalized layer 28A. In these examples, the primers 56, 58 or 56', 58' may be grafted after the functionalized layer 28A is applied (e.g., at FIG. 14C). In these examples, the primers 60, 62 or 60', 62' may be pre-grafted to the second functionalized layer 28B/pad 42B. Alternatively, in these examples, the primers 60, 62 or 60', 62' may not be pre-grafted to the second functionalized layer 28B/pad 42B. Rather, the primers 60, 62 or 60', 62' may be grafted immediately after the second functionalized layer 28B is applied (e.g., at FIG. 14E) or after layer 92 removal (FIG. 14F) as long as i) the functionalized layer 28B has different functional groups (than functionalized layer 28A) for attaching the primers 60, 62 or 60', 62' or ii) any unreacted functional groups of the functionalized layer 28A have been quenched, e.g., using the Staudinger reduction to generate amines or an additional click reaction with a passive molecule such as hexynoic acid.

When grafting is performed during the method, grafting may be accomplished using any suitable grafting technique.

While a single set of functionalized layers 28A, 28B/pads 42A, 42B is shown in FIG. 14F, it is to be understood that the method described in reference to FIG. 14A through FIG. 14F may be performed to generate an array of functionalized layers 28A, 28B/pads 42A, 42B separated by interstitial regions across the planar surface 26 of the substrate 14.

The method illustrated in FIG. 15A through FIG. 15G is similar to that shown in FIG. 14A through FIG. 14F, except that multiple layers 92', 94 are used to define the depression 90'. In this example, the first layer 92' is positioned over the second layer 94, which is positioned over the substrate 14. In this example, the first and second layers 92', 94 have different etch rates. The substrate 14 may be selected to have the same or a similar etch rate as the first layer 92', so that it acts as an etch stop when the second layer 94 is etched. Examples of the materials for the first layer 92' include silicon or any of the materials set forth herein for the resin layer 20. In this example, the second layer 94 is used as a lift off material, and thus examples of the materials for the second layer 94 include silicon dioxide, a nanoimprint lithography resist, any of the photoresists set forth herein, or poly(methyl methacrylate). Some example material combinations for the substrate 14/second layer 94/first layer 92' include silicon/silicon dioxide/silicon, nanoimprint lithography resin/nanoimprint lithography resist/nanoimprint lithography resin, or nanoimprint lithography resin/photoresist or poly(methyl methacrylate)/nanoimprint lithography resin, or silicon dioxide/silicon/silicon dioxide.

In this example, defining the depression 90' over the substrate 14 begins with nanoimprinting or dry etching the depression 90 in the first layer 92' positioned over the second layer 94 positioned over the substrate 14. In this example, nanoimprinting may be performed as described herein. Alternatively, the depression 90 may be dry etched in the first layer 92'. As examples, etching of the first layer 92' may involve an anisotropic oxygen plasma, a $CF_4$ plasma, or a mixture of 90% $CF_4$ and 10% $O_2$ plasma. When the first layer 92' is silicon dioxide, it may be dry etched using a $CHF_3$ and $O_2$ and Ar reactive ion etch. The formation of the depression 90 exposes a surface 100 of the underlying second layer 94, as shown in FIG. 15A.

Defining the depression 90' continues with isotropically etching the second layer 94 to extend the depression down to the planar surface 26 of the substrate 14. This is shown in FIG. 15B. The isotropic etch may be a wet or dry etching process that depends upon the material of the second layer 94. As examples, a silicon second layer 94 may be exposed to a $XeF_2$ gas etch, a silicon dioxide second layer 94 may be exposed to an HF wet etch, and a nanoimprint lithography resist or photoresist may be exposed to a high pressure (e.g., 100 mTorr) $O_2$ reactive ion etch. Because the layer 92' and the substrate 14 are not susceptible to this isotropic etching process, etching of the layer 94 initiates at the exposed surface 100 and can extend under the layer 92' at the edges of the originally formed depression 90. This undercuts the layer 92' and increases the diameter or length and width of the portion of the depression 90' that is defined by the layer 94.

Figures 15A, 15B, 15C, 15D, 15E, 15F, 15G:
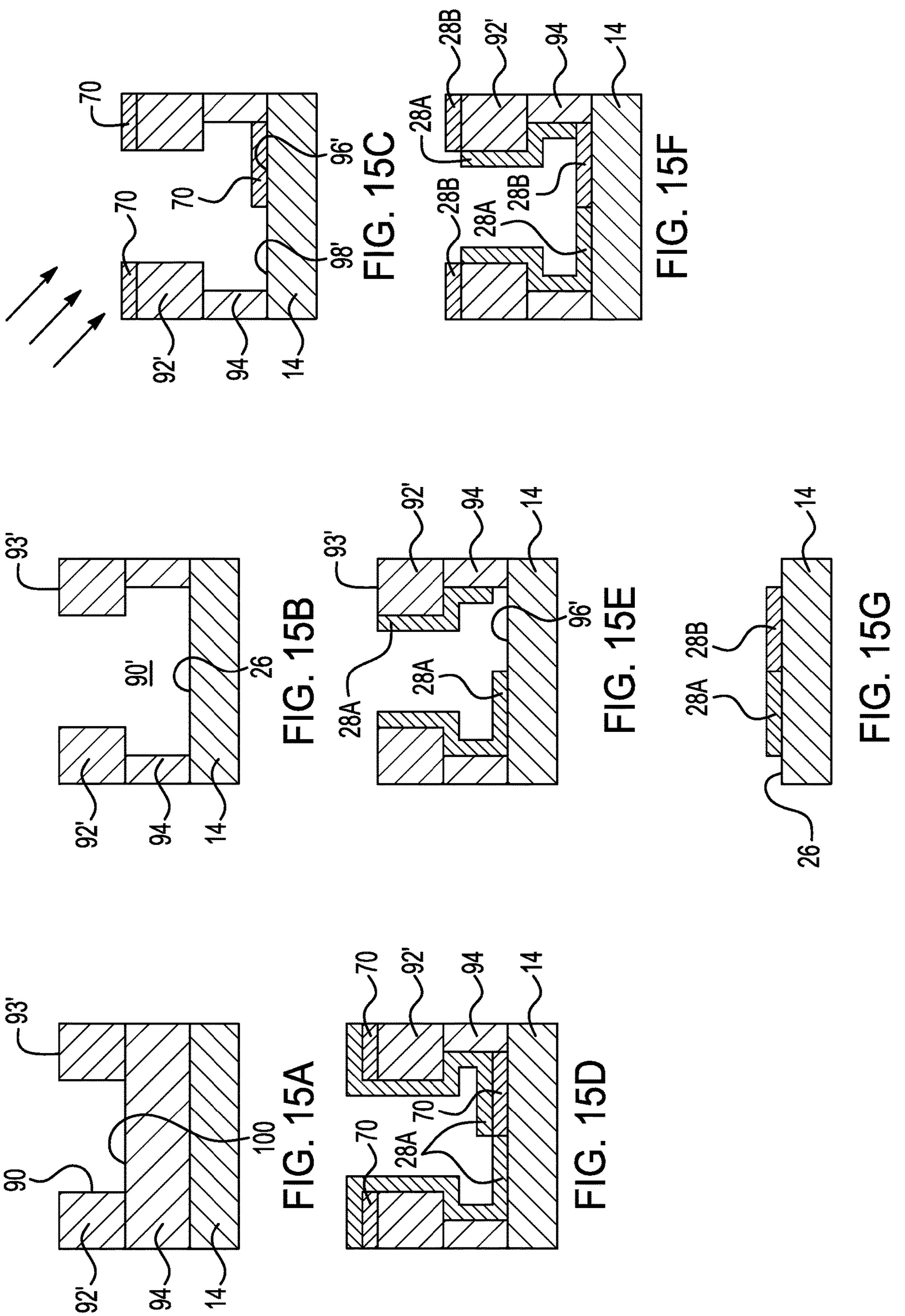
FIG. 15A through FIG. 15G together schematically depict yet another example method, where

As depicted in FIG. 15C, the method includes angle depositing the sacrificial layer 70 over interstitial regions 93' of the layer 92' and over a first portion 96' of the depression 90'. In this example, the first portion 96' of the depression 90' is a portion of the planar surface 26 of the single layer substrate 14 that is exposed at the depression 90'. Because of the geometry of the depression 90' and the angle at which the deposition takes place, the shadow effect takes place where less or no material is deposited in an area of the depression 90' that is transverse to the incoming material. In the example shown in FIG. 15C, the shadow effect takes place over a second portion 98' of the depression 90'. As such, the sacrificial layer 70 can be applied to the first depression portion 96', while the second portion 98' of the depression 90' remains exposed, i.e., free of the sacrificial layer 70.

It is to be understood that any of the materials for the sacrificial layer 70 may be used, as long as the removal conditions of the sacrificial layer 70 and the layer 94 are orthogonal (i.e., the layer 94 is unaffected by the conditions used to remove the sacrificial layer 70). As examples, the layer 94 may be a cured negative photoresist, a cured positive photoresist, or cured poly(methyl methacrylate), each of which can be lifted off in a remover such as dimethylsulfoxide (DMSO) with sonication, an acetone wash, or an NMP (N-methyl-2-pyrrolidone) based stripper wash; and the sacrificial layer 70 may be aluminum that can be removed in acidic or basic conditions or copper that can be removed using $FeCl_3$.

The functionalized layer 28A is then applied, as shown in FIG. 15D, over the sacrificial layer 70 and over the second portion 98' of the depression 90'. Any suitable deposition technique may be used. The functionalized layer 28A may be any of the gel materials described herein and is formulated with a suitable viscosity for the selected deposition technique. A curing process, as described herein, may be performed after deposition.

Referring specifically to FIG. 15E, the sacrificial layer 70 is then removed using a wet etch or lift-off process. The condition(s) of the wet etch process or the lift-off process is/are capable of dissolving or otherwise lifting off the sacrificial layer 70. The wet etch or lift-off process removes at least 99% of the sacrificial layer 70. Thus, the wet etch or lift-off process exposes the interstitial regions 93' of the layer 92' and the first portion 96' of the depression 90'. The wet etch or lift-off process removes the portion of the first functionalized layer 28A positioned over the sacrificial layer 70, but does not remove the portion of the first functionalized layer 28A that is positioned over the second portion 98'.

The second functionalized layer 28B is then applied. The second functionalized layer 28B may be any of the gel materials described herein. In the example shown in FIG. 15F, the second functionalized layer 28B is applied using any suitable deposition technique under high ionic strength conditions (e.g., in the presence of 10×PBS, NaCl, KCl, etc.). This deposits the second functionalized layer 28B over the first portion 96' of the depression 90' and over the interstitial regions 93' of the layer 92', but does not deposit the layer 28B over the first functionalized layer 28A. In another example, the second functionalized layer 28B may be deposited using a selective deposition technique, such as inkjet printing or microcontact printing, which dispenses the functionalized layer 28B with such accuracy that it is applied to the portion 96', but not to the interstitial regions 93' or the functionalized layer 28A. A curing process, as described herein, may be performed after deposition.

The layer 94 may then be removed. The structure may be exposed to a remover that will dissolve or otherwise lift off the layer 94 without removing the functionalized layers 28A, 28B that are attached to the substrate 14. The removal of the layer 94 will also remove the layer(s) positioned thereon, such as layer 92' and, in some instances, layer 28B. The removal of layer 94 leaves the functionalized layers 28A, 28B in the form of functionalized layer pads 42A, 42B positioned on the planar surface 26 of the substrate 14, as shown in FIG. 15G. Taken together, the shape of the functionalized layer pads 42A, 42B resembles that of the depression 90'.

While not shown, the method shown in FIG. 15A through FIG. 15G also includes attaching respective primer sets 30, 31 to the functionalized layers 28A, 28B. In some examples, the primers 56, 58 or 56', 58' (not shown in FIG. 15A through FIG. 15G) may be pre-grafted to the functionalized layer 28A, and thus to the functionalized layer pad 42A. Similarly, the primers 60, 62 or 60', 62' (also not shown in FIG. 15A through FIG. 15G) may be pre-grafted to the functionalized layer 28B, and thus to the functionalized layer pad 42B. In these examples, additional primer grafting is not performed.

In other examples, the primers 56, 58 or 56', 58' are not pre-grafted to the functionalized layer 28A. In these examples, the primers 56, 58 or 56', 58' may be grafted after the functionalized layer 28A is applied (e.g., at FIG. 15D). In these examples, the primers 60, 62 or 60', 62' may be pre-grafted to the second functionalized layer 28B/pad 42B. Alternatively, in these examples, the primers 60, 62 or 60', 62' may not be pre-grafted to the second functionalized layer 28B/pad 42B. Rather, the primers 60, 62 or 60', 62' may be grafted immediately after the second functionalized layer 28B is applied (e.g., at FIG. 15F) or after layer 94 removal (FIG. 15G) as long as i) the functionalized layer 28B has different functional groups (than functionalized layer 28A) for attaching the primers 60, 62 or 60', 62' or ii) any unreacted functional groups of the functionalized layer 28A have been quenched, e.g., using the Staudinger reduction to generate amines or an additional click reaction with a passive molecule such as hexynoic acid.

When grafting is performed during the method, grafting may be accomplished using any suitable grafting technique.

While a single set of functionalized layers 28A, 28B/pads 42A, 42B is shown in FIG. 15G, it is to be understood that the method described in reference to FIG. 15A through FIG. 15G may be performed to generate an array of functionalized layers 28A, 28B/pads 42A, 42B separated by interstitial regions across the planar surface 26 of the substrate 14.

Methods for Forming the Architecture of FIG. 2F

The example method shown in FIG. 16A through FIG. 16I may be used to generate the architecture shown in FIG. 2F. This example includes the multi-depth depression 32 and the functionalized layers 28A, 28B formed at different depths within the multi-depth depression 32.

The method shown in FIG. 16A through FIG. 16I generally includes defining the multi-depth depression 32 in a resin layer 20 such that the multi-depth depression 32 is surrounded by an interstitial region 106 (defined by the planar surface 26), the multi-depth depression 32 including a deep portion 34 and a shallow portion 36 adjacent to the deep portion 34; angle depositing a metal film 102 on at least a portion of a sidewall 104 of the multi-depth depression 32 that is adjacent to the deep portion 34; depositing a first functionalized layer 28A over the multi-depth depression 32 and the interstitial region 106; patterning the first functionalized layer 28A, whereby a portion 108 of the first functionalized layer 28A in the deep portion 34 is covered by a region 110 of an insoluble photoresist 72' and portions of the first functionalized layer 28A in the shallow portion 36, over the metal film 102, and over the interstitial region 106 are removed; depositing a second functionalized layer 28B over the interstitial region 106, over the metal film 102, over the region of the insoluble photoresist 72', and in the shallow portion 36; lifting off the region of the insoluble photoresist 72', thereby exposing the portion of the first functionalized layer 28A; wet etching the metal film 102, thereby removing the second functionalized layer 28B positioned over the metal film 102; and polishing the interstitial region 106, whereby the portion of the first functionalized layer 28A in the deep portion 34 and the second functionalized layer 28B in the shallow portion 36 remain intact.

Figures 16A, 16B, 16C, 16D, 16E, 16F, 16G, 16H, 16I:
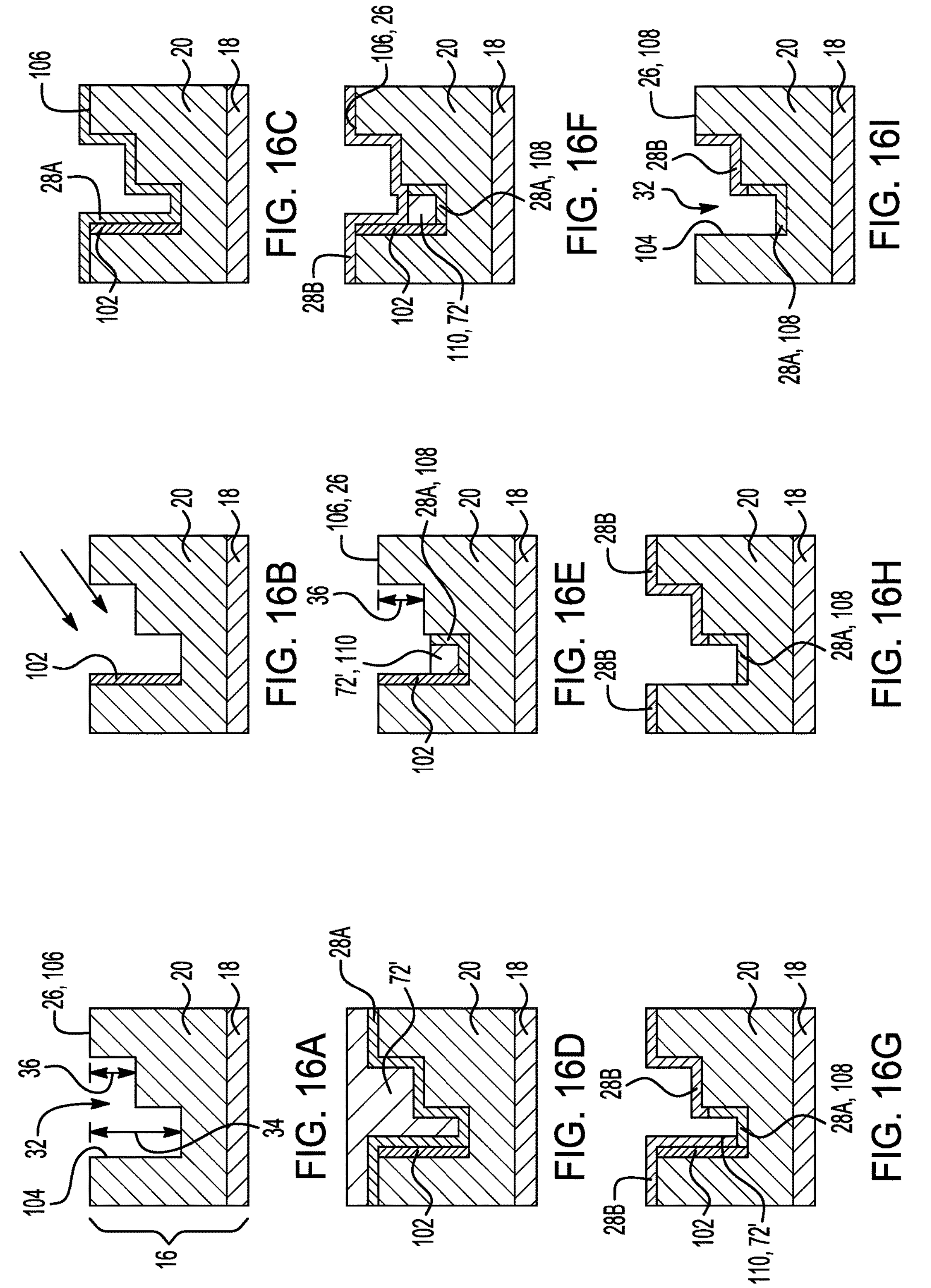
FIG. 16A through FIG. 16I together schematically depict a further example method, where

FIG. 16A depicts the multi-depth depression 32 defined in the layer 20 of the multi-layered substrate 16. The multi-depth depression 32 may be etched, imprinted, or otherwise defined in the layer 20 using any suitable technique. In one example, nanoimprint lithography is used. In this example, a working stamp with features that represent a negative replica of the multi-depth depression 32 is pressed into the layer 20 while the material is soft, which creates an imprint of the working stamp features in the layer 20. The layer 20 may then be cured with the working stamp in place. After curing, the working stamp is released.

While one multi-depth depression 32 is shown in FIG. 16A, it is to be understood that the method may be performed to generate an array of multi-depth depressions 32 separated by the planar surface 26 of the substrate 16.

The method then includes angle depositing the metal film 102 on at least a portion of a sidewall 104 of the multi-depth depression 32 that is adjacent to the deep portion 34. Examples of suitable materials for the metal film 102 include semi-metals, such as silicon, or metals, such as aluminum, copper, titanium, gold, silver, etc. In some examples, the semi-metal or metal may be at least substantially pure (<99% pure). In other examples, molecules or compounds of the listed elements may be used. For example, oxides of any of the listed semi-metals (e.g., silicon dioxide) or metals (e.g., aluminum oxide) may be used, alone or in combination with the listed semi-metal or metal.

The metal film 102 is angle deposited as described in reference to FIG. 4B. Because it is desirable to coat the portion of the sidewall 104 of the multi-depth depression 32 that is adjacent the deep portion 34, but not the bottom surfaces of the multi-depth depression 32, the target and collimator may be adjusted so that the metal material is deposited at the desired angle. This angle may depend upon the dimensions of the multi-depth depression 32. In one example, aluminum may be angle deposited using the following conditions: 45° or 60° angled sputter target, 5 mTorr process pressure, 200 W DC power, and Ar gas flow at 5 sccm.

FIG. 16C depicts the deposition of the first functionalized layer 28A over the multi-depth depression 32 and the interstitial regions 106. The functionalized layer 28A may be any of the gel materials described herein and may be applied using any suitable deposition technique. A curing process may be performed after deposition. The functionalized layer 28A covalently attaches to the exposed surfaces of the layer 20. As depicted, the applied functionalized layer 28A is positioned over the metal film 102 and over the exposed surfaces of the layer 20, including over the bottom surface of the deep portion 34, the bottom surface of the shallow portion 36, and the interstitial regions 106.

The first functionalized layer 28A is then patterned. In an example, patterning the first functionalized layer 28A involves: forming the insoluble photoresist 72' over the first functionalized layer 28A; and timed dry etching the insoluble photoresist 72' and the first functionalized layer 28A until the portion 108 of the first functionalized layer 28A in the deep portion 34 is covered by the region 110 of the insoluble photoresist 72', and portions of the first functionalized layer 28A in the shallow portion 36, over some of the metal film 102, and over the interstitial region 106 are removed.

FIG. 16D depicts the formation of the insoluble photoresist 72'. Either a positive photoresist or a negative photoresist may be used, and may be deposited using any suitable deposition technique. In this example, the entire photoresist is developed so that it is rendered insoluble.

Referring now to FIG. 16E, the insoluble photoresist 72' and the first functionalized layer 28A are dry etched to expose the interstitial regions 106, the bottom surface of the shallow portion 36, and a portion of the metal film 102. The portion of the metal film 102 that is exposed as a result of dry etching is equivalent to the depth of the shallow portion 36.

This dry etching process is performed for a measured amount of time to expose the desired film/surface/region. In one example, the timed dry etch may involve a reactive ion etch (e.g., with 10% $CF_4$ and 90% $O_2$) where the insoluble photoresist 72' and functionalized layer 28A are etched at a rate of about 17 nm/min. In another example, the timed dry etch may involve a 100% $O_2$ plasma etch where the insoluble photoresist 72' and functionalized layer 28A are etched at a rate of about 98 nm/min. As shown in FIG. 16E, the timed dry etching is stopped so that the region 110 of the insoluble photoresist 72' and the underlying portion 108 of the functionalized layer 28A remain in a portion of the deep portion 34 that is next to the interior wall of the multi-depth depression 32. As such, the remaining insoluble photoresist 72', 110 is at least substantially co-planar with the bottom surface of the shallow portion 36. As depicted, the lower portion of the metal film 102 also remains unexposed due to the presence of the region 110 in the lower portion of the deep portion 34. The region 110 is also positioned directly over, i.e. it covers, the portion 108 of the first functionalized layer 28A in the deep portion 34.

FIG. 16F depicts the second functionalized layer 28B deposited over the interstitial regions 106, over the exposed portion of the metal film 102, over the region 110 of the insoluble photoresist 108, and over the bottom surface of the shallow portion 36. The second functionalized layer 28B may be applied using any suitable deposition technique. The second functionalized layer 28B does not contaminate the portion of first functionalized layer 28A, which is covered by the region 110 of the insoluble photoresist 72'.

The region 110 of the insoluble photoresist 72' is then removed. FIG. 16G depicts the removal of the region 110 of the insoluble photoresist 72'. The region 110 of the insoluble photoresist 72' is removed through a lift-off process. The lift-off process may be any suitable lift-off process described herein that involves any suitable remover (e.g., organic solvent), which depends, in part, on the type of photoresist used. The lift-off process removes i) at least 99% of the insoluble photoresist 72' and ii) the functionalized layer 28B positioned thereon. The insoluble photoresist 72' is lifted off to expose the portion 108 of the first functionalized layer 28A.

FIG. 16H depicts the removal of the metal film 102. In an example, the removal of the metal film 102 may involve a wet etching process, which depends upon the material of the metal film 102. As examples, an aluminum metal film 102 can be removed in acidic or basic conditions, a copper metal film 102 can be removed using $FeCl_3$, a copper, gold or silver metal film 62 can be removed in an iodine and iodide solution, and a silicon metal film 102 can be removed in basic (pH) conditions. The removal of the metal film 102 also removes the second functionalized layer 28B positioned thereon and exposes the sidewall 104 of the multi-depth depression 32.

In FIG. 16I, the functionalized layer 28B that is positioned over the interstitial regions 106 is removed, e.g., using a polishing process. The polishing process may be performed with a chemical slurry as described herein. After polishing the portion 108 of the first functionalized layer 28A in the deep portion 34 and the second functionalized layer 28B in the shallow portion 36 remain intact.

While not shown, the method shown in FIG. 16A through FIG. 16I also includes attaching respective primer sets 30, 31 to the functionalized layers 28A, 28B. In some examples, the primers 56, 58 or 56', 58' (not shown in FIG. 16A through FIG. 16I) may be pre-grafted to the functionalized layer 28A. Similarly, the primers 60, 62 or 60', 62' (also not shown in FIG. 16A through FIG. 16I) may be pre-grafted to the functionalized layer 28B. In these examples, additional primer grafting is not performed.

In other examples, the primers 56, 58 or 56', 58' are not pre-grafted to the functionalized layer 28A. In these examples, the primers 56, 58 or 56', 58' may be grafted after the functionalized layer 28A is applied (e.g., at FIG. 16C). In these examples, the primers 60, 62 or 60', 62' may be pre-grafted to the second functionalized layer 28B. Alternatively, in these examples, the primers 60, 62 or 60', 62' may not be pre-grafted to the second functionalized layer 28B. Rather, the primers 60, 62 or 60', 62' may be grafted immediately after the second functionalized layer 28B is applied (e.g., at FIG. 16F). Alternatively, the primers 60, 62 or 60', 62' may be grafted after the region 110 is removed (FIG. 16G), or after the metal film 102 is removed (FIG. 16H), or after polishing (FIG. 16I) as long as i) the functionalized layer 28B has different functional groups (than functionalized layer 28A) for attaching the primers 60, 62 or 60', 62' or ii) any unreacted functional groups of the functionalized layer 28A have been quenched, e.g., using the Staudinger reduction to generate amines or an additional click reaction with a passive molecule such as hexynoic acid.

When grafting is performed during the method, grafting may be accomplished using any suitable grafting technique.

While a single multi-depth depression 32 is shown in FIG. 16I, it is to be understood that the method described in reference to FIG. 16A through FIG. 16I may be performed to generate an array of multi-depth depressions 32 (each of which includes functionalized layers 28A, 28B over respective bottom surfaces) separated by interstitial regions 108 across the planar surface 26 of the substrate 14.

In any of the example methods used to generate the architectures of FIG. 2A, FIG. 2B, and FIG. 2F, the multi-layer substrate 16 may be replaced with the single layer substrate 14. Similarly, in any of the example methods used to generate the architecture of FIG. 2D, the single layer substrate 14 may be replaced with the multi-layer substrate 16, with the triangular prisms 44 being defined in the layer 20.

Additional Notes

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it is to be understood that the disclosed examples may be modified. Therefore, the foregoing description is to be considered non-limiting.

What is claimed is:

1. A flow cell, comprising:

a substrate; and a reaction area defined in or over the substrate, the reaction area including:

two angularly offset and non-perpendicular surfaces relative to a planar surface of the substrate;

a polymeric hydrogel positioned over at least a portion of each of the two angularly offset and non-perpendicular surfaces;

a first primer set attached to the polymeric hydrogel that is positioned over the portion of a first of the two angularly offset and non-perpendicular surfaces; and a second primer set attached to the polymeric hydrogel that is positioned over the portion of a second of the two angularly offset and non-perpendicular surfaces, wherein the first and second primer sets are orthogonal.

2. The flow cell as defined in claim 1, wherein:

the reaction area is defined in the substrate; and the two angularly offset and non-perpendicular surfaces protrude outward relative to the planar surface of the substrate.

3. The flow cell as defined in claim 1, wherein:

the reaction area is defined in the substrate; and the two angularly offset and non-perpendicular surfaces protrude inward relative to the planar surface of the substrate.

4. The flow cell as defined in claim 1, wherein:

the reaction area is defined in a layer over the substrate;

the two angularly offset and non-perpendicular surfaces are part of a triangular prism defined in the layer; and the flow cell further comprises a post positioned on the substrate and supporting the triangular prism such that the triangular prism is a spaced distance from the planar surface.

5. The flow cell as defined in claim 4, further comprising an adhesive component between the first of the two angularly offset and non-perpendicular surfaces and the polymeric hydrogel applied thereon.

6. The flow cell as defined in claim 4, wherein:

the planar surface of the substrate defines an interstitial region adjacent to the post; and the flow cell further comprises;

a first reactive pad over the interstitial region at an area that underlies the first of the two angularly offset and non-perpendicular surfaces, the first reactive pad including the polymeric hydrogel and primers of the first primer set; and a second reactive pad over the interstitial region at an area that underlies the second of the two angularly offset and non-perpendicular surfaces, the second reactive pad including the polymeric hydrogel and primers of the second primer set.

7. The flow cell as defined in claim 1, further comprising:

a plurality of additional reaction areas defined in or over the substrate; and interstitial regions of the planar surface separating the reaction area and each of the plurality of additional reaction areas from each other.

8. The flow cell as defined in claim 1, wherein:

the first primer set includes an un-cleavable first primer and a cleavable second primer; and the second primer set includes a cleavable first primer and an un-cleavable second primer.

* * * * *